(12) United States Patent
Wang et al.

(10) Patent No.: US 12,293,238 B2
(45) Date of Patent: May 6, 2025

(54) EMBEDDED SYSTEM RUNNING METHOD AND APPARATUS, AND EMBEDDED SYSTEM AND CHIP

(71) Applicant: SUZHOU METABRAIN INTELLIGENT TECHNOLOGY CO., LTD., Jiangsu (CN)

(72) Inventors: Endong Wang, Jiangsu (CN); Jiaming Huang, Jiangsu (CN); Baoyang Liu, Jiangsu (CN); Chaofan Chen, Jiangsu (CN); Wenkai Ma, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/574,657

(22) PCT Filed: Apr. 28, 2023

(86) PCT No.: PCT/CN2023/091876
§ 371 (c)(1),
(2) Date: Dec. 27, 2023

(87) PCT Pub. No.: WO2024/221468
PCT Pub. Date: Oct. 31, 2024

(65) Prior Publication Data
US 2024/0362083 A1    Oct. 31, 2024

(51) Int. Cl.
*G06F 9/50*  (2006.01)
*G06F 9/4401*  (2018.01)
*G06F 9/48*  (2006.01)

(52) U.S. Cl.
CPC ............ *G06F 9/5083* (2013.01); *G06F 9/441* (2013.01); *G06F 9/4881* (2013.01);
(Continued)

(58) Field of Classification Search
None
See application file for complete search history.

(56) References Cited

FOREIGN PATENT DOCUMENTS

| CN | 106469283 A | 3/2017 |
|---|---|---|
| CN | 115413337 A | 11/2022 |

(Continued)

OTHER PUBLICATIONS

International Search Report and Written Opinion received for PCT Serial No. PCT/CN2023/091876 on Dec. 5, 2023.
(Continued)

*Primary Examiner* — Qing Yuan Wu
(74) *Attorney, Agent, or Firm* — Merchant & Gould P.C.

(57) ABSTRACT

An embedded system running method includes: allocating, according to a resource dynamic allocation rule, a group of services to be allocated to corresponding operating systems in an embedded system, wherein the embedded system includes a first operating system and a second operating system, and a response speed of the first operating system is higher than a response speed of the second operating system; determining resource allocation results corresponding to the group of services to be allocated, where the resource allocation results are used for indicating, among processing resources of the processor, a processing resource corresponding to each of the group of services to be allocated; and allocating the processing resources of a processor to the first operating system and the second operating system according to an operating system allocation result and the resource allocation result corresponding to each of the group of services to be allocated.

19 Claims, 6 Drawing Sheets

(52) U.S. Cl.
CPC .......... *G06F 9/5027* (2013.01); *G06F 9/5033* (2013.01); *G06F 9/505* (2013.01); *G06F 9/5055* (2013.01)

(56) References Cited

FOREIGN PATENT DOCUMENTS

| | | |
|---|---|---|
| CN | 115421871 A | 12/2022 |
| KR | 20130104958 A | 9/2013 |
| KR | 1020140076185 A | 6/2014 |
| KR | 101557995 B1 | 10/2015 |
| KR | 1020170110615 A | 10/2017 |
| KR | 101934293 B1 | 1/2019 |

OTHER PUBLICATIONS

Extended EP Search Report for EP 23825349.6, dated Jul. 5, 2024 (13 pages).
Groesbrink et al., "Architecture for Adaptive Resource Assignment to Virtualized Mixed-Criticality Real-Time Systems," SIGBED Review, vol. 10, No. 1, Feb. 2013, pp. 18-23.
Li et al., "A Light-Weighted Virtualization Layer for Multicore Processor-Based Rich Functional Embedded Systems," 2012 15th IEEE International Symposium on Object/Component/Service-Oriented Real-Time Distributed Computing (10 pages).
Sangorrin et al., "Dual Operating System Architecture for Real-Time Embedded Systems," XP-002782792, "Proceedings of the Sixth International Workshop on Operating Systems Platforms for Embedded Real-Time Applications," Jun. 6, 2010 (10 pages).
Sun et al., "Design of a Dual-core Processor Based Controller with RTOS-GPOS Dual Operating System," Proceedings of 2019 IEEE International Conference on Mechatronics and Automation, Aug. 4-7, Tianjin, China (6 pages).

Fig. 1

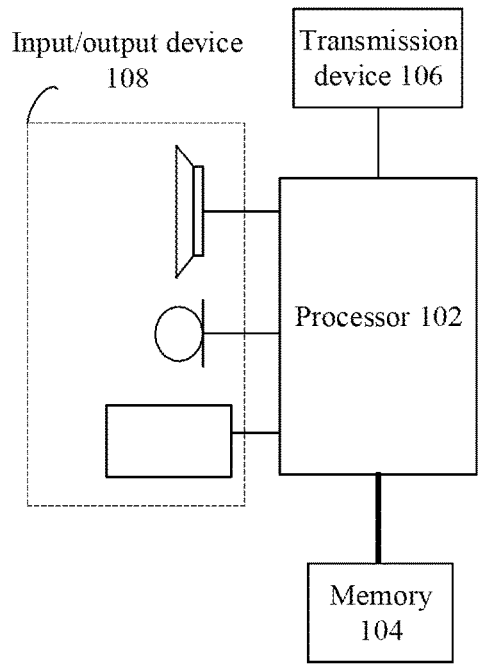

Fig. 2

| Allocate a group of services to be allocated to corresponding operating systems in an embedded system according to a resource dynamic allocation rule, wherein the resource dynamic allocation rule includes performing resource dynamic allocation according to at least one of: a service response speed, a service resource occupation rate, a service coupling degree, and service importance; the embedded system includes a first operating system and a second operating system; and the first operating system and the second operating system run on a processor, and a response speed of the first operating system is higher than a response speed of the second operating system | S202 |

↓

| Determine resource allocation results corresponding to the group of services to be allocated, wherein the resource allocation results are used for indicating, among the processing resources of the processor, a processing resource corresponding to each of the group of services to be allocated, and the processing resources of the processor include processor cores | S204 |

↓

| Allocate the processing resources of the processor to the first operating system and the second operating system according to an operating system allocation result and the resource allocation result corresponding to each of the group of services to be allocated | S206 |

EMBEDDED SYSTEM RUNNING METHOD AND APPARATUS, AND EMBEDDED SYSTEM AND CHIP

CROSS REFERENCE TO RELATED APPLICATIONS

This application is a National Stage Filing of the PCT International Application No. PCT/CN2023/091876 filed on Apr. 28, 2023, the entirety of which is herein incorporated by reference.

TECHNICAL FIELD

Embodiments of the present disclosure relate to the field of computers, and specifically, to an embedded system running method and apparatus, and an embedded system and a chip.

BACKGROUND

With the rapid development of semiconductor industries and integrated circuit technologies, multi-core processors have become important computing units in a plurality of fields. Under an application scenario sensitive to a response speed, a processor (e.g., a multi-core processor) may be combined with specialized acceleration hardware, so that services insensitive to the response speed may be processed by the multi-core processor, and services sensitive to the response speed may be processed by the acceleration hardware. However, when the above service processing method is adopted, most of processing resources (for example, core resources) of the multi-core processor are in an idle state, resulting in a low overall utilization rate of the processing resources.

SUMMARY

The embodiments of the present disclosure provide an embedded system running method and apparatus, and an embedded system and a chip, which may at least solve the problem in the related art that an overall utilization rate of processing resources is low due to the fact that most of processing resources of a multi-core processor are in an idle state.

An aspect of the embodiments of the present disclosure provides an embedded system running method, which includes: allocating, according to a resource dynamic allocation rule, a group of services to be allocated to corresponding operating systems in an embedded system, where the resource dynamic allocation rule includes performing resource dynamic allocation according to at least one of: a service response speed, a service resource occupation rate, a service coupling degree, and service importance; the embedded system includes a first operating system and a second operating system; and the first operating system and the second operating system run on a processor, and a response speed of the first operating system is higher than a response speed of the second operating system; determining resource allocation results corresponding to the group of services to be allocated, where the resource allocation results are used for indicating, among processing resources of the processor, a processing resource corresponding to each of the group of services to be allocated, and the processing resources of the processor include processor cores; and allocating the processing resources of the processor to the first operating system and the second operating system according to an operating system allocation result and the resource allocation result corresponding to each of the group of services to be allocated.

Another aspect of the embodiments of the present disclosure further provides an embedded system, which includes: a first operating system and a second operating system running on a processor, where a response speed of the first operating system is higher than a response speed of the second operating system; a service management module, configured to allocate, according to a resource dynamic allocation rule, a group of services to be allocated to the corresponding operating systems, where the resource dynamic allocation rule includes performing resource dynamic allocation according to at least one of: a service response speed, and a service resource occupation rate; a resource dynamic allocation module, configured to determine resource allocation results corresponding to the group of services to be allocated, where the resource allocation results are used for indicating, among processing resources of the processor, a processing resource corresponding to each of the group of services to be allocated, and the processing resources of the processor include processor cores; and a resource adaptive scheduling module, configured to allocate the processing resources of the processor to the first operating system and the second operating system according to an operating system allocation result and the resource allocation result corresponding to each of the group of services to be allocated.

Still another aspect of the embodiments of the present disclosure further provides an embedded system, which includes a chip and at least two operating systems. The chip includes a processor, a hardware controller, a first bus, and a second bus. A bandwidth of the first bus is higher than a bandwidth of the second bus, the first bus is configured as a multi-master and multi-slave mode, and the second bus is configured as a one-master and multi-slave mode. The at least two operating systems run based on the processor. Processing resources of the processor are dynamically allocated to the at least two operating systems; and the processing resources of the processor include processor cores. The at least two operating systems communicate with each other via the first bus. The at least two operating systems control the hardware controller via the second bus.

Still another aspect of the embodiments of the present disclosure further provides an embedded system running apparatus, which includes: a first allocation unit, configured to allocate, according to a resource dynamic allocation rule, a group of services to be allocated to corresponding operating systems in an embedded system, where the resource dynamic allocation rule includes performing resource dynamic allocation according to at least one of: a service response speed, a service resource occupation rate, a service coupling degree, and service importance; the embedded system includes a first operating system and a second operating system; and the first operating system and the second operating system run on a processor, and a response speed of the first operating system is higher than a response speed of the second operating system; a first determination unit, configured to determine resource allocation results corresponding to the group of services to be allocated, where the resource allocation results are used for indicating, among processing resources of the processor, a processing resource corresponding to each of the group of services to be allocated, and the processing resources of the processor include processor cores; and a second allocation unit, configured to allocate the processing resources of the processor to the first operating system and the second operating system according to an operating system allocation result and the resource allocation result corresponding to each of the group of services to be allocated.

Still aspect of the embodiments of the present disclosure further provides a chip. The chip includes at least one of a programmable logic circuit and executable instructions. The chip runs in an electronic device and is configured to implement operations in any one of the above method embodiments.

Still aspect of the embodiments of the present disclosure further provides a Baseboard Management Controller (BMC) chip, which includes a storage unit and a processing unit connected to the storage unit. The storage unit is configured to store a program; and the processing unit is configured to run the program to execute operations in any one of the above method embodiments.

Still aspect of the embodiments of the present disclosure further provides a mainboard. The mainboard includes: at least one processor; and at least one memory, configured to store at least one program. When the at least one program is executed by the at least one processor, the at least one processor is enabled to implement operations in any one of the above method embodiments.

Still aspect of the embodiments of the present disclosure further provides a server, which includes a processor, a communication interface, a memory, and a communication bus. The processor, the communication interface, and the memory communicate with each other via the communication bus. The memory is configured to store a computer program. The processor is configured to execute operations in any one of the above method embodiments when executing the program stored in the memory.

Still aspect of the embodiments of the present disclosure further provides a computer-readable storage medium. The computer-readable storage medium stores a computer program.

Operations in any one of the above method embodiments are executed when the computer program is configured to run.

Still aspect of the embodiments of the present disclosure further provides an electronic device. The electronic device includes a memory and a processor. The memory is configured to store a computer program. The processor is configured to run the computer program to execute operations in any one of the above method embodiments.

In the embodiments of the present disclosure, different operating systems of the embedded system run on different processing resources of the processor, and a group of services to be allocated are allocated to the corresponding operating systems in the embedded system according to a resource dynamic allocation rule. The resource dynamic allocation rule includes performing resource dynamic allocation according to at least one of: a service response speed, a service resource occupation rate, a service coupling degree, and service importance. The embedded system includes the first operating system and the second operating system. The first operating system and the second operating system run on a processor, and the response speed of the first operating system is higher than the response speed of the second operating system. The resource allocation results corresponding to the group of services to be allocated are determined, wherein the resource allocation results are used for indicating, among processing resources of the processor, a processing resource corresponding to each of the group of services to be allocated, and the processing resources of the processor include processor cores. The processing resources of the processor are allocated to the first operating system and the second operating system according to the operating system allocation result and the resource allocation result corresponding to each of the group of services to be allocated. Since at least two operating systems of the embedded system run on the processor, different operating systems have different response speeds that may be used for running services with different response speed requirements. The services to be executed of the processor are allocated to different operating systems based on the resource dynamic allocation rule, and the services to be executed are allocated to different processing resources, such that the processing resources of the processor are dynamically allocated to different operating systems based on a correspondence relationship between the services to be executed and the operating systems and a correspondence relationship between the services to be executed and the processing resources. Through the above service execution mechanism, extra acceleration hardware does not need to be added. In addition, since all the services are executed by the processing resources in the processor, the processor processes not only the services that are originally executed by the processor, but also the services that are originally executed by the acceleration hardware, such that a service volume processed by the processor may be increased, and the utilization rate of the processing resources may be improved. Therefore, the problem of low overall utilization rate of core resources due to the idle state of most of the processing resources of the multi-core processor in the related art may be solved.

BRIEF DESCRIPTION OF THE DRAWINGS

Drawings here are incorporated into the specification and constitute a part of the specification. The drawings illustrate embodiments of the present disclosure and serve to facilitate the understanding of the principles of the present disclosure together with the specification.

In order to more clearly illustrate the embodiments of the present disclosure or the technical solutions in the related art, the drawings used in the description of the embodiments or the related art will be briefly described below. It is apparent that other drawings may be obtained from those having ordinary skill in the art according to these drawings without any creative effort.

FIG. 1 is a schematic diagram of a hardware environment of an embedded system running method according to the embodiments of the present disclosure.

FIG. 2 is a schematic flowchart of an exemplary embedded system running method according to the embodiments of the present disclosure.

DETAILED DESCRIPTION OF THE INVENTION

Figure 3:
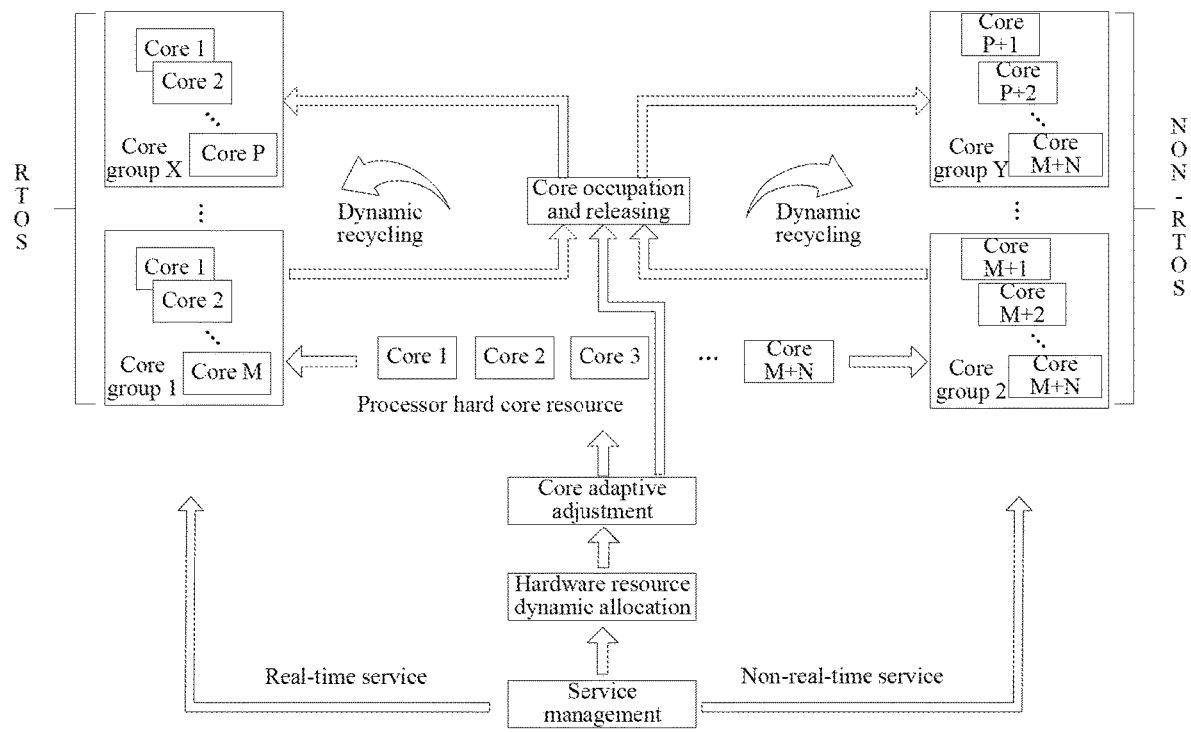
FIG. 3 is a schematic diagram of an exemplary embedded system running method according to the embodiments of the present disclosure.

In order to enable those having ordinary skill in the art to better understand the solutions of the present disclosure, the technical solutions in the embodiments of the present disclosure will be clearly and completely described below in combination with the drawings in the embodiments of the present disclosure. It is apparent that the described embodiments are only part of, rather than all of, the embodiments of the present disclosure. All other embodiments obtained by those having ordinary skill in the art based on the embodiments in the embodiments of the present disclosure without creative effort shall fall within the scope of protection of the present disclosure.

It is to be noted that terms "first", "second" and the like in the description, claims and the above drawings of the present disclosure are used for distinguishing similar objects rather than describing a specified sequence or a precedence order. It should be understood that the data used in such a way may be exchanged where appropriate, in order that the embodiments of the present disclosure described here may be implemented in an order other than those illustrated or described herein. In addition, terms "include" and "have" and any variations thereof are intended to cover non-exclusive inclusions. For example, processes, methods, systems, products or devices containing a series of operations or units are not limited to those operations or units clearly listed, and other operations or units which are not clearly listed or are inherent to these processes, methods, products or devices may also be included.

The method embodiments provided in the embodiments of the present disclosure may be executed in a server, a computer terminal, a device terminal, or a similar computing apparatus. Taking the running on the server as an example, FIG. 1 is a schematic diagram of a hardware environment of an embedded system running method according to the embodiments of the present disclosure. As shown in FIG. 1, the server may include one or more (there is only one shown in FIG. 1) processors 102 (the processors 102 may include, but are not limited to, processing apparatuses such as microprocessors (such as Micro Controller Unit (MCU)) or programmable logic devices (such as Field Programmable Gate Array (FPGA)) and a memory 104 configured to store data. In an exemplary embodiment, the server may further include a transmission device 106 for conducting a communication function and an input/output device 108. Those having ordinary skill in the art may understand that the structure shown in FIG. 1 is only for schematic purposes, which does not limit the structure of the above server. For example, the server may further include more or fewer components than those shown in FIG. 1, or have different configurations that are equivalent or more functional than those shown in FIG. 1.

The memory 104 may be configured to store a computer program, for example, a software program and a module of application software, such as a computer program corresponding to an embedded system running method in the embodiments of the present disclosure. The processor 102 runs the computer program stored in the memory 104, so as to execute various functional applications and data processing, that is, to realize the above embedded system running method. The memory 104 may include a high-speed random access memory, and may further include a non-volatile memory, such as one or more magnetic disk memory apparatuses, a flash memory device, or other non-volatile solid-state memory devices. In some embodiments, the memory 104 may further include memories remotely disposed with respect to the processor 102. These remote memories may be connected to a server via a network. Examples of the above network include, but are not limited to, the Internet, an intranet, a local area network, a mobile communication network, and a combination thereof.

The transmission device 106 is configured to receive or transmit data via a network. The specific example of the above network may include a wireless network provided by a communication provider of the server. In an example, the transmission device 106 includes a Network Interface Controller (NIC), and may be connected to other network devices by using a base station, so as to communicate with the Internet. In an example, the transmission device 106 is a Radio Frequency (RF) module, which is configured to communicate with the Internet in a wireless manner.

The embodiment provides an embedded system running method. The method is applied to the server. FIG. 2 is a schematic flowchart of an exemplary embedded system running method according to the embodiments of the present disclosure. As shown in FIG. 2, the flow includes the following operations S202 to S206.

At operation S202, a group of services to be allocated are allocated to corresponding operating systems in an embedded system according to a resource dynamic allocation rule.

The embedded system running method in the embodiment may be applied to a scenario where services run on the processing resources of the processor and dynamic balanced scheduling is performed on the processing resources. The embedded system may be an embedded multi-system. The embedded multi-system refers to an embedded system of which a multi-core processor runs multiple operating systems (for example, the first operating system and the second operating system), wherein these operating systems simultaneously run in the same embedded system, and the multiple operating systems may be the same type of the operating systems, or may be different types of the operating systems, such as a heterogeneous operating system (having different types of operating systems with different architectures). The services on the processor may be executed in parallel by the processing resources on a plurality of cores of the processor. The processor here may be a multi-core processor, such as an eight-core processor, or may be a processor including other number of cores. In the embodiments, the number of the cores included in the multi-core processor is not limited.

In the related art, as semiconductor industries and integrated circuit technologies rapidly develop, the multi-core processor has become an important computing unit in fields such as cloud computing, Artificial Intelligence (AI), big data, industrial Internet, and 5th Generation Mobile Communication Technologies (5G). In order to achieve the sharing of hardware computing resources, a virtualization technology may be introduced to improve the utilization rate of the multi-core processor, that is, a plurality of virtual machines are virtualized based on a hardware platform of the processor, and each virtual machine runs an independent operating system.

However, the virtual machine-based operating systems are generally unable to meet real-time requirements of the services due to increased overhead such as virtual machine management. Therefore, under an application scenario that is sensitive to a response speed (which is related to the real-time performance of the services), the operating systems are run generally by directly monopolizing a physical machine. Such "bare metal"-type processor deployment method may significantly reduce service processing delays. In various industrial fields (such as processors and Internet of Things) of embedded system development, in order to realize powerful system management functions with increasing functional requirements, the services carried by the embedded system are also planned and divided according to different degrees of requirements (real-time requirements) for the response speed, and different hardware implementation platforms are configured for different service types. For example, complex non-real-time services with various types are processed by a multi-core processor (Central Processing Unit (CPU), as an operation and control core of a computer system, the CPU is the final execution unit of information processing and program running), while services having high requirements for the response speed are processed by specialized acceleration hardware. The acceleration hardware here may include, but is not limited to: a Field Programmable Gate Array (FPGA), a Complex Programmable Logic Device (CPLD), or an Application Specific Integrated Circuit (ASIC).

However, for the solution of deploying both the multi-core CPU and the acceleration hardware in the embedded system, only one type of operating system generally runs on all the processing resources (for example, the processor cores) of the processor, and most of the processing resources are in an idle state in most of the time, such that the overall utilization rate of the processing resources is relatively low. Herein, conventional embedded products (such as mobile phones and tablets) generally run one operating system (for example, Android, IOS or Windows) on a plurality of cores, such that in most cases, the load occupation rate of a CPU core is below 30% (the capacity of the CPU is usually in excess); and the CPU operates according to time slices, and is in an idle state when the CPU is not occupied. In addition, increasing acceleration hardware resources such as FPGA/ CPLD to deal with some services that are sensitive to response time is not conducive to cost control.

In order to at least partially solve the above technical problems, in the embodiments, different operating systems of the embedded system run on different processing resources of the processor, and different operating systems have different response speeds that may be used for running services with different response speed requirements. The services to be executed of the processor are allocated to different operating systems based on the resource dynamic allocation rule, and the services to be executed are allocated to different processing resources, such that the processing resources of the processor are dynamically allocated to different operating systems based on a correspondence relationship between the services to be executed and the operating systems and a correspondence relationship between the services to be executed and the processing resources. Through the above service execution mechanism, extra acceleration hardware does not need to be added, which is beneficial for cost control. In addition, since all the services are executed by the processing resources in the processor, the processor processes not only the services that are originally executed by the processor, but also the services that are originally executed by the acceleration hardware, such that a service volume processed by the processor may be increased, and the overall utilization rate of the processing resources may be improved.

In the embodiment, the embedded system includes the first operating system and the second operating system, and the response speed of the first operating system is higher than the response speed of the second operating system. The first operating system and the second operating system run on the processor, for example, on different processing resources of the processor. The processing resources of the processor may include at least one of: the processing resources of the first operating system (the processing resources that scheduled to the first operating system), the processing resources of the second operating system (the processing resources that scheduled to the second operating system), or unallocated processing resources. Herein, the processor may be a multi-core processor (for example, an eight-core processor). The processing resources of the processor (that is, the processor resources) may include processor cores (processor hard cores), or may include other types of resources, such as controller logic units, external interfaces, bus resources, etc.

During the running of the processor, a group of services to be allocated may be acquired, that is, the services to be allocated to the first operating system and the second operating system. Since different services to be allocated may differ in dimensions such as the response speed, the service resource occupation rate, the service coupling degree with other services, and service importance, the resource dynamic allocation rule may be configured in advance. The resource dynamic allocation rule may include rules used for performing service allocation, based on which the services may be allocated to the corresponding operating systems, so as to control the processing resources of the corresponding operating systems to execute the services allocated to these processing resources. In some exemplary implementations, the resource dynamic allocation rule may include performing resource dynamic allocation according to at least one of: a service response speed, a service resource occupation rate, a service coupling degree, and service importance. Different allocation rules may have corresponding priority levels. For example, the priority levels may be the service importance, the service coupling degree, the service response speed, and the service resource occupation rate according to a sequence from high to low. According to the resource dynamic allocation rule, the group of services to be allocated (or tasks to be allocated, different services to be allocated may correspond to different processes) may be allocated to the corresponding operating systems in the embedded system, so as to obtain a service allocation result.

In some exemplary implementations, based on constraints on response time, the first operating system may be an operating system that has a clear fixed time constraint. All processing processes (task scheduling) need to be completed within the fixed time constraint, otherwise, the system may generate an error. The first operating system may be a Real Time Operating System (RTOS), such as FreeRTOS and RTLinux, or may be an RTOS in other embedded systems. The second operating system does not have this characteristic. The second operating system generally uses a fair task scheduling algorithm. When the number of threads/processes is increased, CPU time needs to be shared, and task scheduling is uncertain, so the second operating system may be called a non-RTOS, such as contiki, HeliOS, and Linux (also known as GNU/Linux, a freely distributable Unix-like operating system), or may be a non-RTOS in other embedded systems. The Linux system is a multi-user, multi-task, multi-threaded, and multi-CPU operating system based on a Portable Operating System Interface (POSIX).

Correspondingly, the services allocated to the first operating system are generally real-time services. A real-time service refers to a service that needs to be scheduled within a specified time. The real-time service needs to be processed by the processor at a speed fast enough, and a processing result may also control a production process within a specified time or make a rapid response on the processing system. As a typical scenario, the control over robotic manipulators in industrial control is a real-time service, and the system needs to take measures in time before misoperation of the robotic manipulators is detected, otherwise serious consequences may be caused. The services allocated to the second operating system generally are non-real-time services. A non-real-time service refers to a service that is insensitive to a scheduling time, and has certain tolerance for scheduling delays, for example, reading sensor data of a temperature sensor in a server is a non-real-time service.

It is to be noted that, the RTOS refers to an operating system that may receive and process with a speed fast enough when an external event or data is generated, generate a processing result that may control a production process within a specified time or make a rapid response on the processing system, complete real-time services by scheduling all available resources, and control all the real-time services to run in a harmonized manner. The RTOS has the characteristics of timely response and high reliability.

In some exemplary implementations, allocation of the group of services to be allocated to the corresponding operating systems may be executed by a service management module. As shown in FIG. 3, the service management module may be a software module that runs on the first operating system or the second operating system. For example, when the service management module runs on the second operating system, the service management module may be implemented by software in the Linux system. The service management module may allocate the group of services to be allocated to the corresponding operating systems in the embedded system according to the resource dynamic allocation rule.

At operation S204, resource allocation results corresponding to the group of services to be allocated are determined. The resource allocation results are used for indicating, among the processing resources of the processor, a processing resource corresponding to each of the group of services to be allocated.

After each service to be allocated is allocated to the corresponding operating system, according to the service allocation result, corresponding processing resources may be allocated for each service to be allocated, so as to obtain resource allocation results corresponding to the group of services to be allocated. When allocating the processing resources for the services to be allocated, the processing resources of the first operating system may be allocated to the services that are allocated to the first operating system, and the processing resources of the second operating system are allocated to the service that are allocated to the second operating system. In addition, considering load balancing, when there are unallocated processing resources, the unallocated processing resources may be allocated for part of the services.

The processing resources of the processor may be dynamically allocated in units of time slices. The frequent switching of the operating systems to which the processing resources belong and the fact that the service processing time is not necessarily an integer multiple of the time slice may both result in prolonged response time of some services. Therefore, processing resources may be allocated to the first operating system and the second operating system in units of processor cores, that is, the processor cores of the processor are allocated to the corresponding operating systems in units of the entire processor core. The number of the processor cores allocated for each operating system is an integer, and different operating systems are allocated with different processor cores.

In some exemplary implementations, the resource allocation results corresponding to the group of services to be allocated may be determined by a resource dynamic allocation module. As shown in FIG. 3, the resource dynamic allocation module may be a software module that runs on the first operating system or the second operating system. For example, when the resource dynamic allocation module runs on the second operating system, the resource dynamic allocation module may be implemented by software module in the second operating system. The software module may dynamically allocate the processing resources for the services according to the output of the service management module. Herein, the software module may be a program module with a preset function. For example, the resource dynamic allocation module may be a program module with a resource dynamic allocation function; and the service management module may be a program module with a service management function. Each software module may be deployed and adjusted as a whole, and at the same time, may be applied to applications in different application projects.

At operation S206, the processing resources of the processor are allocated to the first operating system and the second operating system according to an operating system allocation result and the resource allocation result corresponding to each of the group of services to be allocated.

The processing resources of the processor may be allocated to the first operating system and the second operating system according to the operating system allocation result and the resource allocation result corresponding to each of the group of services to be allocated. In some exemplary implementations, the unallocated processing resources of the processor may be allocated to the operating systems corresponding to the processing resources. The unallocated processing resources may be determined based on the correspondence relationship between the unallocated processing resources and the services to be allocated and the correspondence relationship between the services to be allocated and the operating systems.

Figure 4:
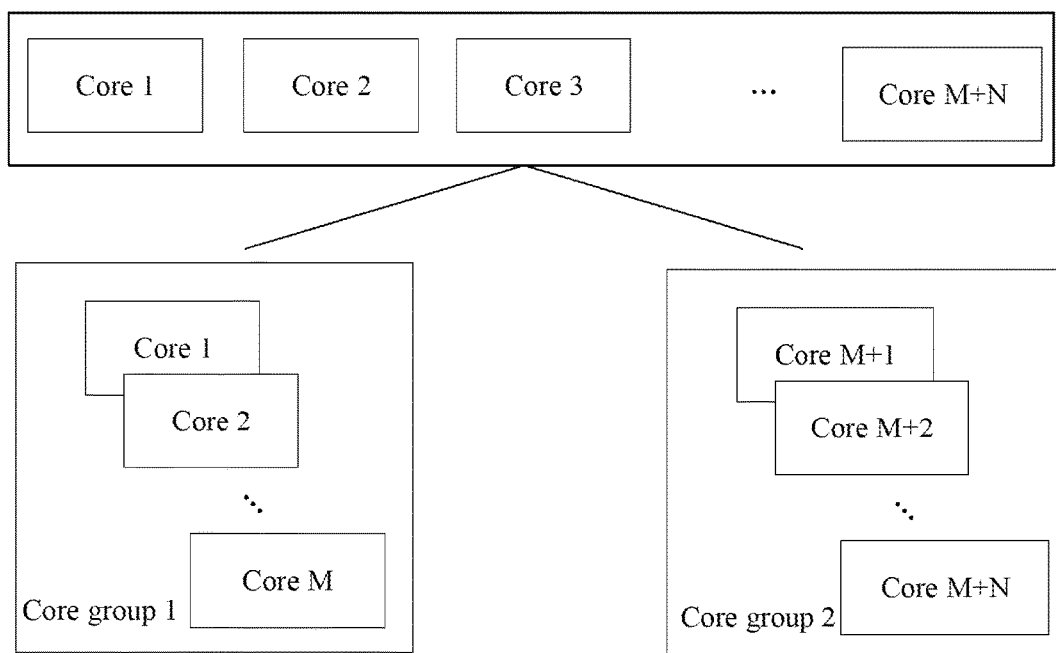
FIG. 4 is a schematic diagram of another exemplary embedded system running method according to the embodiments of the present disclosure.

In some exemplary implementations, the allocation of the processing resources of the processor to the first operating system and the second operating system may be executed by a resource adaptive scheduling module (for example, a core adaptive scheduling module). The resource adaptive scheduling module may be a software module running on the first operating system or the second operating system. For example, when the resource adaptive scheduling module runs on the second operating system, the resource adaptive scheduling module may be implemented by software in the Linux system, and may complete an actual scheduling action on the processing resources of the processor (for example, processor hard core resources) according to the output of a service management module and the output of the resource dynamic allocation module. As shown in FIG. 4, through resource scheduling of the core resource adaptive scheduling module, M cores among (M+N) cores are scheduled to the RTOS, and N cores among the (M+N) cores are scheduled to the non-RTOS.

For example, heterogeneous operating systems may run on different hard cores of the same processor, so as to enable the entire processor to have parallel processing capabilities of real-time and non-real-time services. In addition, the resource utilization rate of the processor is significantly improved by adaptively adjusting processor hard core resources (for example, processor cores) that are occupied by different operating systems. Herein, heterogeneity means that the operating systems running in the same multi-core processor of the embedded system are different in type; and the multi-system means that there are a plurality of operating systems running on the same multi-core processor of the embedded system, and these operating systems run at the same time in a time dimension.

Herein, it is to be noted that, for the server, the server is at least highly scalable and stable. As an enterprise network is not possible to remain unchanged for a long time, for the network information technology today, when the server does not have certain extendibility, the use of the server in the enterprise will be affected, thereby affecting the future development of the enterprise. It can be seen that the extendibility becomes the most basic characteristics required for servers, and later better utilization may be guaranteed when higher extendibility is realized. In addition to hardware extendibility, the extendibility also includes software extendibility. Because the functions of the server are very complex compared with a computer, it is important not only in the hardware configuration, but also in software configuration. Trying to achieve more functionality is also impossible without full software support.

In addition, since the server needs to process a large amount of data to support the continuous running of the services, the server also has a very important feature, for example, high stability, and unstable data transmission of the server will undoubtedly have a great impact on the services.

In the solution of the embodiments of the present disclosure, by using the characteristics of the server of high extendibility, dual software systems of the first operating system and the second operating system are introduced and configured to generate a hardware interface signal; and meanwhile, hardware devices such as the GPLD and the BMC chip may also be introduced and respectively configured to adjust a transmission voltage of the hardware interface signal, and monitor the running states of other devices inside the server. Based on this, the manner of generating, by the first operating system, a hardware interface signal corresponding to a request command is used in the embodiments of the present disclosure. The request command is first acquired through the first operating system; then a plurality of pieces of logical bit information corresponding to the request command are determined; and finally, the hardware interface signal corresponding to the request command is generated according to the plurality of pieces of logical bit information and a timer. From the above content, it may be learned that, in the embodiments of the present disclosure, the hardware interface signal corresponding to the request command is generated by the first operating system, such that the technical effect of simulating the generation of the hardware interface signal in a software manner is realized. In this way, the chip does not need to have a hardware logic design of the related hardware interface signal, thereby reducing the design difficulty of the chip and the design cost of the chip. In the embodiments of the present disclosure, the purpose of using a software system to generate the hardware interface signal without the need of hardware logic design of the hardware interface signal on the chip may be achieved, such that the design difficulty of the chip is reduced, thereby solving the technical problem in the related art of high design cost of the chip caused by the requirement of the chip for the hardware logic design of the controller.

In addition, the stability of the server may also be guaranteed by introducing the dual software systems of the first operating system and the second operating system. Since the service response speed of the second operating system is lower than the service response speed of the first operating system, the first operating system with faster service response speed is used to generate the hardware interface signal, which ensures that the generation of the hardware interface signal is not interrupted, thereby ensuring that the hardware interface signal may be continuously and stably outputted.

Through the above operations, a group of services to be allocated are allocated to the corresponding operating systems in the embedded system according to a resource dynamic allocation rule. The resource dynamic allocation rule includes performing resource dynamic allocation according to at least one of: a service response speed, a service resource occupation rate, a service coupling degree, and service importance. The embedded system includes the first operating system and the second operating system. The first operating system and the second operating system run on a processor, and the response speed of the first operating system is higher than the response speed of the second operating system. The resource allocation results corresponding to the group of services to be allocated are determined, wherein the resource allocation results are used for indicating, among processing resources of the processor, a processing resource corresponding to each of the group of services to be allocated, and the processing resources of the processor include processor cores. The processing resources of the processor are allocated to the first operating system and the second operating system according to the operating system allocation result and the resource allocation result corresponding to each of the group of services to be allocated. Therefore, the problem of low overall utilization rate of core resources due to the idle state of most of the processing resources of the multi-core processor in the related art may be solved, thereby improving the utilization rate of the processing resources.

In an exemplary embodiment, the method may further include the following operation S11.

At operation S11, a rule configuration file is read, so as to generate a rule structure body, wherein the rule structure body is used for recording the resource dynamic allocation rule.

The resource dynamic allocation rule may be configured based on a rule configuration file. Through the read rule configuration file, the rule structure body used for recording the resource dynamic allocation rule may be generated. Herein, the rule configuration file may be a load balancing policy file (payload_balance.config). The load balancing policy file may be used for configuring methods for classifying various services (or processes) running, the principles of evaluating real-time levels, etc. In the load balancing policy file, the resource dynamic allocation rule may be configured with different parameters. One example of the load balancing policy file is provided below.

classification kinds=2//When the value of the classification kinds is equal to 1, it indicates that the processes are classified according to attributes such as "important" and "unimportant", otherwise the processes are classified according to a preset classification method (for example, real-time and non-real-time).

real-time grade evaluation=2//When the value of the real-time grade evaluation is equal to 1, it indicates that an average occupation rate of the CPUs within past statistic minutes is used as the principle of evaluating the real-time levels of the processes; otherwise, it indicates that a preset priority level is used as the principle of evaluating the real-time levels of the processes.

statistic minutes=5//The value of the statistic minutes represents statistical time (in minute) of the average occupation rate of the processes; and this value is valid when real-time grade evaluation is equal to 1.

In some exemplary implementations, the resource dynamic allocation rule may be stored in a load balancing policy module. Herein, the load balancing policy module may be a software module (for example, a software module running under the Linux system) running under the first operating system or the second operating system, and may provide strategic guidance for the service management module, including the methods for classifying various services (or processes) running in the system, the principles of evaluating real-time levels, etc. The service management module may perform service division and management on the services in the system according to the real-time levels, and may further guide the resource adaptive scheduling module to re-allocate the processor resources. Exemplarily, the service management module may execute actual classification of the services according to the output of the load balancing policy module, so as to generate a list including real-time services and non-real-time services.

It is to be noted that, the above classification method and the principles of evaluating real-time levels are open, such that the user may customize a certain method or principle. The rules based on which the service management module performs service management may be dynamically configured, and settings on rules may be further performed based on existing rules. A plurality of rules having the same function may be set in the service management module, but there is no contradiction between the rules, that is, the current rule to be used in the rules having the same function may be determined based on rule selection conditions such as configuration time of the rules and the priority levels of the rules, so as to avoid contradiction between the rules. The above configuration file load_balance.config describes a possible scenario. In the configuration file, the variable classification_kinds indicates a specific classification standard (for example, according to the importance or real-time characteristic of the services) and a classification category (for example, important services and general services, real-time services and non-real-time services); the variable real-time_grade_evaluation indicates a real-time evaluation standard (which may be according to the average occupation rate of the CPUs within the past statistic_minutes or according to the preset service priority), wherein the types of the real-time levels may be customized by the user, for example, the types of the real-time levels may be defined as high, normal or low, or may be subdivided into more types.

The output of the load balancing policy module is the readily-configured classification methods and the principles of evaluating real-time levels, and may be embodied in the specific configuration files (for example, the load_balance.config file) or structure body variables during software implementation. These files or structure body variable may finally be accessed by the service management module, so that the service management module may acquire specific policies for load balancing.

By virtue of the embodiment, the convenience of information configuration may be improved by reading the rule configuration file, and generating the rule structure body so as to record the resource dynamic allocation rule.

In an exemplary embodiment, the method may further include the following operations S21 and S22.

At operation S21, a rule updating configuration file is acquired via an external interface of the second operating system, and the rule updating configuration file is used for updating the resource dynamic allocation rule that has been configured.

At operation S22, the rule updating configuration file is used to update the rule structure body, so as to update the resource dynamic allocation rule recorded by the rule structure body.

The rule structure body may be in a fixed format, that is, modification is not allowed during the running of the embedded system; or the rule structure body may be in a format that may be flexibly configured, that is, configuration modification may be performed by the configuration file in a specific format. In the embodiment, the rule updating configuration file may be acquired, wherein the rule updating configuration file is used for updating the resource dynamic allocation rule that has been configured; and the rule updating configuration file may be used to update the rule structure body, so as to update the resource dynamic allocation rule recorded by the rule structure body.

When the rule structure body is updated by using the rule updating configuration file, a new rule structure body may be directly generated according to the rule updating configuration file, and the newly-generated rule structure body is used to replace the existing rule structure body; alternatively, parameter values of rule parameters corresponding to the rule structure body may be updated by using parameter values of rule parameters indicated by the rule updating configuration file.

In some exemplary implementations, the configuration file in the specific format may be read via the external interface of the first operating system or the second operating system. Considering a service magnitude required to be processed, the second operating system may be responsible for dynamic resource scheduling of the embedded system. When acquiring the rule updating configuration file, the rule updating configuration file may be acquired via the external interface of the second operating system.

For example, the load balancing policy module may be in a fixed format, or may be configured via the external interface of the Linux system, for example, the configuration file (load_balance.config) in the specific format may be defined, and configuration modification may be performed by file reading and writing.

It is to be noted that, the external interface is an external interface of the multi-core processor, and may be a network interface, a Serial Peripheral Interface (SPI) controller interface, or a UART serial port, as long as the data may be acquired from external devices via this interface. There are different implementation solutions for hardware and specific file positions used for file reading. For example, the configuration file may be loaded from an interface of a World Wide Web (Web) through a network interface; the configuration file may be read from a SPI Flash of a board card through an SPI controller; and the configuration file may be acquired from a serial port data transmission and receiving software tool on another Personal Computer (PC) through an UART serial port.

By virtue of the embodiment, the configuration flexibility of the resource dynamic allocation rule may be improved by acquiring the rule updating configuration file and using the acquired rule updating configuration file to update the rule structure body.

In an exemplary embodiment, the group of services to be allocated may be allocated to the corresponding operating systems in the embedded system according to the resource dynamic allocation rule by performing the following operation S31.

At operation S31, services having service response speed requirements greater than or equal to a set response speed threshold in the group of services to be allocated are allocated to the first operating system, and services having service response speed requirements less than the set response speed threshold in the group of services to be allocated are allocated to the second operating system.

When allocating the services to be allocated, the services to be allocated may be allocated to the corresponding operating systems based on the service response speed requirements of the services to be allocated. The service response speed may be configured to evaluate the real-time levels of the services. When the service response speed requirement is higher, the services are more sensitive to the scheduling time and response speed of the operating systems, and the real-time levels are higher. The services with high service response speed requirements needs the operating system to process with a speed fast enough, and the processing result may also control a production process within a specified time or make a rapid response on the processing system; and the services with low service response speed requirements have certain tolerance for scheduling delays.

The services having service response speed requirements greater than or equal to the set response speed threshold are sensitive to the scheduling time and response speed of the operating systems, such that such services to be allocated may be allocated to the first operating system (for example, the real-time services are allocated to the RTOS). The services having service response speed requirements less than the set response speed threshold are services that are not sensitive to the scheduling time and response speed, such that such services to be allocated may be allocated to the second operating system (for example, the non-real-time services are allocated to the non-RTOS). Herein, the service response speed requirement may be indicated by an indication parameter of the service response speed. The set response speed threshold may be a millisecond-level response speed threshold or a second-level response speed threshold, such as 100 ms, 200 ms, 1 s, etc., and the set response speed threshold is not limited in the embodiments.

In some exemplary implementations, when allocating the group of services to be allocated to the corresponding operating systems in the embedded system, a first service list corresponding to the first operating system and a second service list corresponding to the second operating system may be outputted. The first service list is used for recording the services that are allocated to the first operating system; and the second service list is used for recording the services that are allocated to the second operating system. That is to say, the service allocation result includes the first service list and the second service list, and the outputted first service list and second service list may be used for performing the dynamic scheduling process of the processing resources of the processor.

For example, the real-time levels of the services of the system are divided, so as to obtain a real-time service list and a non-real-time service list. Assuming that there are 20 services in total, the real-time services are Service 1 and Service 2, and the non-real-time services are Service 3 to Service 20.

Herein, the service management module may classify the services to be currently executed. When a BMC system runs for the first time, since all the services that are about to be run currently by the system are known to the system, the service management module performs one-time classification on these services according to the output of the load balancing module. After classification, different services are allocated to different operating systems (the RTOS and the Linux system) for execution. In the subsequent running process, when the number of the service processes changes (for example, when some processes are hung up, or there are new processes started), the service management module continues to perform service division, so as to divide and manage the existing services in real time according to a load balancing policy. The service management module may be a resident process in the Linux system; and the service management module is always running, and manages and divides the current running processes.

By virtue of the embodiment, the timeliness of service response of the services sensitive to the scheduling time may be guaranteed by allocating the services to be allocated to the corresponding operating systems according to the service response speed requirements.

In an exemplary embodiment, the group of services to be allocated may be allocated to the corresponding operating systems in the embedded system according to the resource dynamic allocation rule by executing the following operation S41.

At operation S41, services having service resource occupation rates less than a first occupation rate threshold in the group of services to be allocated are allocated to the first operating system, and services having service resource occupation rates greater than or equal to the first occupation rate threshold in the group of services to be allocated are allocated to the second operating system.

When allocating the services to be allocated, the services to be allocated may be allocated to the corresponding operating systems based on the service resource occupation rates of the services to be allocated. The service resource occupation rate may be an average proportion (for example, a CPU occupation rate of every minute) that a service occupies the processing resources per unit of time. The level of the service resource occupation rate affects the response speed of the current service and the response speed of the subsequent services. Therefore, the real-time levels of the services may be evaluated based on the service resource occupation rates. When the service resource occupation rates are higher, the impact of the services on the scheduling time and response speed of the operating systems is larger, and the real-time levels are lower. For the services of which service resource occupation rates are not high, the impact of the services on the scheduling time and response speed of the operating systems is not large, and the real-time levels are higher.

For the services to be allocated of which service resource occupation rates are less than the first occupation rate threshold, the impact of the services on the scheduling time and response speed of the operating systems is not large, such that such services to be allocated may be allocated to the first operating system. For the services to be allocated of which service resource occupation rates are greater than or equal to the first occupation rate threshold, the impact of the services on the scheduling time and response speed of the operating systems is large, such that such services to be allocated may be allocated to the second operating system. Herein, the first occupation rate threshold may be configured according to needs, which may be 10%, 15%, 20% or other thresholds. In addition, the first occupation rate threshold may be dynamically adjusted.

By virtue of the embodiment, the timeliness of service response of the services with low service resource occupation rates may be guaranteed by allocating the services to be allocated to the corresponding operating systems according to the service resource occupation rates.

In an exemplary embodiment, the group of services to be allocated may be allocated to the corresponding operating systems in the embedded system according to the resource dynamic allocation rule by executing at least one of the following operations S51 and S52.

At operation S51, services, whose service coupling degree with services allocated to the first operating system is greater than or equal to a first coupling degree threshold, in the group of services to be allocated are allocated to the first operating system.

At operation S52, services, whose service coupling degree with services allocated to the second operating system is greater than or equal to a second coupling degree threshold, in the group of services to be allocated are allocated to the second operating system.

When allocating the services to be allocated, the services to be allocated may be allocated to the corresponding operating systems based on the service coupling degree of the services to be allocated. The service coupling degree may be used for indicating an association degree between the services to be allocated and the allocated services in each operating system. When one service to be allocated has a higher service coupling degree with the allocated services in the operating system, the service is not suitable for being allocated to another operating system. Therefore, the services to be allocated may be allocated to the corresponding operating systems based on the service coupling degree between the services to be allocated and the allocated services in each operating system.

In some exemplary implementations, the service coupling degree may be evaluated based on the association between the input and the output of the services. The service coupling degree may be represented by different coupling degree levels. When there is no relationship between the input and the output of the services, the coupling degree level is low (or other coupling degree levels that indicate no association between the services). When the execution of one service depends on the output of another application (the service cannot be started when there is no such output as the input of this service), the coupling degree level between the services is high. When the execution of one service uses the output of another application, but the output does not prevent the normal execution of the service (the service may run normally as long as the output may be acquired when the service is executed to a corresponding operation, and the corresponding operation is not a core operation), the coupling degree level between the services is medium. In addition, the service coupling degree may also be represented by using values. The service coupling degree may be evaluated based on one or more coupling degree conditions (for example, the association relationship between the input and the output), and the value corresponding to the met coupling degree condition is determined as the value of the service coupling degree.

When there are services to be allocated in the group of services to be allocated that have a service coupling degree with the allocated services of the first operating system greater than or equal to the first coupling degree threshold, such services to be allocated may be allocated to the first operating system; and when there are services to be allocated in the group of services to be allocated that have a service coupling degree with the allocated services of the second operating system greater than or equal to the first coupling degree threshold, such services to be allocated may be allocated to the second operating system.

For example, in addition to generating the real-time service list and the non-real-time service list, the service management module is also responsible for service decoupling evaluation and management, that is, the services that may be separated out to hand over to the RTOS for running are found from all the real-time services, so as to allow the hardware resource dynamic allocation module to perform re-allocation of the processor resources; and for the services that cannot be separated out to hand over to the RTOS for running, when the services have a high service coupling degree with the non-real-time services, the services may be allocated to the non-RTOS.

Herein, although some services have real-time requirements, the services frequently interact with other non-real-time services in the system (that is, the service coupling degree is high). In this case, in order to improve overall data interaction efficiency, such services may be allocated to the non-RTOS. There is another type of real-time services that are relatively independent, and in this case, the services are allocated to the RTOS. The process is a "decoupling" operation. There is no single criterion for determining the independence of the services, and the feasible criterion may be the closeness of the association between the services or indicators that are concerned by other users.

The policy of re-allocation is open. One possible policy includes: when the system runs for the first time, the processor cores are allocated according to the ratio between the number of services that are allocated to the RTOS by the service management module and the number of services that are allocated to the non-RTOS by the service management module, and in the subsequent process, resource allocation may be adjusted according to the respective core resource occupation rates in the dual systems. From this point of view, the re-allocation process and the core occupation and releasing process are processes that cooperate with each other.

In an exemplary implementation, services running on the first operating system may, but are not limited to, include a generation service of a hardware interface signal. The present implementation provides a process of generating the hardware interface signal. The process includes the following operations S1 to S3.

At operation S1, a request command is acquired by the first operating system. Herein, the request command may be a generation command of the hardware interface signal. For example, the hardware interface signal may be a Platform Environment Control Interface (PECI) signal, then the request command is a PECI request command based on a PECI protocol. The hardware interface signal may alternatively be a hardware interface signal of other protocol types, such as a High Definition Multimedia Interface (HDMI) signal, a Reduced Gigabit Media Independent Interface (RGMII) signal, a Serial Gigabit Media Independent Interface (SGMII) signal, a General-Purpose Input/Output (GPIO) signal, a Serial Peripheral Interface (SPI) SPI, etc. Based on this, the request command may alternatively be a request command of other protocol types. For example, when the hardware interface signal is the GPIO signal, the request command is a GPIO request command. Specific types of the request command and the hardware interface signal are not particularly limited in the embodiments of the present disclosure.

At operation S2, a plurality of pieces of logical bit information corresponding to the request command are determined.

In operation S2, after the first operating system obtains the request command, the plurality of pieces of logical bit information corresponding to the request command may be obtained through analysis. There is a sequential order among the plurality of pieces of logical bit information. The first operating system may generate a waveform signal (i.e., the hardware interface signal) corresponding to the request command according to the plurality of pieces of logical bit information corresponding to the request command, such that information included in the request command is transmitted to other devices through the hardware interface signal.

In some exemplary implementations, the request command includes at least one field, and each field may be represented by a logical bit 0 or 1. Based on this, a corresponding conversion relationship between each field and the logical bit 0 or 1 is the logical bit information corresponding to the field. When the request command corresponds to a plurality of fields, the request command corresponds to a plurality of pieces of logical bit information. In addition, each logical bit may be represented by a combination of a high-level signal and a low-level signal. For example, the logical bit 0 may be represented by the combined use of the high-level signal with a first preset duration and the low-level signal with a second preset duration; and the logical bit 1 may be represented by the combined use of the high-level signal with the second preset duration and the low-level signal with the first preset duration. The first preset duration is different from the second preset duration. Based on this, since each logical bit includes both the high-level signal and the low-level signal, each logical bit is actually represent by a segment of waveform signal (the transformation between the high-level signal and the low-level signal is presented as a waveform). Since the request command corresponds to a plurality of pieces of logical bit information, that is, corresponding to a plurality of logical bits, the hardware interface signal corresponding to the request command is the waveform signal that is obtained by combining the waveform signal corresponding to each logical bit.

At operation S3, the hardware interface signal corresponding to the request command is generated according to the plurality of pieces of logical bit information and a timer.

In some exemplary implementations, the timer in operation S3 may be a timing program in the first operating system. The timer may alternatively be a register on a chip where the first operating system is located. The timer may provide at least a timing function and a counting function. In the embodiments of the present disclosure, the hardware interface signal corresponding to the request command is generated by using the timing function and the counting function of the timer, in combination with the plurality of pieces of logical bit information.

Taking the chip being a BMC chip and the hardware interface signal being a PECI signal as an example, in the related art, in order to achieve a PECI communication between the BMC chip and a component such as a CPU, the BMC chip is required to have the hardware logic design of a PECI controller in the related art, causing the problem of high design cost of the BMC chip. In other words, in the related art, in order to generate the PECI signal on the BMC chip, the hardware logic design of the PECI controller has to be realized in advance on the BMC chip. In the embodiments of the present disclosure, the PECI signal may be generated on the BMC chip by only the first operating system, without the need of realizing the hardware logic design of the PECI controller on the BMC chip, such that the design difficulty and design cost of the BMC chip may be reduced.

Based on the above operations, the manner of generating, by the first operating system, the hardware interface signal corresponding to the request command is used in the present implementation, so that the request command is first acquired through the first operating system, then the plurality of pieces of logical bit information corresponding to the request command are determined, and finally, the hardware interface signal corresponding to the request command is generated according to the plurality of pieces of logical bit information and the timer.

From the above content, it may be learned that, in the present implementation, the hardware interface signal corresponding to the request command is generated by the first operating system, such that the technical effect of simulating the generation of the hardware interface signal in a software manner may be realized. Therefore, the purpose of using a software system to generate the hardware interface signal without the need of performing hardware logic design of the hardware interface signal on the chip may be achieved, and the design difficulty of the chip and the design cost of the chip may be reduced.

In some exemplary implementations, when a first request triggered by the second operating system is detected by the first operating system, request data is acquired. The first operating system and the second operating system run on the same processor. The request data is generated by the second operating system, wherein a service response speed of the second operating system is less than a service response speed of the first operating system. Finally, the request data is analyzed by the first operating system, so as to obtain the request command.

In some exemplary implementations, before the request data is acquired, the request data may be stored in a target memory (i.e., the storage space on the processor) by the second operating system; and after the request data is stored, the first request is triggered by the second operating system. The first request is used for notifying the first operating system to read the request data from the target memory; and the target memory is a memory that may be accessed by both the first operating system and the second operating system.

In an exemplary embodiment, the first operating system may also receive response data corresponding to the hardware interface signal. A transmission mode of the response data is the same as a transmission mode of the hardware interface signal. Further, the first operating system may adjust a data structure of the response data to a second data structure.

In addition, after the data structure of the response data is adjusted to the second data structure, a second request is triggered by the first operating system. The second request is used for notifying the second operating system to read the response data.

For example, the first operating system is the RTOS and the second operating system is the Linux system, and the hardware interface signal is the PECI signal. In view of a command request process, an upper-layer application (such as fault diagnosis and CPU temperature acquisition) related to a PECI service involved in the Linux system first actively initiate PECI request commands according to needs. These request commands include, but are not limited to, a basic Ping( ) command, a command for acquiring CPU temperatures, and a command for reading Machine Specific Register (MSR) information. Code implementation of different PECI request commands is completed by corresponding interface functions.

In some exemplary implementations, the Linux system writes the request data, such as a target address, reading and writing lengths, a command code and a para parameter, of each request command into the target memory according to PECI protocol specifications. After the request data is completely written into the target memory, the Linux system generates the first request to notify the RTOS to read the request data. The first request may be an SGI request (a communication interrupt request between the processor cores).

It is to be noted that, during the process that the request data is stored in (written into) the target memory by the second operating system, the second operating system stores the request data in the target memory according to the form of a first data structure. The first data structure at least includes a device address, a writing length, a reading length, a command code and a request parameter. The device address is used for representing the address of a target device, and the target device is a device that generates the response data according to the hardware interface signal. The command code is used for distinguishing different request commands. The writing length is used for representing the number of bytes from the start of the command code to the end of the request data. The reading length is used for representing the number of bytes in the request data including a completion code and read data. The request parameter is used for representing a parameter of the request command.

In view of a command response process, the response data transmitted from a PECI bus is received by the RTOS; then data analysis is completed, so as to convert a signal form of the response data from the form of the hardware interface signal into the form of a software signal. For example, a waveform change between the high-level signal and the low-level signal in the hardware interface signal is identified, so as to obtain the corresponding logical bit information, and software signal data is obtained based on the logical bit information. The analyzed response data is adjusted by a command parameter structured module and written into the target memory. After the analyzed response data is completely written, the RTOS triggers the second request to notify the Linux system to read the response data. The Linux system detects the second request, proactively reads the analyzed response data that is stored in the target memory, and returns the data to the upper-layer application after processing the response data. The second request may be an SGI request.

The target memory may be a memory other than the shared memory, for example, the target memory may be an RAM and a Flash.

In an exemplary embodiment, after the hardware interface signal corresponding to the request command is generated according to the logical bit information and the timer, the first operating system may convert the voltage of the hardware interface signal, so as to obtain a target hardware interface signal.

In some exemplary implementations, the first operating system may input the hardware interface signal into a voltage converter, so as to obtain the target hardware interface signal outputted by the voltage converter. The voltage converter may be a CPLD, and the CPLD may be connected to the target device. The target device may be a CPU in a server. It is to be noted that, in addition to being applied to generate the PECI signal in place of the PECI, the service may also be applied to other hardware interfaces.

From the above content, it may be learned that, the first operating system and the second operating system of the embedded system are combined, and the interaction between the data in the embedded system is realized by means of inter-core interrupts and memory sharing. A waveform generation function module of the request command is provided in the RTOS, and the communication of the hardware interface signal between the embedded system and an external device is realized by means of software simulation. In addition, the accuracy of a time sequence when a request command waveform is simulated is guaranteed by fully using the high real-time characteristic of the RTOS, such that flexible and efficient characteristics may be realized. Therefore, the design difficulty of the chip may be significantly reduced. Since the software is used to simulate the generation of the hardware interface signal, more possibilities are provided for optimized design between communication functions and other service functions in the embedded system. Moreover, since a controller in the chip that is particularly used to achieve the communication of the hardware interface signal is omitted, the design cost and manufacturing cost of the chip may be reduced.

In an exemplary implementation, the services running on the first operating system may, but are not limited to, include a serial port switching service. The present implementation provides a process of switching a serial port. The process includes the following operations S1 to S2.

At operation S1, when it is detected that the second operating system receives a serial port switching command, the serial port switching command is sent to the first operating system by the second operating system.

In some exemplary implementations, when a use initiates serial port switching, whether a serial port switching command initiated by the user is received may be detected by the second operating system. It is to be noted that, the serial port switching command needs to include information about a target serial port to be switched to. For example, the serial port switching command includes a serial port number of a target serial port to be switched to.

In an exemplary example, the format of the serial port switching command may be <switch_command_app −n number −t sleep_time>, where switch_command_app represents a switching command program; −n represents a target serial port number to be switched to; the value of number may be 1, 2 or 3; −t represents a dormancy duration, starting from the initiation of the command, before a switching action can be executed; and sleep_time is in seconds.

It is to be noted that, when serial port switching is implemented, serial ports that may currently perform serial port switching may be numbered, so as to switch to the target serial port according to the serial port number when serial port switching is performed subsequently.

In an exemplary embodiment, the serial ports that may currently perform serial port switching include: a BMC Linux system serial port, a server Basic Input Output System (BIOS) serial port, and a smart Network Interface Controller (NIC) serial port. Correspondingly, for example, 1 may represent the BMC Linux system serial port; 2 may represent the server BIOS serial port; and 3 may represent the SMART NIC serial port.

At operation S2, serial port switching is executed by the first operating system according to the serial port switching command.

In some exemplary implementations, when it is detected that the second operating system receives the serial port switching command, the second operating system immediately sends the serial port switching command to the first operating system. It is to be noted that, the first operating system and the second operating system may respectively run in two processor cores, and inter-core communication may be conducted between the first operating system and the second operating system. In this way, the reliability of signal transmission may be improved.

It is to be noted that, the response speed of the first operating system to the serial port switching command is much faster than the response speed of the second operating system to the serial port switching command. In this way, the serial port switching command may be rapidly responded by the first operating system, and a switching operation is completed by the first operating system within a very short time.

To sum up, the first operating system and the second operating system that run in the same processor may achieve a serial port switching software function in place of the CPLD or the FPGA. When the second operating system receives the serial port switching command, the serial port switching command is forwarded to the first operating system by the second operating system; and the first operating system implements serial port switching according to the serial port switching command. Compared with the method in the related art in which the serial ports need to be connected together through the CPLD or the FPGA, and serial port switching is implemented by means of using switch structures in the CPLD or the FPGA, hardware costs may be reduced by using the solution provided in the embodiment of the present disclosure. In addition, after the first operating system receives the serial port switching command, serial port switching may be rapidly completed within a very short time. Therefore, by means of the technical method proposed in the present solution, the cost of serial port switching may be effectively reduced, and the efficiency of serial port switching may also be effectively improved.

In order to enable the second operating system to implement serial port switching, during a serial port switching process provided in the present implementation, the serial port switching command includes at least the serial port number of the target serial port. Before serial port switching is executed by the first operating system based on the serial port switching command, the method includes the following operations: the first operating system acquires an analysis rule of the serial port switching command from a target memory, and analyzes the serial port number of the target serial port in the serial port switching command according to the analysis rule, so as to determine a device corresponding to the serial port number. The target serial port is a serial port of the device, and the target serial port is connected in the chip.

The operation of executing serial port switching by the first operating system according to the serial port switching command includes: determining a serial port address of the device by the first operating system; and mapping the target serial port to a target output interface of the chip according to the serial port address.

In order to enable the first operating system to implement serial port switching, the first operating system may analyze the serial port switching command, so as to obtain the device corresponding to the target serial port.

In an exemplary embodiment, the analysis rule of the serial port switching command may be customized according to different chips or server mainboards, and may be saved in the target memory. The target memory may be a storage medium such as an Electrically Erasable Programmable Read Only Memory (EEPROM) and a non-volatile memory (flash). It is to be noted that, the target memory may or may not be deployed inside the chip. The safety of the data may be improved by storing the analysis rule in the target memory. In addition, the analysis rule may be customized according to different chips or server mainboards, such that better programmability and extendibility may be achieved.

After receiving the serial port switching command, the first operating system reads the analysis rule of the serial port switching command from the target memory, and then analyzes the serial port number of the target serial port in the serial port switching command by using the analysis rule, so as to obtain the device corresponding to the serial port number.

After the device corresponding to the serial port number is obtained, the first operating system may map the target serial port to the target output interface of the chip according to the serial port address of the device. After the serial port address of the device is mapped to the target output interface, the device may be accessed via the target output interface. It is to be noted that, the serial port switching command and the analysis rule may be set according to the type of the used chip and the types of the first operating system and the second operating system.

In the serial port switching method provided in Embodiment I of the present disclosure, the chip includes a serial data bus. Before the serial port address of the device is determined by the first operating system, the method may further include: determining a plurality of devices connected to serial ports of the serial data bus; and mapping the serial port of each device to the memory of the chip through the serial data bus, so as to obtain the serial port address of each device.

In some exemplary implementations, the chip may further include a serial data bus. TX and RX of the serial ports of a plurality of devices are connected to the serial data bus, for example, the current serial port may include the BMC Linux system serial port (Universal Asynchronous Receiver/Transmitter (UART)1), the server BIOS serial port (UART2), and the SMART NIC serial port (UART3), where UART refers to Universal Asynchronous Receiver/Transmitter. The serial data bus maps TX and RX data of UART1, UART2 and UART3 into different address spaces of a BMC memory. That is to say, the serial port of each device is mapped into the memory of the chip through the serial data bus. For example, UART1 TX and RX buffer are serial port addresses of the serial port UART1; UART2 TX and RX buffer are serial port addresses of the serial port UART2; and UART3 TX and RX buffer are serial port addresses of the serial port UART3.

When the user sends a serial port switching command, the first operating system (for example, RTOS) selects three different segments of memory (one out of three) to which the UART is to be mapped, and interacts one segment of memory data to a client, so as to achieve the purpose of simulating a CPLD hardware serial port switching circuit. It is to be noted that, when the serial ports of different devices cannot be distinguished, a developer cannot accurately position which device has the defective serial port during maintenance, therefore the positioning of abnormities needs to be implemented through serial port switching.

In the present implementation, after the target serial port is mapped to the target output interface of the chip according to the serial port address, when the target output interface is connected to a target smart network card, the method includes the following operations: detecting, through a smart network card, whether a request for accessing the target serial port is received; and when the request for accessing the target serial port is received, forwarding the request for accessing the target serial port to the target serial port through the smart network card.

In some exemplary implementations, the target output interface of the chip may also be connected to the target smart network card, then whether the user's request for accessing the target serial port is received is detected through the smart network card; and when the request for accessing the target serial port is received, an access to the target serial port of the device may be directly implemented through the target smart network card, so as to realize a Serial over LAN (SOL) function. By means of the above operations, efficiency of serial port access to the devices may be improved.

In an exemplary embodiment, after the target serial port is mapped to the target output interface of the chip according to the serial port address, the method may further include the following operation: acquiring an execution result of the serial port switching command by the first operating system, where the execution result indicates that switching succeeds or switching fails; and sending the execution result to the second operating system by the first operating system.

The execution result of the serial port switching command is received by the second operating system. The execution result is sent from the first operating system to the second operating system. The execution result indicates that serial port switching succeeds or serial port switching fails. After switching the serial port, the first operating system acquires the execution result of the serial port switching command, and then feeds back the execution result of the serial port switching command to the second operating system, so as to notify the second operating system whether serial port switching succeeds or fails.

In order to improve the success rate of serial port switching, in the present implementation, after the execution result of the serial port switching command is received by the second operating system, the method may further include: when the execution result indicates that the serial port switching fails, repeatedly executing the operation of sending the serial port switching command to the first operating system by the second operating system, until the execution result indicates that the serial port switching succeeds, or the number of times for executing serial port switching exceeds a preset number of times. When the number of times for executing serial port switching exceeds the preset number of times, a prompt signal is triggered by the second operating system. The prompt signal is used for prompting that serial port switching has failed.

When the execution result of the serial port switching command indicates that the serial port switching fails, the operation of sending the serial port switching command to the first operating system by the second operating system needs to be repeatedly executed, until the execution result indicates that the serial port switching succeeds, or the number of times for executing serial port switching exceeds a preset number of times, where the preset number of times may be set to 3. When the number of times for executing serial port switching exceeds the preset number of times, the prompt signal is accordingly triggered by the second operating system, so as to prompt that serial port switching has failed, so that such situation may be processed in time.

Before it is detected that the first operating system receives the serial port switching command, the method may further include: after the starting of the second operating system is completed, triggering a first interrupt by a second processor core, and sending a first signal to the first operating system; detecting running states of the plurality of serial ports in the chip by the first operating system according to the first signal, so as to obtain a detection result; triggering a second interrupt by a first processor core, and sending the detection result to the second operating system through a second signal; and receiving the detection result by the second operating system, so as to determine the number of the serial ports that normally run in the chip.

After the first interrupt is triggered by the second processor core, and the first signal is sent to the first operating system, whether the first operating system receives the first signal is detected; when the first operating system receives the first signal, the running states of the plurality of serial ports in the chip are detected by the first operating system, so as to obtain the detection result.

After the starting of the second operating system is completed, the second processor core triggers a first interrupt (e.g., Inter-Processor Interrupt (IPI)) to send the first signal to the first operating system; the first operating system may learn, from the first signal, that the second operating system has started normally, and that the first operating system may normally interact with the second operating system; and the first operating system detects the running states of the plurality of serial ports in the chip according to the first signal, so as to determine whether all the serial ports run normally.

After the first operating system obtains the detection result through detection, the first processor core triggers a second interrupt to send the detection result to the second operating system through the second signal; and the second operating system determines, according to the detection result, the number of the serial ports that may be switched (that is, the number of the serial ports that run normally), so as to perform serial port switching on these serial ports. In addition, in order to enable the first operating system to realize serial port switching more rapidly, after the first operating system completes the detection, the first operating system starts blocking and waits for receiving the serial port switching command sent by the second operating system.

In an exemplary embodiment, when the first operating system is an RTOS and the second operating system is a Linux, the first operating system runs on CPU0, and the second operating system runs on CPU1. A preparation operation before serial port switching includes: when the Linux system on the CPU1 is started to a specific phase, triggering the IPI by the CPU1 to notify the RTOS on the CPU0 that the Linux has normally started and that the RTOS system may normally interact with the Linux on the CPU1; starting, by the RTOS, a serial port switching controller program after receiving the IPI from the CPU1, so as to check whether the UART1, UART2 and UART3 are normal; then triggering the IPI again by the CPU0 to notify the Linux operating system on the CPU1 that the RTOS has started and at the same time reports information including the number of switchable serial ports owned by the RTOS on the CPU0; and then starting blocking of the RTOS on the CPU0, and waiting for receiving the switching command sent by the operating system on the CPU1.

When the second operating system runs abnormally, the serial port switching command is sent to the first operating system through a service terminal; and serial port switching is executed by the first operating system based on the serial port switching command.

Due to the fact that the second operating system runs more functions and takes on a larger volume of services, abnormal running or restarting may exist. When the second operating system runs abnormally, the serial port switching command may be directly sent to the first operating system through the service terminal, so as to ensure that the first operating system executes serial port switching normally. It is to be noted that, the service terminal may be a terminal on the server where the chip is located.

By means of the above operations, it is ensured that the first operating system implements serial port switching without relying on the second operating system, such that the independence of the first operating system on executing serial port switching may be improved.

To sum up, during the serial port switching process provided in the present implementation, a serial port switching software function may be achieved by using the first operating system and the second operating system that run in the same processor in place of the CPLD or the FPGA. When the second operating system receives the serial port switching command, the serial port switching command is forwarded to the first operating system by the second operating system; and the first operating system implements serial port switching according to the serial port switching command, so as to prevent the use of hardware to implement serial port switching, such that hardware costs may be reduced. In addition, after the first operating system receives the serial port switching command, serial port switching may be rapidly completed within a very short time. Therefore, the above process may not only effectively reduce the cost of serial port switching, but also effectively improve the efficiency of serial port switching.

By virtue of the embodiment, the accuracy of service processing for a plurality of services with high service coupling degrees may be guaranteed by allocating the services to be allocated to the corresponding operating systems according to the service coupling degrees.

In an exemplary embodiment, the operation of allocating the group of services to be allocated to the corresponding operating systems in the embedded system according to the resource dynamic allocation rule includes the following operation S61.

At operation S61, services, that include sensitive information, in the group of services to be allocated are allocated to a target operating system. The target operating system is an operating system, that has a lower frequency of interaction with a use object, in the first operating system and the second operating system.

In the embodiment, the services to be allocated (which may be important and sensitive services, for example, services that are required not to be exposed to the users) including sensitive data (for example, sensitive information such as passwords) may be allocated to the target operating system, so that the target operating system may provide hard core level security isolation for the services to be allocated including the sensitive information. Herein, the target operating system may be an operating system, that has a lower frequency of interaction with a use object, in the first operating system and the second operating system, or an operating system with a fast response speed, for example, the first operating system.

For example, a service processing module is responsible for further performing hard core level security isolation on system services, that is, the important and sensitive services (which do not want to be exposed to the users) are classified as the real-time services, so that finally, the services are unloaded from the non-RTOS to the RTOS, so as to achieve the effect of security protection. Herein, different services divided by the service processing module may be organized in the form of structure bodies during software implementation. By designing a safe space between the heterogeneous operating systems, the sensitive services are unloaded from the non-RTOS to the RTOS, so as to achieve the purpose of hard core level security protection. Herein, the sensitive services refer to the services related to security, for example, the services involving user privacy such as user passwords and identity information.

Herein, hard core level isolation means that isolation is performed on the services at a processor core level, that is, the sensitive services are allocated to the RTOS (the cores occupied by the RTOS are different from that occupied by the non-RTOS, belonging to the isolation at a core level). Compared with the non-RTOS, the RTOS is relatively weak in frequency and degree of interaction with the users, such that it is hard for the users to "detect" the sensitive data generated by the services running thereon. For the upper-layer application, services such as identity management of the users and security encryption belong to the important sensitive services. The services are forcibly classified as the real-time services by the service management module, such that the services may run on the RTOS when hardware resource dynamic allocation is performed subsequently, so as to achieve the security isolation effect.

By virtue of the embodiment, by allocating the services to be allocated including the sensitive information to the operating system that is low in frequency of interaction with the users, hard core level security isolation may be performed on the system services, thereby improving the safety of service execution.

In an exemplary embodiment, the operation of determining the resource allocation results corresponding to the group of services to be allocated includes the following operation S71.

At operation S71, according to the allocation result of the group of services to be allocated, in combination with resource utilization of the processing resources of the first operating system and resource utilization of the processing resources of the second operating system, the resource mapping table of the group of services to be allocated and the processing resources of the processor is generated.

In the embodiment, the allocation result of the group of services to be allocated is configured to indicate the correspondence relationship between the services to be allocated and the operating systems. The services to be executed that are allocated to the operating system are generally executed by using the processing resources of the operating system; and when a service volume allocated to the operating system is excessive and there is no unallocated processing resource currently, the unallocated processing resources may also be allocated to the services to be allocated that are allocated to the operating system. Therefore, according to the allocation result of the group of services to be allocated, in combination with resource utilization of the processing resources of the first operating system and resource utilization of the processing resources of the second operating system, the resource mapping table of the group of services to be allocated and the processing resources of the processor may be generated, so as to indicate the processing resources that are allocated to each service to be allocated.

Herein, each service to be allocated only has a mapping relationship with the processor core, and the same processor core may have a mapping relationship with a plurality of services to be allocated. Different services may have a mapping relationship with the same processor core through different time slices occupying the same processor core. At the same time, the same processor core is only occupied by one service, that is, only configured to execute one service. Different services allocated to one operating system may determine the time slice occupying the same processor core according to the allocation time, the service response speed requirement, or other manners.

For example, the resource dynamic allocation module performs dynamic adjustment on the processor resources according to an output result of the service management module, so as to form the resource mapping table of different services and actual hardware resources; and the deployment structure of different hardware resources under the heterogeneous operating system is optimized, so as to achieve the purpose of improving a full system hardware resource utilization rate. The above resource dynamic allocation process is managed and configured by the software in the second operating system.

Using an eight-core processor (Core 1 to Core 8) as an example, the processor core that have been scheduled to the first operating system include Core 1; and the processor core that have been scheduled to the second operating system include Core 2, Core 3 and Core 4. There are 6 services to be allocated; the real-time services are Service 1 and Service 2; and non-real-time services are Service 3 to Service 6. The corresponding processor cores are allocated for the 6 services; Core 1 is allocated for Service 1; Core 5 is allocated for Service 2; Core 2 is allocated for Service 3; Core 3 is allocated for Service 4; Core 4 is allocated for Service 5; and Core 6 is allocated for Service 6.

By virtue of the embodiment, the rationality of processing resource allocation may be guaranteed based on the correspondence relationship between the services and the operating systems, in combination with processing resource utilization of different operating systems.

In an exemplary embodiment, the operation of allocating the processing resources of the processor to the first operating system and the second operating system according to the operating system allocation result and the resource allocation result corresponding to each of the group of services to be allocated includes the following operation.

At operation S81, when it is determined, according to the resource allocation results, that unallocated processing resources in the processing resources of the processor correspond to services to be allocated, the unallocated processing resources are allocated to the operating system to which the services to be allocated corresponding to the unallocated processing resources are allocated.

When the processing resources are allocated, if there are services to be allocated corresponding to the unallocated processing resources in the processing resources of the processor, that is, the unallocated processing resources are allocated to the services to be allocated, the unallocated processing resources may be allocated to the operating system to which the services to be allocated corresponding to the unallocated processing resources are allocated.

In some exemplary implementations, the resource adaptive scheduling module may complete the actual scheduling action on the processing resources of the processor according to the resource dynamic allocation result. The resource adaptive scheduling module schedules a part of the processor cores to execute the services that are allocated to the first operating system, for example, M cores of a core group 1 shown in FIG. 4; and the rest of the processor cores are scheduled to run the services that are allocated to the second operating system, for example, N cores of a core group 2 shown in FIG. 4.

By using the eight-core processor as an example, the unallocated Core 4 may be allocated to the first operating system according to the service allocation result and the resource allocation result; and the unallocated Core 5 and Core 6 are allocated to the Linux system. The overall scheduling process may be led by the second operating system.

By virtue of the embodiment, the utilization rate of the processor resources may be improved by scheduling the unallocated processor resources to the corresponding operating systems based on the resource allocation result.

In an exemplary embodiment, the method may further include the following operation.

At operation S91, the processing resources are occupied and released between the first operating system and the second operating system.

In the embodiment, in addition to dynamically allocating the processor resources based on the services to be allocated, during the running of each operating system, the processing resources may be occupied and released between the first operating system and the second operating system based on the use state (load situation) of the processing resources of the operating system. Herein, dynamic allocation of the processing resources may be a resource scheduling mode that is executed by other control logic module other than the first operating system and the second operating system; and the occupation and releasing of the processing resources is a resource scheduling mode that is actively initiated by the first operating system and the second operating system.

Figure 5:
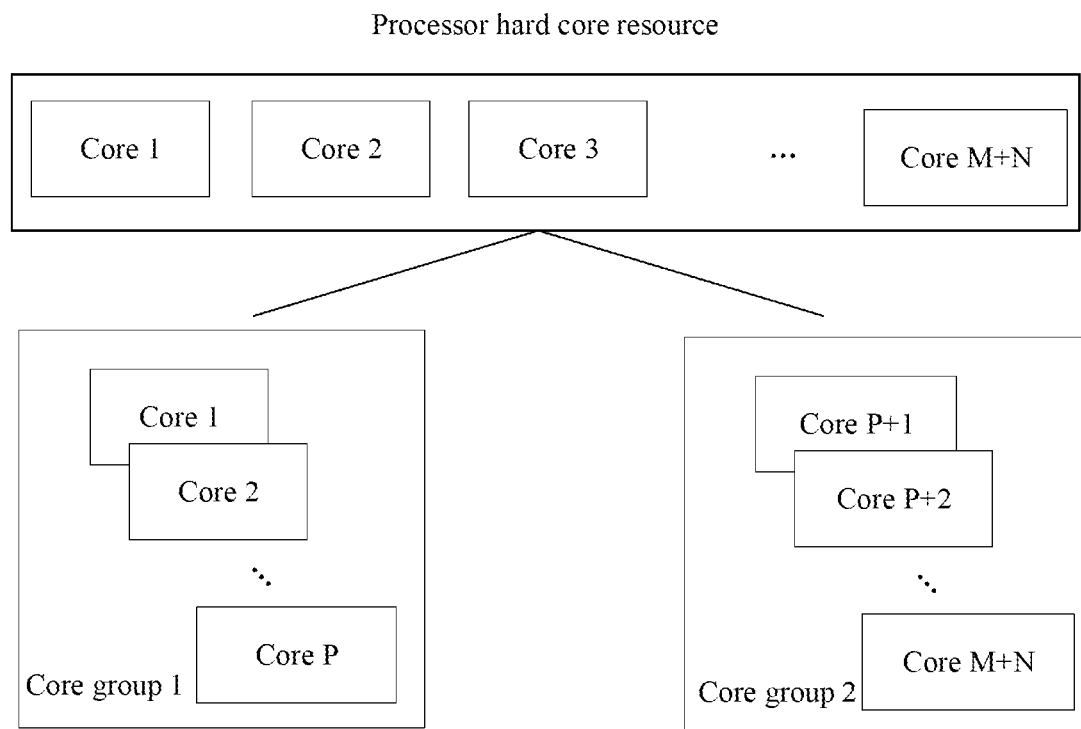
FIG. 5 is a schematic diagram of still another exemplary embedded system running method according to the embodiments of the present disclosure.

In some exemplary implementations, the occupation and releasing of the processing resources may be executed by a core occupation and releasing module. The core occupation and releasing module may be a software module that runs on the first operating system and/or the second operating system. By using running on the first operating system and the second operating system as an example, the core occupation and releasing module is mainly configured to complete dynamic occupation and releasing of the processor cores by the heterogeneous operating system during real-time running of the system, so as to achieve the goal of maximizing the utilization rate of the processor resources. Successful occupation of the resources of one operating system means that the resources of the other system is successfully released; correspondingly, failed occupation of the resources of one operating system means that the releasing of the resources of the other system is failed. As shown in FIG. 5, through occupation and releasing of the cores, P of (M+N) cores are scheduled to the RTOS, and (M+N−P) cores are scheduled to the non-RTOS.

Herein, the core occupation and releasing module may be configured to complete dynamic occupation and releasing of the processing resources such as the processor cores by the heterogeneous operating system during real-time running of the heterogeneous operating system, so as to achieve the goal of maximizing the utilization rate of the processor resources.

Through the embodiment, by performing occupation and releasing of processing resources among different operating systems, the processing resources may be dynamically adjusted based on the load situation of the operating systems during the running of the operating systems, such that the rationality of resource utilization may be improved, and at the same time, the effect of service processing may be improved.

In an exemplary embodiment, the operation of performing occupation and releasing of processing resources between the first operating system and the second operating system includes the following operation.

At operation S101, the processing resources are occupied and released between the first operating system and the second operating system via an inter-core communication interface.

For the solution, in the related art, that the services having requirements for the response speed are executed by a specialized acceleration hardware, a communication bus rate between the processor and the acceleration hardware (for example, the CPU and the FPGA/CPLD) is relatively low, and overall performance is not high. In the embodiment, the processing resources are occupied and released between the first operating system and the second operating system via the inter-core communication interface, that is, a request for occupying the processing resources or a request for requesting to release the processing resources may be sent by one operating system to another system via the inter-core communication interface, so as to occupy or release the processing resources. Compared with the method of performing interaction via a communication bus, the method of performing interaction via the inter-core communication interface inside the processor has a higher communication rate, thereby improving the overall performance of communication.

For example, an inter-core communication interface module may be configured to complete a communication and interaction function between the first operating system and the second operating system. During the occupation and releasing of the cores, an occupation party and a releasing party may notify the respective states (for example, busy and idle states) to each other via the inter-core communication interface; and in addition, a particular signal event is also required to represent the behavior (for example, an occupation behavior) of the heterogeneous operating system. Therefore, using the inter-core communication interface module to occupy and release the cores may maintain a hard core resource balance of the heterogeneous operating system, so as to ensure that the processor has a higher occupation rate.

In some exemplary implementations, the occupation and releasing of the processing resources among different operating systems may be completed by means of an inter-core interrupt, such as the SGI. One operating system sends a resource occupation request (for example, a core occupation request) or a resource releasing request (for example, a core releasing request) to another operating system through the IPI, so as to request to perform occupation or releasing of the processing resources. By using a Linux system as an example, in the Linux system, the inter-core communication may be implemented based on an interrupt event between a customized interrupt vector table and the heterogeneous operating system. Herein, the IPI is an interrupt that is triggered among the plurality of cores in a System on Chip (SOC). Different from conventional external interrupts, the cores may specially reserve a part of interrupt numbers for the IPI, and 16 interrupt numbers 0-15 are on an ARM 64 architecture (a CPU architecture).

In some exemplary implementations, an occupation and releasing process depends on a real-time load situation of the heterogeneous operating system. For example, when the load of the second operating system is increased rapidly and needs to be supported by more processor cores, the second operating system may send a core occupation request to the first operating system by means of the IPI, so as to occupy the processor cores of the first operating system. When the first operating system is currently in an idle state (for example, there is no task to be scheduled) or at least part of the core resources are in the idle states, the first operating system releases the core resources to the second operating system; and in this case, the second operating system successfully occupies the cores, and at the same time, it means that the first operating system successfully releases the cores.

It is to be noted that, the occupation and releasing process is a dynamic cycling process. Each core occupation and releasing is accompanied by the adjustment of the processor hard core resources. As shown in FIG. 5, the number of the cores of a core group 1 that are subjected to occupation and releasing once becomes P, and the number of the cores of the core group becomes M+N−P. In addition, the occupation and releasing process may cooperate with modules such as a load balancing policy module, a service management module, and a resource adaptive scheduling module (for example, core adaptive scheduling) to commonly determine a final core adjustment result.

Herein, that different modules commonly determine the core adjustment result means that when a certain system needs to occupy more core resources, whether the final occupation is successful needs to be commonly determined by the modules such as the load balancing policy module, the service management module, and the resource adaptive scheduling module. For example, in one of the possible scenarios, when the second operating system needs more resources, and although the first operating system is in the idle state (hibernation state), since the first operating system is woken up soon and runs an important service thread, and the thread needs more resources during running, in this case, the first operating system cannot release the core resources to the second operating system. The standard for determining the importance of the services and the operation of not allocating the final resources to the second operating system in this process are all involved in the participation of the modules such as the load balancing policy module, the service management module, and the resource adaptive scheduling module. The respective policies of these module further include the characteristic of openness, which determines that the final core adjustment result commonly determined by the modules is also the result of the combined effect of these policies.

Through the embodiment, the communication rate may be improved by using the inter-core communication interface to perform occupation and releasing of processing resources among different operating systems, thereby improving the overall performance of communication.

In an exemplary embodiment, the operation of performing occupation and releasing of processing resources between the first operating system and the second operating system via the inter-core communication interface includes the following operations.

At operation S111, a first interaction request of the first operating system is transmitted to the second operating system via the inter-core communication interface. The first interaction request is used for requesting to perform resource interaction with the second operating system, and the resource interaction includes at least one of: resource occupation and resource releasing.

At operation S112, a first interaction response that is returned by the second operating system in response to the first interaction request is acquired via the inter-core communication interface. The first interaction response is used for indicating the first operating system to perform the resource interaction with the second operating system according to the first interaction response.

In the embodiment, for the first operating system, considering that most of the services processed by the processor are the services that have low service response speed requirements, correspondingly, there are generally less services processed by the first operating system, such that the first operating system may request to occupy the processing resources of the second operating system via the inter-core communication interface or actively release, to the second operating system, the processing resources occupied by the first operating system. In some exemplary implementations, the occupation and releasing of the processing resources may be performed in a request-response interaction manner.

When the processing resources of the second operating system need to be occupied or the processing resources are actively released to the second operating system, the first operating system may transmit the first interaction request of the first operating system to the second operating system via the inter-core communication interface, so as to request to perform one of the resource interactions in resource occupation and releasing with the second operating system. After the first interaction request is received, the second operating system may determine, based on the self-load situation, whether the first operating system is allowed to occupy at least part of the processing resources of the second operating system or whether the first operating system is accepted to release the processing resources, and return the first interaction response to the first operating system via the inter-core communication interface, so as to cause the first operating system to perform resource interaction with the second operating system according to the first interaction response.

It is to be noted that, the occupation and releasing of the processing resources is the scheduling of the processing resources at an operating system level (that is, negotiation of processing resource scheduling is completed between the first operating system and the second operating system), not actual scheduling of the processing resources. When the processing resources are actually scheduled, the actual scheduling of the processing resources is completed by the resource adaptive scheduling module.

Through the embodiment, resource interaction among different operations is performed in a request-response manner, and the operating system with a fast response speed is allowed to actively release the processing resources to the operating system with a slow response speed, such that the utilization rate of the processing resources may be improved.

In an exemplary embodiment, the method may further include the following operations.

At operation S121, a resource utilization rate of the processing resources of the first operating system is detected.

At operation S122, when it is determined, according to the resource utilization rate of the processing resources of the first operating system, that the resource interaction is performed between the first operating system and the second operating system, the transmission of the first interaction request to the second operating system via the inter-core communication interface is triggered.

In the embodiment, the processing resource occupation and releasing process may depend on the real-time load situation of the heterogeneous operating system. Load detection modules for detecting a load situation of a system may run in different operating systems, and may belong to system control modules of the current system. A first system control module may run on the first operating system. The load detection module in the system control module may detect the resource utilization rate of the processing resources of the first operating system. The resource utilization rate of the processing resources of the first operating system may be used for representing the load situation of the first operating system. When the resource utilization rate of the processing resources is higher, the system load is heavier; otherwise, when the resource utilization rate of the processing resources is lower, the system load is lighter.

According to the resource utilization rate of the processing resources of the first operating system, whether the first operating system needs to perform resource interaction with the second operating system may be determined. For example, when the current resource utilization rate of one operating system (for example, the first operating system) is too high (reaching a specified utilization rate threshold), or it is determined, according to the services to be executed by one operating system, that the future resource utilization rate of the operating system is too high (reaching the specified utilization rate threshold), it may be determined that the operating system needs to occupy the processing resources of another operating system (for example, the second operating system); and when the resource utilization rate is too low (lower than another specified utilization rate threshold), it may be determined that the operating system needs to release the processing resources to another operating system. In some exemplary implementations, when it is determined that the first operating system waits to perform resource interaction with the second operating system, the operation of transmitting the first interaction request to the second operating system via the inter-core communication interface may be triggered and executed.

Through the embodiment, resource interaction among different operations is performed in a request-response manner, and the operating system with a fast response speed is allowed to actively release the processing resources to the operating system with a slow response speed, such that the utilization rate of the processing resources may be improved.

In an exemplary embodiment, the method may further include at least one of the following operations.

At operation S131, when the resource utilization rate of the processing resources of the first operating system is greater than or equal to a first utilization rate threshold, it is determined that the first operating system is to occupy the processing resources of the second operating system.

At operation S132, when the processing resources of the first operating system are in the idle state and there is no service to be executed by the first operating system, it is determined that the first operating system waits to release the processing resources of the second operating system.

In the embodiment, the threshold of the resource utilization rate of the processing resources of the first operating system may be preset, that is, the first utilization rate threshold. When the resource utilization rate of the processing resources of the first operating system is greater than or equal to the first utilization rate threshold, it may be determined that the current load of the first operating system is too heavy, and the first operating system needs to occupy the processing resources of the second operating system, so as to meet service requirements of the first operating system.

In some exemplary implementations, since the response speed of the first operating system is higher than the response speed of the second operating system, the first operating system is generally configured to process some specified services. However, the triggering of the specified services is random, and the frequencies of the services are generally relatively low, such that the processing resources of the first operating system have a certain probability of being in the idle state, and there is no service to be executed by the first operating system. In this case, it may be determined that the first operating system waits to release at least part of the processing resources to the second operating system.

Herein, when the processing resources of the first operating system are in the idle state, a queue of the services to be executed corresponding to the first operating system may be found. When the queue of the services to be executed is null (that is, there is no service to be executed), it is determined that there is no service to be executed by the first operating system within a certain time range; and when the queue of the services to be executed is not null (that is, there are services to be executed), even though there is no service to be currently executed by the first operating system, the processing resources are not released to the second operating system.

Through the embodiment, the rationality of resource scheduling may be improved by occupying the processing resources when the resource utilization rate of the processing resources is too high and releasing the processing resources when the processing resources are in the idle state and there is no service to be processed subsequently, thereby improving the utilization rate of the processing resources.

In an exemplary embodiment, the method may further include the following operation.

At operation S141, the first operating system is controlled to enter a hibernation state when the first operating system has no service to schedule and there is no service to be allocated to the first operating system.

In the embodiment, the first operating system may run based on the periodicity of the processor; or the first operating system runs based on the processor in response to a received wake-up request; or the first operating system runs based on the processor according to a matching degree between the current operation service generated on the processor and the first operating system. The first operating system may hibernate at the end of running; and during the hibernation of the first operating system, the second operating system adds the processor resources (for example, processor cores) used by the first operating system into a scheduling resource pool (that is, the available resource pool) of the second operating system.

In some exemplary implementations, when the first operating system has no service to schedule and there is no service to be allocated to the first operating system (for example, the resource occupation rate of the first operating system is lower than or is about to be lower than a lower occupation rate set by the first operating system), the active hibernation of the first operating system may be triggered, that is, actively entering the hibernation state. Before the first operating system is controlled to enter the hibernation state, the core resources of the first operating system may be first released to the second operating system (resource releasing may be performed by means of an interrupt request); and system site data of the first operating system may also be saved, for example, the data is pushed into a stack, so as to recover the first operating system to the previous running state based on the saved system site data after the first operating system is woken up.

For example, when there is no service to be scheduled by the first operating system (that is, in the idle state), the first operating system sends a core releasing request to the second operating system. In this case, the core resources of the first operating system are taken over by the second operating system, and the first operating system enters the hibernation state.

In an exemplary application scenario, the first operating system (for example, the RTOS) is periodically woken up for running. The first operating system and the second operating system alternately occupy the same processing resource (which may be the processor core, for example, CPU core 0). The same processing resource may be a first processing resource; and correspondingly, the processing resource of the second operating system may be a second processing resource. Within a time slice in which the first operating system schedules the first processing resource, the second operating system generates an interrupt for taking over the first processing resource at a first moment, causing the first operating system to have to hibernate. In this case, the first operating system saves a site in the stack and hibernates, and then releases the first processing resource to the second operating system for takeover. After the scheduling of the second operating system is completed, an interrupt that the first operating system occupies the first processing resource is generated at a second moment, so as to wake up the first operating system; and the first operating system starts entering, from the moment, a round-robin mode to occupy and schedule the first processing resource.

In the above exemplary application scenario, within a time slice in which the second operating system schedules the first processing resource, the first operating system is currently in the hibernation state. At a third moment, the first operating system may be woken up caused by an interrupt event reported by hardware; the second operating system reserves a process site running on the first processing resource; the first operating system occupies the first processing resource; after the interrupt event reported by the hardware is processed, the first operating system enters the hibernation state again at a fourth moment; at this moment, the first operating system reports the interrupt for releasing the first processing resource to the second operating system; and the second operating system continues to schedule the first processing resource according to a set period, so as to recover a site running process.

In some exemplary implementations, in the embodiment, when the first operating system is in the periodic running, the duration of a single running period may be the same or different from an interval duration between two running periods. Within the interval duration between the two running periods, the first operating system may, but is not limited to, be in the hibernation state; and the processing resources allocated for the first operating system is used by the second operating system. When the duration of the single running period is the same as the interval duration between the two running periods, the first operating system and the second operating system alternately occupy the processing resources allocated for the first operating system with the same duration. When the duration of the single running period is different from the interval duration between the two running periods, the first operating system and the second operating system alternately occupy the processing resources allocated for the first operating system with different durations. The duration occupied by the first operating system may be greater than the duration occupied by the second operating system, or the duration occupied by the second operating system may be greater than the duration occupied by the first operating system.

In an exemplary implementation, for example, the device triggers the first operating system to wake up and run. A wake-up strategy of the first operating system (for example, the RTOS) under the triggered mode is provided. The triggered mode may be initiated by an interrupt initiated by devices at a first operating system bus domain. The first operating system bus domain is connected to the device 0 to device N. When the first operating system is in the hibernation state, assuming that the device 0 triggers the interrupt to the first operating system at a certain moment, the first operating system is then woken up, and the woken first operating system first triggers the interrupt occupying the first processing resource to the second operating system; the second operating system releases the first processing resource after receiving the interrupt, and saves a site (pushing the run data into the stack); then the first operating system schedules the first processing resource to process the operation service indicated by the interrupt triggered by the device 0; and when the system is currently in the round-robin mode, the subsequent processing process is the same as the round-robin mode, such that details are not described herein again.

Through the embodiment, when all the processing resources (for example, core resources) of one operating system have been released to another operating system, and the occupied processing resources are zero, the operating system is controlled to enter the hibernation state. Since the operating system is allowed to release all the processing resources to another system, the utilization rate of the processing resources may be improved.

In an exemplary embodiment, the operation of transmitting the first interaction request of the second operating system to the first operating system via the inter-core communication interface includes at least one of the following operations.

At operation S151, a first occupation request of which interrupt number is a first interrupt number is transmitted to the second operating system via the inter-core communication interface, and the first occupation request is used for requesting to occupy the processing resources of the second operating system.

At operation S152, a resource releasing request of which interrupt number is a second interrupt number is transmitted to the second operating system via the inter-core communication interface, and the resource releasing request is used for requesting to release the processing resources occupied by the first operating system to the second operating system.

In the embodiment, the occupation and releasing of the processing resources among different operating systems may be completed by means of an inter-core interrupt. Different interrupt events may be defined to correspond to different resource interaction types, and different interrupt events may correspond to different interrupt numbers. The interrupt number that is allocated for a first interrupt event that the first operating system requests to occupy the processing resources of the second operating system is the first interrupt number; and the interrupt number that is allocated for a second interrupt event that the first operating system actively release the processing resources to the second operating system is the second interrupt number.

As an exemplary implementation, the first interaction request may be a first occupation request, that is, a request used for requesting to occupy the processing resources of the second operating system. The first operating system may transmit the first occupation request of which interrupt number is the first interrupt number to the second operating system via the inter-core communication interface, that is, a trigger source of an inter-core communication interrupt of which interrupt number is the first interrupt number is the first operating system, and a response source is the second operating system; and the inter-core communication interrupt means that the first operating system occupies the processing resources of the second operating system.

As another exemplary implementation, the first interaction request may be a resource releasing request, that is, a request used for requesting to release the processing resources occupied by the first operating system to the second operating system. The first operating system may transmit the resource releasing request of which interrupt number is the second interrupt number to the second operating system via the inter-core communication interface, that is, a trigger source of an inter-core communication interrupt of which interrupt number is the second interrupt number is the first operating system, and the response source is the second operating system; and the inter-core communication interrupt means that the first operating system actively releases the processing resources to the second operating system.

Through the embodiment, by allocating the interrupt numbers used for occupying and actively releasing the processing resources among different operating systems, resource scheduling between the operating systems is performed by means of the inter-core communication interrupt, such that the accuracy of resource scheduling may be improved.

In an exemplary embodiment, the operation of performing occupation and releasing of processing resources between the first operating system and the second operating system via the inter-core communication interface includes the following operations.

At operation S161, a second interaction request of the second operating system is transmitted to the first operating system via the inter-core communication interface, and the second interaction request is used for requesting to occupy the processing resources of the first operating system.

At operation S162, a second interaction response that is returned by the first operating system in response to the second interaction request is acquired via the inter-core communication interface, and the second interaction response is used for indicating whether the first operating system allows the second operating system to occupy the processing resources of the first operating system.

In the embodiment, for the second operating system, considering that most of the services processed by the processor are the services that have low service response speed requirements, correspondingly, there are generally more services processed by the second operating system, such that the second operating system may request to occupy the processing resources of the first operating system via the inter-core communication interface. In some exemplary implementations, the occupation of the processing resources may be performed in a request-response interaction manner.

When the processing resources of the first operating system need to be occupied, the second operating system may transmit the second interaction request of the second operating system to the first operating system via the inter-core communication interface, so as to request to perform resource interaction with the first operating system by using resource occupation as a target. After the second interaction request is received, the first operating system may determine, based on the self-load situation, whether the second operating system is allowed to occupy at least part of the processing resources of the first operating system, and return the second interaction response to the second operating system via the inter-core communication interface, so as to cause the second operating system to perform resource interaction with the first operating system according to the second interaction response.

It is to be noted that, the occupation of the processing resources is the scheduling of the processing resources at an operating system level (that is, negotiation of processing resource scheduling is completed between the first operating system and the second operating system), not actual scheduling of the processing resources. When the processing resources are actually scheduled, the actual scheduling of the processing resources is completed by the resource adaptive scheduling module.

Through the embodiment, the utilization rate of the processing resources may be improved by performing resource interaction among different operating systems in a request-response manner, and the response speed of service processing may also be accelerated.

In an exemplary embodiment, the method may further include the following operations.

At operation S171, a resource utilization rate of the processing resources of the second operating system is detected.

At operation S172, when it is determined, according to the resource utilization rate of the processing resources of the second operating system, that the second operating system is to occupy the processing resources of the first operating system, the transmission of the second interaction request to the first operating system via the inter-core communication interface is triggered.

In the embodiment, the processing resource occupation process may depend on the real-time load situation of the heterogeneous operating system. The load detection modules for detecting the load situation of the system may run in different operating systems, and may belong to the system control modules of the current system. A second system control module may run on the second operating system. The load detection module in the system control module may detect the resource utilization rate of the processing resources of the second operating system. The resource utilization rate of the processing resources of the second operating system may be used for representing the load situation of the second operating system. When the resource utilization rate of the processing resources is higher, the system load is heavier; otherwise, when the resource utilization rate of the processing resources is lower, the system load is lighter.

According to the resource utilization rate of the processing resources of the second operating system, whether the second operating system needs to perform resource interaction with the first operating system may be determined. For example, when the current resource utilization rate is too high (reaching a specified utilization rate threshold), or it is determined, according to the services to be executed, that the future resource utilization rate is too high (reaching the specified utilization rate threshold), it may be determined that the second operating system needs to occupy the processing resources of the first operating system. When it is determined that the second operating system waits to perform resource interaction with the first operating system, the operation of transmitting the second interaction request to the first operating system via the inter-core communication interface may be triggered and executed.

Through the embodiment, resource interaction among different operations is performed in a request-response manner, and the operating system with a slow response speed is allowed to actively occupy the processing resources to the operating system with a fast response speed, such that the utilization rate of the processing resources may be improved.

In an exemplary embodiment, the method may further include at least one of the following operations.

At operation S181, when the current resource utilization rate of the second operating system is greater than or equal to a second utilization rate threshold, it is determined that the second operating system is to occupy the processing resources of the second operating system.

At operation S182, when it is determined, according to ongoing services and services to be executed of the second operating system, that the resource utilization rate of the processing resources of the second operating system is greater than or equal to a third utilization rate threshold, it is determined that the second operating system is to occupy the processing resources of the second operating system.

In the embodiment, considering the complexity of service processing, there may be a coupling relationship between the services, and the importance of the services affects the operating systems to which the services are allowed to be allocated. In addition, there may be a difference between priority processing levels among different services. The second operating system may determine, by integrating factors of a plurality of aspects, such as the resource utilization rate, services to be allocated and services to be executed of the second operating system, whether the processing resources of the first operating system need to be occupied.

As an exemplary implementation, the threshold of the resource utilization rate of the processing resources of the second operating system may be preset, that is, the second utilization rate threshold. When the resource utilization rate of the processing resources of the second operating system is greater than or equal to the second utilization rate threshold, it may be determined that the current load of the second operating system is too heavy, and the second operating system needs to occupy the processing resources of the first operating system, so as to meet service requirements of the second operating system.

As another exemplary implementation, in addition to the current ongoing services, the second operating system further needs to process the services that have been allocated to the second operating system, such that the threshold of the resource utilization rate of the processing resources of the second operating system may be preset, that is, the third utilization rate threshold. When it is determined, according to the ongoing services and services to be executed of the second operating system, that the resource utilization rate of the processing resources of the second operating system is greater than or equal to the third utilization rate threshold, it may be determined that the second operating system is to occupy the processing resources of the first operating system, and it may be determined that the second operating system is about to be in an overload state, such that the second operating system needs to occupy the processing resources of the first operating system, so as to meet the service requirements of the second operating system.

In addition, in addition to executing the service that have been allocated (which may include the current ongoing services, and may also include the service that have been allocated), the second operating system may further process the services, in the current service to be allocated (that is, newly added service to be allocated), having a higher service coupling degree with the service that have been allocated, such that the threshold of the resource utilization rate of the processing resources of the second operating system may be preset, that is, the fourth utilization rate threshold, and the threshold of the service coupling degree between the newly added service to be allocated and the service that have been allocated, that is, a third coupling degree threshold. When the current resource utilization rate of the processing resources of the second operating system is greater than or equal to the fourth utilization rate threshold, and the service coupling degree between the newly added service to be allocated and the service that have been allocated of the second operating system is greater than or equal to the third coupling degree threshold, it may be determined that the second operating system is about to be in the overload state, such that the second operating system needs to occupy the processing resources of the first operating system, so as to meet the service requirements of the second operating system.

In some exemplary implementations, the second utilization rate threshold and the third utilization rate threshold may be the same or different, for example, both the second utilization rate threshold and the third utilization rate threshold are 50%, 60% or other values. The fourth utilization rate threshold may be a value that is less than the second utilization rate threshold and the third utilization rate threshold, for example, 40%, or may be another utilization rate threshold. In the embodiment, each utilization rate threshold is not limited.

Through the embodiment, the resource scheduling requirements of the operating systems are determined based on the current ongoing services of the operating systems, the current ongoing services and the services that have been allocated, or the current ongoing services and the services that have been allocated and the newly added service to be allocated, such that the flexibility of resource scheduling may be improved, and the utilization rate of processing resources may also be improved.

In an exemplary embodiment, the method may further include the following operations.

At operation S191, when a service priority of the ongoing services of the first operating system is not lower than a service priority of the services to be executed of the second operating system, it is determined that the first operating system does not allow the second operating system to occupy the processing resources of the first operating system.

At operation S192, when the service priority of the ongoing services of the first operating system is lower than the service priority of the services to be executed of the second operating system, it is determined that the first operating system allows the second operating system to occupy the processing resources of the first operating system.

When the first operating system is currently in the idle state, and there is no services that have been allocated to be executed, or there is no services to be allocated that have to be allocated to the first operating system, the first operating system may directly determine that the second operating system is allowed to occupy the processing resources of itself. When the first operating system is currently processing the services, or there are services to be executed that have been allocated, or there are services to be executed that have to be allocated to the first operating system, whether the second operating system is allowed to occupy the processing resources of the first operating system needs to be determined by integrating the factors such as the service priorities of the above services.

In some exemplary implementations, when the service priority of the ongoing services of the first operating system is not lower than the service priority of the services to be executed of the second operating system, it indicates that the urgency of the ongoing services of the first operating system is not lower than the urgency of the services to be executed of the second operating system, and the first operating system does not allow the second operating system to occupy the processing resources of the first operating system. When the service priority of the ongoing services of the first operating system is lower than the service priority of the services to be executed, it indicates that the urgency of the ongoing services of the first operating system is lower than the urgency of the services to be executed of the second operating system, and it is determined that the first operating system allows the second operating system to occupy the processing resources of the first operating system.

Herein, although the response speed of the first operating system is higher than the response speed of the second operating system, the services with a high service priority are generally preferentially allocated to the first operating system. However, considering the coupling relationship between the services, the services with the high service priority may also be allocated to the second operating system. Therefore, determination may be performed based on the service priority when resource occupation is performed. Alternatively, it may also be considered that the occupation of the processing resources may only be allowed when the service priorities of the ongoing services and services to be executed of the first operating system are both not less than the service priority of the services to be executed of the second operating system.

Through the embodiment, the flexibility and rationality of resource scheduling may be improved by integrating the factors such as the service priority to schedule the processing resources between the operating systems.

In an exemplary embodiment, the operation of transmitting the second interaction request of the second operating system to the first operating system via the inter-core communication interface includes the following operation.

At operation S201, a second occupation request of which interrupt number is a third interrupt number to the first operating system is transmitted via the inter-core communication interface, and the second occupation request is used for requesting to occupy the processing resources of the first operating system.

In the embodiment, similar to the foregoing embodiments, the occupation and releasing of the processing resources among different operating systems may be completed by means of the inter-core interrupt. Different interrupt events may be defined to correspond to different resource interaction types, and different interrupt events may correspond to different interrupt numbers. The interrupt number that is allocated for a third interrupt event that the second operating system requests to occupy the processing resources of the first operating system is the third interrupt number.

In some exemplary implementations, the second interaction request may be a second occupation request, that is, a request used for requesting to occupy the processing resources of the first operating system. The second operating system may transmit the second occupation request of which interrupt number is the third interrupt number to the first operating system via the inter-core communication interface, that is, a trigger source of an inter-core communication interrupt of which interrupt number is the third interrupt number is the second operating system, and a response source is the first operating system; and the inter-core communication interrupt means that the second operating system occupies the processing resources of the first operating system.

Through the embodiment, by allocating the interrupt numbers used for occupying the processing resources among different operating systems, resource scheduling between the operating systems is performed by means of the inter-core communication interrupt, such that the accuracy of resource scheduling may be improved.

In an exemplary embodiment, the operation of acquiring, via the inter-core communication interface, the second interaction response that is returned by the first operating system in response to the second interaction request includes at least one of the following operations.

At operation S211, a resource-release allowing response of which interrupt number is a fourth interrupt number is transmitted to the second operating system via the inter-core communication interface, and the resource-release allowing response is used for indicating that the first operating system allows the second operating system to occupy the processing resources of the first operating system.

At operation S212, a resource-release rejection response of which interrupt number is a fifth interrupt number is transmitted to the second operating system via the inter-core communication interface, and the resource-release rejection response is used for indicating that the first operating system does not allow the second operating system to occupy the processing resources of the first operating system.

In the embodiment, similar to the foregoing embodiments, the occupation and releasing of the processing resources among different operating systems may be completed by means of the inter-core interrupt. Different interrupt events may be defined to correspond to different resource interaction types, and different interrupt events may correspond to different interrupt numbers. The interrupt numbers that are allocated for a fourth interrupt event and a fifth interrupt event that the second operating system requests to return the resource occupation response to the second operating system are the fifth interrupt number. The fourth interrupt event is an interrupt event that allows resource occupation; and the fifth interrupt event is an interrupt event that rejects resource occupation.

As an exemplary implementation, when the first operating system determines that the second operating system is allowed to occupy at least part of the processing resources of the first operating system, the first operating system may transmit the resource-release allowing response of which interrupt number is the fourth interrupt number to the second operating system via the inter-core communication interface, that is, a trigger source of an inter-core communication interrupt of which interrupt number is the fourth interrupt number is the first operating system, and the response source is the second operating system; and the inter-core communication interrupt means that the first operating system passively releases the processing resources to the second operating system.

As another exemplary implementation, when the first operating system determines that the second operating system is rejected to occupy at least part of the processing resources of the first operating system, the first operating system may transmit the resource-release rejection response of which interrupt number is the fifth interrupt number to the second operating system via the inter-core communication interface, that is, a trigger source of an inter-core communication interrupt of which interrupt number is the fifth interrupt number is the first operating system, and the response source is the second operating system; and the inter-core communication interrupt means that the first operating system does not allow to release the processing resources to the second operating system.

Through the embodiment, by allocating the interrupt numbers used for allowing to occupy the processing resources and not allowing to occupy the processing resources among different operating systems, resource scheduling between the operating systems is performed by means of the inter-core communication interrupt, such that the accuracy of resource scheduling may be improved.

As an exemplary example, the inter-core communication interrupt is explained and described by using the RTOS and the Linux system as an example. In the Linux system, the inter-core communication may be implemented based on an interrupt event between a customized interrupt vector table and the heterogeneous operating system. The Linux operating system fully uses bit numbers that are not defined by the SGI, so as to realize customization of terminal signals, thereby reducing costs of inter-core communication. The undefined bit numbers may be 8-15. In a multi-core heterogeneous operating system, in order to maximize the compatibility with a resource allocation mode, No. 8-15 (8 interrupts in total) are used to represent an inter-core interrupt vector table. One feasible allocation plan of the vector table is shown in Table 1.

TABLE 1

| Serial Number | Interrupt number | Trigger source | Response source | Meaning |
|---|---|---|---|---|
| 1 | 8 | RTOS core | Linux core | The RTOS proactively releases a CPU core |
| 2 | 9 | Linux core | RTOS core | The Linux system requests to take over the CPU core |
| 3 | 10 | RTOS core | Linux core | The RTOS passively releases the CPU core |
| 4 | 11 | RTOS core | Linux core | The RTOS does not allow to release the CPU core |
| 5 | 12 | RTOS core | Linux core | The RTOS occupies the CPU core |

Where the foregoing first interrupt number corresponds to an interrupt number 12; the foregoing second interrupt number corresponds to an interrupt number 8; the foregoing third interrupt number corresponds to an interrupt number 9; the foregoing fourth interrupt number corresponds to an interrupt number 10; and the foregoing fifth interrupt number corresponds to an interrupt number 11.

As shown in Table 1, active releasing means that, when the RTOS has no service to schedule (that is, in the idle state), the SGI of which interrupt number is 8 is sent to the Linux system. In this case, the core resources of the RTOS are taken over by the Linux system, and then the RTOS enters the hibernation state. Passive releasing means that, when the service load of the Linux system is rapidly increased, the SGI of which interrupt number is 9 is sent to the RTOS. When the process being executed by the RTOS is allowed to be interrupted (the processes on the RTOS all have priority levels and may be configured according to actual situations; and when the priority level is higher than interrupt number 9, the process may not be interrupted, and when the priority level is lower than interrupt number 9, the process may be interrupted). The RTOS sends the SGI of which interrupt number is 10 to the Linux system and passively releases the occupied CPU core resources for the Linux system to schedule and use. Hereafter, the RTOS enters the hibernation state; when the RTOS is currently not allowed to be interrupted, the RTOS sends the SGI of which interrupt number is 11 to the Linux system, so as to notify the Linux system, and in this case, the core resources of the RTOS cannot be released; and in this case, the Linux system continues to execute according to the current running policy without change.

It is to be noted that, the inter-core communication vector table is not unique, and is not limited to the inter-core communication vector table defined in Table 1.

In an exemplary implementation, an inter-core communication method is provided. The method includes the following operations.

At operation S1, the first operating system sends target data (which may be the service data) to a target virtual channel (which may be the storage space) in a processor memory.

In some exemplary implementations, the target data is the data to be sent. The target virtual channel is an idle storage space in the memory. The first operating system sending the target data to the target virtual channel in the processor memory means that a CPU core of the first operating system writes, into the target virtual channel, the data to be transmitted.

At operation S2, the first operating system sends an interrupt notification message (which may be the inter-core interrupt request) to the second operating system. In some exemplary implementations, the CPU core of the first operating system sends the interrupt notification message to a CPU core of the second operating system. The interrupt notification message may carry an address of the target virtual channel, and is used for notifying the second operating system to acquire the target data from the target virtual channel. The interrupt notification message may be triggered by software or hardware.

At operation S3, the second operating system acquires the target data from the target virtual channel in the memory in response to the interrupt notification message. In some exemplary implementations, the CPU core of the second operating system analyzes the address of the target virtual channel from the interrupt notification message in response to the interrupt notification message, and then positions the target virtual channel in the memory according to the analyzed address, so as to acquire the target data from the target virtual channel, thereby achieving the data interaction between the first operating system and the second operating system.

By means of the above operations, when the plurality of operating systems run on the processor need to transmit data mutually, the first operating system sending the data sends the target data to the target virtual channel in the processor memory, and sends the interrupt notification message to the second operating system. The second operating system receiving the data acquires the target data from the target virtual channel in response to the interrupt notification message. Therefore, the problems that an inter-core communication process wastes resources and is highly dependent on the operating system are solved, and the effect of reducing resource waste and dependence on the operating system during the inter-core communication process may be achieved.

In an exemplary embodiment, the memory includes a data storage area and a metadata storage area. The data storage area is divided into a plurality of storage units, and each storage unit is configured to store the service data. The metadata storage area is configured to store the size and occupied state of each storage unit of the data storage area.

In some exemplary implementations, the target virtual channel is formed by one or a plurality of storage units of the data storage area. The metadata storage area may be divided into storage slices with the same number as the storage units. Each storage slice is used for recording the size and occupied state of one storage unit. The size of the storage unit may be represented by a head address and an end address of the storage unit, and may also be represented by the lengths of the head address and the end address. An occupation state includes the occupied state and an unoccupied state, and may be represented by the value of a free token.

In an exemplary embodiment, the first operating system sending the target data to the target virtual channel in the processor memory includes: reading records in the metadata storage area by the first operating system, and determining, according to the read records, at least one storage unit that is in an idle state in the data storage area and has a total space greater than or equal to the length of the target data, so as to obtain the target virtual channel; and setting, to the occupied state, the state of the at least one storage unit corresponding to the target virtual channel in the metadata storage area, and storing the target data to the target virtual channel.

It is to be noted that, in order to ensure that the target data may be continuously written into the memory, the written target virtual channel needs a storage space that is idle and greater than or equal to the length of the target data. Since the memory is divided into the metadata storage area and the data storage area, the occupation state of each storage unit recorded in the metadata storage area may be read, so as to find the storage units that are in an idle state and may meet data storage requirements.

For example, the size of each storage unit is the same. When the length of the target data is greater than the length of the storage space, the number of the storage units required is determined according to the length of the target data, such that a plurality of continuous storage units that are in the idle state and with the number meeting the data storage requirements are found, so as to form the target virtual channel.

For another example, the size of each storage unit is the same, and the storage units have been combined in the data storage area in advance, so as to obtain a plurality of virtual channels with different sizes. Each virtual channel is formed by combining one or the plurality of storage units, and may read the occupation state of each virtual channel that is recorded in the metadata storage area, so as to find the virtual channel that is in the idle state and has the length greater than the length of the target data, that is, the target virtual channel. It is to be noted that, when system software needs to apply a shared memory space, whether the length of the data to be applied is greater than the maximum length of the data stored in the virtual channel is determined; and when the length is greater than the maximum length of the data stored in the virtual channel, the system software may send the data to be sent in a plurality of times, so as to ensure that the length of the data sent each time is less than or equal to the maximum length of the data stored in the virtual channel, thereby guaranteeing a smooth communication.

In an exemplary embodiment, the second operating system acquiring the target data from the target virtual channel in the memory in response to the interrupt notification message includes: reading the records in the metadata storage area by the second operating system, and determining the target virtual channel according to the read records; and acquiring the target data from the at least one storage unit corresponding to the target virtual channel, and setting the state of the at least one storage unit to the idle state.

That is to say, after the second operating system extracts the target data from the storage unit corresponding to the target virtual channel, in order not to affect the use of the target virtual channel by other systems or tasks, the state of the storage unit corresponding to the target virtual channel is set to the idle state.

In an exemplary embodiment, the first operating system sending the target data to the target virtual channel in the processor memory includes: receiving the target data by a driving layer of the first operating system, and determining, in the memory, the virtual channel in the idle state, so as to obtain the target virtual channel; and setting the state of the target virtual channel to the occupied state, and storing the target data to the target virtual channel.

In some exemplary implementations, both the RTOS and the non-RTOS have the driving layers. After the driving layer receives the target data to be sent, an interface is called to find the target virtual channel from the memory. In order to prevent other systems from applying to use the target virtual channel during a process of writing the data, after the target virtual channel is found, the state of the target virtual channel is set to the occupied state, and then the target data is written into the target virtual channel.

In an exemplary embodiment, when the first operating system includes an application layer, the application layer is provided with a human-computer interaction interface. Before the driving layer of the first operating system determines the virtual channel in the idle state in the memory, via the human-computer interaction interface, data to be sent that is inputted by a user is received by the application layer of the first operating system; a preset format is used to encapsulate the data to be sent, so as to obtain the target data; and a data writing function is called to transmit the target data to the driving layer via a preset communication interface, where the preset communication interface is provided on the driving layer.

In some exemplary implementations, the application layer fills the data to be sent according to the preset format, so as to obtain the target data; then a device file ipidev is generated at a/dev path of the system. When the application layer needs to read and write the data from the driving layer, an open function built-in the system may be first used to open the device file/dev/ipidev; then a write function built-in the system may be used to send the target data from the application layer to the driving layer; and the driving layer then puts the data in the target virtual channel in the shared memory, and then triggers the interrupt to notify the second operating system to obtain the data.

In an exemplary embodiment, the second operating system acquiring the target data from the target virtual channel in the memory in response to the interrupt notification message includes: triggering an interrupt processing function by the second operating system based on the interrupt notification message, determining the target virtual channel from the memory through the interrupt processing function, and acquiring the target data from the target virtual channel.

In an exemplary embodiment, the operation of determining the target virtual channel from the memory through the interrupt processing function, and acquiring the target data from the target virtual channel includes: calling a target task through the interrupt processing function, determining the target virtual channel from the memory by the target task, and acquiring the target data from the target virtual channel.

In some exemplary implementations, the interrupt processing function sends a task notification to wake up the target task responsible for data extraction; and the target task first calls the interface to find the target virtual channel in the shared memory, then reads the target data from the target virtual channel, and performs data analysis.

In an exemplary embodiment, when the second operating system includes an application layer, the memory stores a function identifier. The function identifier indicates a target function. The operation of determining the target virtual channel from the memory through the interrupt processing function, and acquiring the target data from the target virtual channel includes: determining the function identifier and the target virtual channel from the memory through the interrupt processing function, and sending address information of the target virtual channel to a target application program matching the function identifier, where the target application program is a target application program in the application layer; and calling a data reading function by the target application program, and transmitting the address information to the driving layer through the preset communication interface; acquiring, by the driving layer, the target data from the target virtual channel, and transmitting the target data to the target application program, where the preset communication interface is provided at the driving layer; and processing the target data by the target application program according to a processing function matching the function identifier, so as to execute a target function.

In some exemplary implementations, after the second operating system receives the interrupt notification message, the application layer calls the corresponding interrupt processing function to find the target virtual channel from the memory, so as to obtain the address information of the target virtual channel; then the device file ipidev is generated at the/dev path of the system. When the application layer needs to read and write the data from the driving layer, the open function built-in the system may be first used to open the device file/dev/ipidev; then a read function built-in the system may be used to read the target data in the target virtual channel. That is to say, the driving layer finds the corresponding target data from the shared memory according to the address information of the target virtual channel, and returns the target data and the length of the target data to the application layer. In an exemplary embodiment, the state of the target virtual channel is set to be idle.

It is to be noted that, different application programs of the application layer may implement different functions by using the target data. The memory stores a function identifier, which indicates the target function implemented by the application program through the target data. In some exemplary implementations, the function identifier may be Net or Cmd. When the system is initialized, the Net, the Cmd and a PID of the application program are registered to a drive; the driving layer may find the PID of the application program according to the received NetFn and Cmd; and the PID sends the data to the corresponding application program.

For example, NetFn=1 and Cmd=1 indicate that the first operating system and the second operating system send "hello word" to each other. When the system starts, an array is initialized. There are three columns in the array; and the first column is NetFn, the second column is Cmd, and the third column corresponds to the processing functions of the NetFn and the Cmd, and is recorded as xxCmdHandler. For example, when the second operating system receives a message sent by the first operating system, the NetFn and the Cmd are obtained from the message; and when it is determined that NetFn=1 and Cmd=1, the processing function HelloCmdHandler corresponding to "helloword" is executed to complete a corresponding function.

In an exemplary embodiment, the data storage area includes a plurality of memory channels, and each memory channel is formed by one or the plurality of storage units. The metadata storage area stores a plurality of records, and each record is used for recording metadata of one memory channel. The metadata of each memory channel at least includes a channel ID of the memory channel, the size of the memory channel, and the occupied state of the memory channel. The operation of reading the records in the metadata storage area by the first operating system, and determining, according to the read records, at least one storage unit that is in the idle state in the data storage area and has the total space greater than or equal to the length of the target data, so as to obtain the target virtual channel includes: traversing the records stored in the metadata storage area, and determining whether there is a first target record indicating that the memory channel is in the idle state and the size of the memory channel is greater than or equal to the length of the target data; and when there is the first target record, determining, as the target virtual channel, the memory channel indicated by the channel ID recorded in the first target record.

It is to be noted that, the data storage area may be divided into n virtual memory channels, and each memory channel may have different sizes. That is to say, the sizes of the n virtual channels are 20*m, 21*m, 22*m, 23*m, . . . , 2n–1*m in sequence, where m is the size of one storage unit; and the following structure bodies are designed as metadata management memory channels:

```
typedef struct {
uint32_t Flag;
uint16_t ChannelId;
uint8_t SrcId;
uint8_t NetFn;
uint8_t Cmd;
uint32_t Len;
uint32_t ChannelSize;
uint8_t *pData;
uint8_t CheckSum;
}IpiHeader_T,
``` where uint32_t Flag represents the state of the memory channel, for example, 0xA5A5A5A5 indicates that the channel is non-null, otherwise it is null; uint16_t ChannelId represents the channel ID; uint8_t SrcId represents a source CPU ID, and a source CPU refers to the CPU writing the data into the memory channel; uint8_t NetFn and uint8_t Cmd are function parameters; uint32_t Len is the length of the data stored in the memory channel; uint32_t ChannelSize represents the size of the memory channel; uint8_t*pData refers to a head address of the memory channel; and uint8_t CheckSum refers to checksum. When the first operating system needs to send data, a check value is calculated from the sent data through checking and a algorithm, and the check value is sent to the second operating system. When the second operating system receives the data and the check value, a check value is calculated according to the received data through the same checking and algorithm; the calculated check value is compared with the received check value; if so, it indicates that the received data is valid; and if no, it indicates that the received data is invalid. Each virtual memory channel corresponds to one structure body record. The structure body records are stored at a starting position of the shared memory in sequence according to an incremental mode of the channel IDs. After the system is powered on, these structure body records are initialized. Initializing Flag to 0 indicates that the channel is null; ChannelId is initialized to 0, 1, 2, . . . , and n–1 in sequence; ChannelSize is initialized to the size of the corresponding virtual memory channel; and pData is initialized to point to the head address of the corresponding virtual memory channel.

In an exemplary embodiment, when the first operating system determines the target virtual channel, an interface GetEmptyChannel is used to find the virtual channel meeting the following two conditions from all the memory channels according to the size of the target data to be sent: a free token Flag in a channel structure body IpiHeader is not equal to 0xA5A5A5A5 (that is, the channel is in the idle state), and the size ChannelSize of the channel in the channel structure body IpiHeader is greater than or equal to the size of the target data (that is, the size of the memory may meet a storage requirement of the target data). After the target virtual channel meeting the above conditions is found, the state of the channel is set to be non-null. That is to say, the free token Flag in the channel structure body IpiHeader is set to 0xA5A5A5A5, and then the target data is copied into the target virtual channel.

In an exemplary embodiment, when the memory channel is occupied, the metadata of the memory channel may further include an ID of the source CPU core of the target data and an ID of a destination CPU core of the target data. The operation of reading the records in the metadata storage area by the second operating system, and determining the target virtual channel according to the read records includes: traversing the records stored in the metadata storage area, and determining whether there is a second target record, where the second target record indicates that the memory channel is in the occupied state and the ID of the destination CPU core is an ID of a CPU core of the second operating system, and the ID of the source CPU core is not the ID of the CPU core of the second operating system; and when there is the second target record, determining, as the target virtual channel, the memory channel indicated by the channel ID recorded in the second target record.

That is to say, the target virtual channel is the virtual channel in all the channels that meets the following three conditions: a first condition is that the free token Flag in the channel structure body IpiHeader is equal to 0xA5A5A5A5 (that is, indicating that the channel is in the occupied state); a second condition is that TargetId in the channel structure body is equal to an ID of the current CPU (that is, indicating that a destination CPU of the target data is the CPU of the second operating system); and a third condition is that the TargetId in the channel structure body is not equal to SrcId (that is, indicating that the target data is not sent by the CPU of the second operating system).

It is to be noted that, when 1 bit is used to represent the free token Flag, 0 indicates that the channel is null, and 1 indicates that the channel is non-null; and when the Flag is 0 originally, but is mutated to 1, it is considered that the channel is non-null after the system reads the Flag, causing an abnormal communication. In the embodiment, the free token Flag is set to a plurality of special characters, such as 0xA5A5A5A5. Since a plurality of bits are simultaneously mutated to the special characters, the probability is considerably less than 1-bit mutation probability, such that the mutation of a storage medium bit may be prevented from affecting the value of the Flag, thereby improving the safety of communications.

In an exemplary embodiment, there is a state mapping table stored in the metadata storage area. There are a plurality of records in the state mapping table, and each record is used for recording the occupied state of one storage unit. The operation of reading the records in the metadata storage area by the first operating system, and determining, according to the read records, at least one storage unit that is in the idle state in the data storage area and has the total space greater than or equal to the length of the target data, so as to obtain the target virtual channel includes: determining the preset number of the storage units to be occupied by the target data; successively scanning each record from an initial position of the state mapping table; when the consecutive preset number of target records is scanned, determining the consecutive storage units indicated by the preset number of target records, where the target records indicate that the storage units are in the idle state; and determining the consecutive storage units as the target virtual channel.

It is to be noted that, for ease of storage and extraction of the data, since the operating system needs to occupy the consecutive storage units in the memory when transmitting the service data, the number of the storage units in a memory request instruction needs to be determined first; and since the memory space of each storage unit is the same, the preset number of the consecutive storage units required may be calculated by means of the space size of the required memory, and is recorded as numb.

In some exemplary implementations, the first operating system traverses the records from an index position in the state mapping table. The index position may be the initial position of the state mapping table. Starting from the initial position of the state mapping table, each record of the mapping table is queried in sequence to determine whether there are consecutive records with free memory pages greater than or equal to the numb; when there are records meeting the above condition, the consecutive storage units in the processor are determined by recording a correspondence relationship with the memory pages; and the consecutive storage units are determined as the target virtual channel, so as to write the data into the target virtual channel.

In an exemplary embodiment, the interrupt notification message includes the head address and preset number of the consecutive storage units. The operation of reading the records in the metadata storage area by the second operating system, and determining the target virtual channel according to the read records includes: successively scanning each record from an initial position of the state mapping table; and when the recorded head address of the consecutive storage units is scanned, determining, as the target virtual channel, the storage units indicated by the scanned address and the consecutive storage units with the present number minus one.

In some exemplary implementations, the consecutive storage units refer to the consecutive storage units of which number is equal to the numb. Each record in the state mapping table further records the head address of the corresponding storage unit. When the second operating system scans, from the mapping table, the record of the head addresses of the consecutive storage units of which number is equal to the numb, it indicates that the head address of the target virtual channel is scanned. The storage unit indicated by the head address and the consecutive numb-1 storage units after the storage unit form the target virtual channel. The second operating system acquires the data from the target virtual channel, so as to complete the interaction with the data of the first operating system.

In an exemplary embodiment, the scanned consecutive target records are recorded by a counter; during the process that each record is scanned in sequence from the initial position of the state mapping table according to the number of the storage units, and when the target records are currently scanned, the counter is controlled to plus one; and when non-target records are not scanned currently, the counter is controlled to reset.

In some exemplary implementations, whether there is the consecutive preset number of target records, that is, whether there is the preset number of the consecutive storage units, is determined by using a relationship between the value of the counter and the number of the required storage units. In some exemplary implementations, the count of the counter is recorded as cntr. When the scanned storage unit is null, an operation of adding 1 to the cntr is performed; when the scanned storage unit is not null, the number cntr of the accumulated and consecutive storage units in the idle state is cleared, and the consecutive storage units that are in the idle state are continuously found by starting from the address after the storage unit, until the cntr is equal to the numb, indicating that the consecutive storage units that are in the idle state and meet the memory requirements have been found; and when there is no cntr greater than or equal to the numb after the entire state mapping table is scanned, it indicates that the current dynamic request for memory fails, and there is no preset number of the consecutive storage units.

In an exemplary embodiment, before the first operating system reads the records in the metadata storage area, and determines, according to the read records, at least one storage unit that is in the idle state in the data storage area and has the total space greater than or equal to the length of the target data, so as to obtain the target virtual channel, the method may further include: sending the memory request instruction by the first operating system, and executing a locking operation on the memory of the processor, where the memory request instruction is configured to request to use the memory of the processor; and reading the records in the state mapping table when the memory is successfully locked.

In some exemplary implementations, the memory request instruction is an instruction that the operating system run on the processor sends a request to use the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and when locking is not released, other servers do not have permission to use the processor memory.

In an exemplary embodiment, the operation of executing the locking operation on the memory of the processor includes: determining whether the memory is currently in a locked state, where the locked state represents a state that the memory is requested for use; executing the locking operation on the memory when the memory is not currently in the locked state; and when the memory is currently in the locked state, determining that the locking of the memory fails, and requesting to lock the memory of the processor again after a preset duration, until the memory is successfully locked, or until the number of times for requesting for locking is greater than the preset number of times.

Before the processor runs, an initialization operation needs to be performed on the metadata storage area and the data storage area in the processor. In some exemplary implementations, the records stored in the state mapping table in the metadata storage area are initialized, and the initialization operation is performed on memory management information.

Before a memory request operation is performed, the following configurations are performed on the memory management information.

```
typedef struct {
uint32_t MemReady;
uint32_t MemLock;
}MallocMemInfo_T;
``` where a member variable MemLock of a structure body MallocMemInfo_T indicates whether the shared memory has been initialized; a variable MemReady is 0xA5A5A5A5, and indicates that the initialization operation has been completed, and dynamic request and memory releasing may be normally performed; and a member variable MemReady of the structure body MallocMemInfo_T represents whether it is locked.

In some exemplary implementations, when the variable MemLock is read to be 0, it indicates that there is no system or task requesting for memory at the moment, that is, the memory is not in the locked state currently. When the variable MemLock is read to be 0xA5A5A5A5, it indicates that there is a system or a task requesting for memory, and re-requesting needs to wait until the current request is completed, such that the locking of the current request fails.

In an exemplary embodiment, if locking failure occurs when the locking operation is performed on the memory, the locking of the memory is requested again after waiting for the preset duration, until locking is succeeded. For example, the preset duration may be 100 microseconds.

In an exemplary embodiment, when the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

In some exemplary implementations, after there is the target virtual channel that may be used by the first operating system in the memory space of the processor, the first operating system stores the target data to be transmitted to the corresponding target virtual channel. In an exemplary embodiment, the occupation state of the memory space of the processor is updated according to a data writing condition of the first operating system, that is, a target consecutive memory space is changed from the unoccupied state to the occupied state. In addition, in order to cause other systems or tasks to request for memory, the locking of the memory is released.

In an exemplary embodiment, the method may further include: releasing the locking of the memory when the consecutive preset number of target records is not scanned.

In some exemplary implementations, after the records in the state mapping table are scanned, the preset number of consecutive storage units that are in the idle state is not detected, and it indicates that there is no enough space memory page in the memory of the processor for the first operating system to use, such that the current dynamic request for memory fails, and the locking of the memory is released.

In an exemplary embodiment, the interrupt notification message is sent to the second operating system by means of a Software Generated Interrupt (SGI). In some exemplary implementations, the operation of sending the interrupt notification message to the second operating system by means of the SGI includes: writing an interrupt number and the ID of the CPU core of the second operating system to a preset register of the processor, and generating the interrupt notification message based on the interrupt number and the ID of the CPU core of the second operating system.

In some exemplary implementations, the SGI is an interrupt generated by the software; and the software may send the interrupt to the CPU core that executes the software, and may also send the interrupt to other CPU cores. The preset register may be a GICD_SGIR register; an SGI number and a destination CPU ID may be written into the GICD_SGIR register through the software, so as to generate the SGI; and the SGI number is the SGI number reserved for inter-core communication.

In some exemplary implementations, the hardware interrupt refers to an interrupt generated by a hardware device, and may be a privately-owned peripheral interrupt, or may also be a shared peripheral interrupt. It is to be noted that, the hardware interrupt is the interrupt introduced by hardware outside the CPU, and is random in nature; and the SGI is the interrupt introduced by the interrupt instruction executed by the software run in the CPU, and is predetermined. The mode of generating the interrupt notification message is not limited in the embodiment.

In an exemplary implementation, a method for sharing a memory is provided. The method includes the following operation.

At operation S1, the memory request instruction is received, and the locking operation is executed on the memory of the processor. The memory request instruction is configured to request to use the memory of the processor.

In some exemplary implementations, the memory request instruction is an instruction that is sent by the first operating system running on the processor to request the use of the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and when locking is not released, other servers do not have permission to use the processor memory.

In the method for sharing a memory provided in the embodiment of the present disclosure, before the locking operation is executed on the memory of the processor, the method may further include: determining whether the memory is currently in the locked state, where the locked state represents the state that the memory is requested for use; and executing the locking operation on the memory when the memory is not currently in the locked state.

In some exemplary implementations, since request conflicts occurs when the plurality of systems or the plurality of tasks simultaneously request to use the memory, the memory of the processor may only be locked by one system or task within the same time period, such that when it is detected that the current memory is not in the locked state, the current operating system may execute the locking operation on the memory.

In some exemplary implementations, whether the memory is in the locked state is determined by determining whether a preset variable stored in the memory is a preset value; when the preset variable is not a preset parameter number, it indicates that the memory is not in the locked state, and there is no other system or task requesting for memory spaces, such that the locking succeeds; otherwise, the preset variable is a preset parameter, it indicates that the memory is in the locked state at the current moment, and there are other systems or tasks other than the operating system requesting for the memory spaces, such that the locking fails.

In the method for sharing a memory, after whether the memory is currently in the locked state is determined, the method may further include: when the memory is currently in the locked state, determining that the locking of the memory fails; and when the locking of the memory fails, requesting again to lock the memory of the processor after the preset duration, until the memory is successfully locked, or until the number of times for requesting for locking is greater than the preset number of times.

In some exemplary implementations, if locking failure occurs when the locking operation is performed on the memory, the locking of the memory is requested again after waiting for the preset duration, until locking is succeeded. For example, the preset duration may be 100 microseconds.

In an exemplary embodiment, when the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

At operation S2, when the memory is successfully locked, the occupied state of the memory is read, and whether there is an idle target memory space in the memory is determined according to the occupied state of the memory. The size of the target memory space is greater than or equal to the size of the memory requested by the memory request instruction.

After request locking succeeds, the operating system requests for the memory of the processor. In some exemplary implementations, information used for recording the occupied state of the memory is scanned according to the memory request instruction sent by the operating system; and whether there is the target memory space is determined. That is to say, whether there are consecutive memory spaces that are in the unoccupied state and may meet memory usage requirements in the processor is determined. Meeting the memory usage requirements means that the size of the memory space is greater than or equal to the size of the memory requested by the operating system. In an exemplary embodiment, whether the sizes of the consecutive memory spaces that are in the unoccupied state are greater than or equal to the size of the memory requested by the operating system is determined, so as to obtain a determination result.

It is to be noted that, discontinuous memory spaces may also be used when the memory is requested. A pointer may be added after a memory block which is not the smallest, and points to the next smallest memory block obtained through request. In addition, when data is read and written, data reading and writing across data blocks may be realized according to a storage address and the pointer. The form of the target memory space is not limited in the embodiment.

At operation S3, when there is the target memory space in the memory, the address information of the target memory space is fed back to a sending end of the memory request instruction, the occupied state of the memory is updated, and the locking of the memory is released. Herein, the sending end refers to the operating system (for example, the first operating system) sending the memory request instruction. It is to be noted that, since the operating system sends and receives the data by using the shared memory during inter-core communication, and accesses the data by using an address returned by the requested memory during data sending and receiving, the address information of the memory space that has been requested needs to be determined.

In some exemplary implementations, after there is the target memory space (which may be indicated by the determination result) that may be used by the operating system in the memory spaces of the processor, the address information of the target consecutive space is sent to the operating system, and according to the address information, the operating system stores, in the corresponding memory space, the data to be transmitted.

In an exemplary embodiment, the occupation state of the memory spaces of the processor is updated according to the data writing condition of the first operating system. That is to say, the target memory space is changed from the unoccupied state to the occupied state, and the locking operation before dynamic memory requesting is released, so as to cause other operating systems to request to use the memory spaces of the processor.

By means of the above operations, the problems of low use efficiency, poor flexibility and over-dependence on the operating system of the memory sharing among a plurality of cores are solved, and the effect of improving the flexibility and use efficiency of the shared memory and reducing the dependence on the operating system may be achieved.

In the method for sharing a memory, the memory includes the metadata storage area and the data storage area. The data storage area is configured to store the service data. The metadata storage area stores the state mapping table, and the state mapping table is used for recording the occupied state of the data storage area. The operation of reading the occupied state of the memory, and determining, according to the occupied state of the memory, whether there is the idle target memory space in the memory includes: reading the records in the state mapping table from the metadata storage area, and determining, according to the records in the mapping table, whether there is the target memory space in the data storage area.

The occupied state of the memory is queried by means of querying the records in the state mapping table. In some exemplary implementations, the metadata storage area stored in the processor is acquired, and the state mapping table in the metadata storage area is identified; the occupied state of the data storage area is read by traversing the records in the state mapping table; and whether there are consecutive memory spaces that are in the idle state and meet the memory usage requirements in the data storage area is determined.

In the method for sharing a memory provided in the embodiment of the present disclosure, the data storage area is formed by a plurality of memory pages; and there are the plurality of records in the state mapping table, and each record is used for recording an occupied state of the memory page. The operation of reading the records in the state mapping table from the metadata storage area, and determining, according to the records in the state mapping table, whether there is the target memory space in the data storage area includes: determining the preset number of the memory pages requested by the memory request instruction; successively scanning each record from the initial position of the state mapping table; and when the a consecutive preset number of target records is scanned, determining that there is the target memory space in the memory, where the target records indicate that the memory pages are in the idle state.

It is to be noted that, the data storage area is divided into a plurality of allocation units according to the memory size, and each allocation unit is recorded as one memory page. For example, the memory space of the data storage area is A bytes, and the divided allocation units are B bytes, such that the data storage area totally includes A/B memory pages. The records in the state mapping table are memory page records, and each memory page record is used for recording the occupied state of the memory page. The number of the memory page records in the state mapping table is the same as the number of the memory pages in the data storage area.

Figure 6:
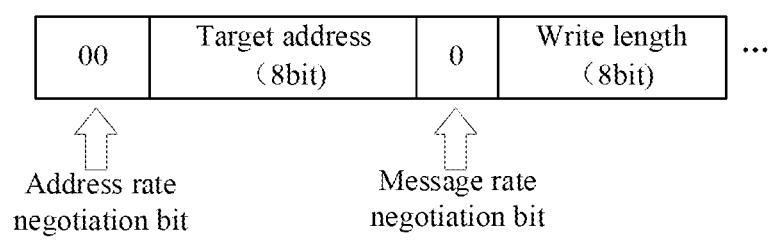
FIG. 6 is a schematic diagram of still another exemplary embedded system running method according to the embodiments of the present disclosure.

FIG. 6 is a schematic diagram of a relationship between a state mapping table and a memory page in a method for sharing a memory according to the embodiments of the present disclosure. As shown in FIG. 6, the data storage area is a dynamic allocation memory block area; and the metadata storage area includes a dynamic allocation memory mapping table area. The state mapping table area is divided into the same number of the records as the number of the memory pages in the data storage area; the records are recorded as the memory page records; and all the memory page records are combined into the state mapping table. All the memory page records in the state mapping table are in a one-to-one correspondence relationship with all the memory pages in the data storage area. Each memory page record indicates an allocation state of the corresponding memory page, that is, whether the memory page is occupied.

In some exemplary implementations, since the operating system needs to occupy the consecutive memory pages in the processor when performing cooperation of the service data, the preset number of the memory pages in a memory request instruction first needs to be determined first; and since the memory space of each memory page is the same, the preset number of the consecutive memory pages required may be calculated by means of the space size of the required memory, and is recorded as numb.

In an exemplary embodiment, after the state mapping table in the metadata storage area of the processor is acquired, the memory page records are traversed from the index position in the state mapping table. The index position may be the initial position of the state mapping table. Starting from the initial position of the state mapping table, each memory page record of the state mapping table is queried in sequence to determine whether there are consecutive memory page records with free memory pages greater than or equal to the numb; and when there are memory page records meeting the above condition, through a correspondence relationship between the memory page records and the memory pages, it is determined that there is the target memory space in the processor.

In the method for sharing a memory provided in the embodiment of the present disclosure, after each record is scanned in sequence from the initial position of the state mapping table, the method may further include: determining that there is no target memory space in the memory when all the records in the state mapping table are scanned and there are no consecutive preset number of the target records.

In some exemplary implementations, starting from the initial position of the state mapping table, whether there are consecutive spaces and have the number of the memory pages greater than or equal to the numb is determined by querying the memory page records of the state mapping table; and when the consecutive preset number of idle memory pages is still not found after the entire state mapping table is scanned, it indicates that there is no target memory space.

In the method for sharing a memory provided in the embodiment of the present disclosure, the number of the scanned target records is recorded by the counter; during the process that each record is scanned in sequence from the initial position of the state mapping table, and when the target records are currently recorded, the counter is controlled to plus one; and when non-target records are scanned currently, the counter is controlled to reset. The non-target records indicate that the memory pages are in the occupied state.

In some exemplary implementations, whether there is the consecutive preset number of the target records, that is, whether there is the target memory space, is determined by using the relationship between the value of the counter and the number of the required memory pages. In some exemplary implementations, the count of the counter is recorded as cntr. When the scanned memory page is null, an operation of adding 1 to the cntr is performed; when the scanned memory page is not null, the number cntr of the accumulated and consecutive memory pages in the idle state is cleared, and the consecutive empty memory pages are continuously found by starting from the address after the memory page, until the cntr is equal to the numb, indicating that the consecutive memory pages that are in the idle state and meet the memory requirements have been found; and when the cntr is less than the numb during the scanning of the entire state mapping table, it indicates that the current dynamic request for memory fails, and there is no target memory space.

In the method for sharing a memory provided in the embodiment of the present disclosure, the operation of when the initial position is the last position in the state mapping table, feeding back the address information of the target memory space to the sending end of the memory request instruction includes: determining the last scanned target record in the consecutive preset number of the target records, and feeding back, to the sending end, a head address of the memory page indicated by the last scanned target record.

In some exemplary implementations, when the state mapping table is scanned, a scanning mode may select to scan from the first position of the state mapping table or start scanning from the last position of the state mapping table. When the scanning mode is to scan from the last position of the state mapping table, and when the value cntr displayed by the counter is greater than or equal to the preset number numb, the last memory page scanned records the head address of the corresponding memory page, and the states of these memory pages are set to be non-null in the memory page records; and the head address is used as the head address of the entire consecutive memory page of the current memory request instruction.

In an exemplary embodiment, the address is fed back to the operating system sending the memory request instruction, and the data writing operation is performed on the memory by the operating system according to the address information.

In the method for sharing a memory provided in the embodiment of the present disclosure, the initial position is the first position in the state mapping table. The operation of feeding back the address information of the target memory space to the sending end of the memory request instruction includes: determining the first scanned target record in the consecutive preset number of the target records, and feeding back, to the sending end, a head address of the memory page indicated by the first scanned target record.

In some exemplary implementations, when the scanning mode is to scan from the first position of the state mapping table, and when the value cntr displayed by the counter is greater than or equal to the preset number numb, the address recorded by the first memory page scanned is used as the head address; and the head address is sent to the operating system sending the memory request instruction, and the data writing operation is performed on the memory by the operating system according to the address information.

In the method for sharing a memory provided in the embodiment of the present disclosure, during the process of successively scanning each record from the initial position of the state mapping table, the first target record scanned in the consecutive target records is stored through a preset variable.

In some exemplary implementations, the preset variable refers to a variable in the state mapping table that is configured to store the address information of the initial position, and is recorded as offset. When the idle and consecutive memory page is scanned each time, the operation of adding 1 to the value cntr displayed on the counter is performed; and when the value cntr displayed on the counter is greater than or equal to the preset number numb, the address information stored by the offset currently is used as the address of the first target record.

In the method for sharing a memory provided in the embodiment of the present disclosure, after the occupied state of the memory is read, and whether there is the idle target memory space in the memory is determined according to the occupied state of the memory, the method may further include: releasing the locking of the memory when there is no idle target memory space in the memory.

In some exemplary implementations, after the memory page records in the state mapping table are scanned, and when it is detected that the preset number of consecutive idle memory pages is not included, that is, the target memory space is not included, it indicates that there is no enough space memory page in the memory of the processor for the operating system to use, such that the current dynamic request for memory fails, and the locking of the memory is released.

In the method for sharing a memory provided in the embodiment of the present disclosure, the memory includes the metadata storage area and the data storage area. The data storage area is configured to store the service data. The metadata storage area stores memory management information. The operation of determining whether the memory is currently in the locked state includes: reading the memory management information stored in the metadata storage area, and determining whether the memory management information includes preset information, where the preset information indicates that the memory is in the locked state; when the memory management information includes the preset information, determining that the memory is not in the locked state currently; and when the memory management information does not include the preset information, determining that the memory is currently in the locked state.

With regard to determining whether the memory of the processor is in the locked state, determination needs to be performed by using the memory management information in the metadata storage area. In some exemplary implementations, when the memory management information in the metadata storage area is acquired, whether the memory management information includes the preset information is determined, and the preset information is configured to indicate whether the memory is in the locked state; and when the memory management information does not include the preset information, it indicates that the current memory is in an unlocked state, otherwise the memory is in the locked state.

In the method for sharing a memory provided in the embodiment of the present disclosure, the memory management information includes first field information and second field information; the first field information is configured to describe whether the memory is in the locked state; and the second field is configured to describe whether the initialization of the memory is completed. Before the memory request instruction is received, the method may further include: initializing the first field information and the second field information that are stored in the data storage area.

Before the embedded system runs, an initialization operation needs to be performed on the metadata storage area and the data storage area in the processor. In some exemplary implementations, the memory page records stored in the state mapping table in the metadata storage area are initialized, and the initialization operation is performed on the memory management information.

In some exemplary implementations, the memory management information is formed by the first field information and the second field information. The first field information represents whether to be locked, and the second field information is used for representing whether initialization is completed.

In the method for sharing a memory provided in the embodiment of the present disclosure, the operation of updating the occupied state of the memory includes: changing, to the occupied state, the state of the memory page corresponding to the target memory space recorded in the state mapping table.

In some exemplary implementations, when the operating system needs to occupy the target memory space, the memory page records in the state mapping table area of the metadata storage area are updated according to the correspondence relationship between the memory pages and the memory page records by identifying the address information of the plurality of memory pages of the target memory space, such that the memory page records are changed from the unoccupied state to the occupied state. Further, the occupation state of the memory spaces of the processor is updated according to the data writing condition of the first operating system. That is to say, the target memory space is changed from the unoccupied state to the occupied state, and the locking operation before the memory is dynamically requested is released.

In some exemplary implementations, in response to a storage operation of the first operating system, the target data is stored in the target memory space, and the address information of the consecutive memory spaces is sent to the second operating system; and an acquisition instruction sent by the second operating system based on the address information is received, and the target data stored in the target memory space is sent to the second operating system.

Herein, after the memory is successfully requested, the first operating system stores the target data to be transmitted to the requested target memory space, and sends the address information of the target memory space to the second operating system cooperating with the first operating system, so as to notify the second operating system to perform data acquisition. In some exemplary implementations, after the second operating system receives the address information of the target memory space, the acquisition instruction of the data is sent, and the embedded system receives the instruction and sends the target data stored in the target memory space to the second operating system.

By means of the above operations of receiving the memory request instruction of the first operating system, and executing the locking operation on the memory of the processor, where the memory request instruction is configured to request to use the memory of the processor; when the memory is successfully locked, reading the occupied state of the memory, and determining, according to the occupied state of the memory, whether there is an idle target memory space in the memory, where the size of the target memory space is greater than or equal to the size of the memory requested by the memory request instruction; when there is the target memory space in the memory, feeding back the address information of the target memory space to a sending end of the memory request instruction, updating the occupied state of the memory, and releasing the locking of the memory; in response to a storage operation of the first operating system, storing the target data to the target memory space, and sending the address information of the consecutive memory spaces to the second operating system; and receiving the acquisition instruction sent by the second operating system based on the address information, and sending the target data stored in the target memory space to the second operating system, the problems of low use efficiency, poor flexibility and over-dependence on the operating system of the memory sharing among a plurality of cores are solved, and the effect of improving the flexibility and use efficiency of the shared memory and reducing the dependence on the operating system may be achieved.

In an exemplary embodiment, when the first operating system performs a data reading and writing operation by using a physical address, and the second operating system performs the data reading and writing operation by using a virtual address, the second operating system converts the address information of the target memory space into the virtual address, and uses the virtual address to access the memory, so as to read the target data from the target memory space.

Since the address returned by the dynamically-requested memory is used when the shared memory sends and receives the data during inter-core communication, but address systems used by different system may be different, for example, the RTOS is the first operating system, and the non-RTOS is the second operating system. The physical address may be directly used to access the shared memory in the RTOS, and the non-RTOS cannot directly use the physical address to access the shared memory, such that the mapped virtual address needs to be used. After the second operating system receives the address information of the target memory space, conversion is performed through the address information offset, so as to map the address information to the virtual address, and an operation is performed according to the virtual address. In some exemplary implementations, a shared memory virtual-based address under the non-RTOS is vBase (assuming that a shared memory real physical address is 0x96000000); and a shared memory physical-based address under the RTOS is pBase (that is, 0x96000000).

The address returned by the dynamically-requested memory in the non-RTOS is also the virtual address vData. In the non-RTOS, Offset=vData−vBase; and the data is sent from the non-RTOS to the RTOS, and the RTOS uses an address pData to access the dynamically-requested shared memory pData=pBase+Offset. The address returned by the dynamically-requested memory in the RTOS is the physical address pData. In the RTOS, Offset=pData−pBase; and the data is sent from the RTOS to the non-RTOS, and the non-RTOS uses the address vData to access the dynamically-requested shared memory vData=vBase+Offset.

In an exemplary embodiment, the memory includes the metadata storage area and the data storage area. The metadata storage area and the data storage area are similar to those in the foregoing embodiments, and are not described herein again. In some exemplary implementations, the metadata storage area stored in the processor is acquired, and the state mapping table in the metadata storage area is identified; each memory page record is traversed from the index position in the state mapping table; each memory page record of the state mapping table is queried in sequence to determine whether there are consecutive memory page records with free memory pages greater than or equal to the preset number; and when there are memory page records meeting the above condition, through a correspondence relationship between the memory page records and the memory pages, it is determined that there is the target memory space in the processor.

The embodiment further provides a method for sharing a memory. The method includes: before the operating system sends the memory request instruction, in order to prevent request conflicts from occurring when the plurality of operating systems simultaneously request the memory spaces of the processor, requiring to request the locking operation, and determining whether the locking succeeds; when the determination result indicates that the dynamically-requested memory is successfully locked, calculating the number of the consecutive memory pages to be allocated according to the size of the memory in the sent memory request instruction, and recording the number as nmemb; when the determination result indicates that the locking of the request fails, sending a request again after waiting for a period of time (which may be 100 microseconds), until the request succeeds; and when the number of times of failed locking requests is greater than the preset number of times (the preset number of times may be three), exiting memory requesting.

In an exemplary embodiment, after the locking request succeeds, the initialization operation is performed on the metadata storage area of the processor, and the last position of the state mapping table is recorded as offset; the number of the consecutive memory pages required is calculated according to the space size of the required memory in the memory request instruction, and the number of the memory pages is recorded as cmemb; then the state mapping table of the metadata storage area in the processor is acquired, and the entire state mapping table starts to be scanned from the offset position of the state mapping table; consecutive empty memory pages are found through the correspondence relationship between the memory page records stored in the state mapping table and the memory pages in the data storage area; when the current memory page scanned is in the occupied state, offset=offset−cmemb; then the data cmemb of the accumulated consecutive empty memory pages in the counter is cleared, and the consecutive empty memory pages are continuously found from a new offset position; when the scanned memory pages are null, that is, in the idle state, the value cmemb of the count is added with 1, and offset=offset−1, so as to continuously determine the next memory page, until the cmemb is equal to the nmemb, that is, when the data of the counter is the same as the space size of the required memory, it indicates that the consecutive memory pages meeting requirements are scanned.

In an exemplary embodiment, the memory pages meeting the requirements are marked as occupied state in the corresponding state mapping table; the head address of the last found memory page is used as the head address of the entire consecutive memory page of the dynamic request; and the lock of the dynamically-requested memory is released, such that the current dynamic request for memory succeeds.

When the value of the offset is less than 0 during the scanning of the entire state mapping table, it indicates that there is no memory page meeting the requirements for the operating system to use; and the lock of the dynamically-requested memory is released, such that the current dynamic request for memory fails.

In addition, the size may also be dynamically adjusted after the space is dynamically requested and found to be insufficient. The updated memory request instruction may be sent again, and the locking operation is executed on the memory; when the locking succeeds, and when the memory space that needs to be requested by the updated memory request instruction is increased, whether there is the required memory space after the target consecutive memory that has been requested is determined; if so, the request succeeds; and when the memory space that needs to be requested by the updated memory request instruction is reduced, part of the memory space is released.

In the embodiment, the effect of improving the flexibility and use efficiency of the shared memory may be achieved by dividing a plurality of storage areas, using the index position for the dynamic request according to the space size actually required, releasing the space after use, and dynamically adjusting the size after the space is dynamically requested and found to be insufficient.

In an exemplary embodiment, the method may further include at least one of the following operations.

At operation S221, the processing resources of the second operating system that are occupied by the first operating system are merged into an available resource pool of the first operating system.

At operation S222, the processing resources of the first operating system that are occupied by the second operating system or the processing resources of the second operating system that are actively released by the first operating system are merged into an available resource pool of the second operating system.

In the embodiment, the scheduling of the processing resources may be implemented by merging the corresponding processing resources to the available resource pool of the corresponding operating systems. Correspondingly, for a scenario where the first operating system occupies the processing resources of the second operating system, when resource occupation is successful, the processing resources of the second operating system that are occupied by the first operating system may be merged into the available resource pool of the first operating system. For a scenario where the second operating system occupies the processing resources of the first operating system and the first operating system actively releases the processing resources to the second operating system, when resource occupation is successful or resource releasing is successful, the processing resources of the first operating system that are occupied by the second operating system or the processing resources actively released by the first operating system may be merged into the available resource pool of the first operating system.

For example, the resource adaptive scheduling module may be implemented in combination with a processor frame of the first operating system and a processor frame of the second operating system to configure a processor hard core resource pool, for example, a Symmetrical Multi-Processing (SMP) frame of the Linux system. Herein, a group of processors (a plurality of CPUs) are collected on a computer. The CPUs share a memory sub-system and a bus structure. SMP scheduling is a process of arranging/migrating the processes to an appropriate CPU, so as to maintain the load balance of each CPU.

By using the Linux system as an example, for the operating system, the CPU scheduling mode includes the following. Tasks (that is, the services) in the Linux system are generally maintained by a task queue, and a process scheduler determines which process in the queue may be executed by the CPU; and in addition, a task allocation module in the Linux system hands over the control power of the CPU to the process selected by the process scheduler. The selected CPU is from a CPU resource pool (that is, the available resource pool) in the Linux system, which is equivalent to the ability of the Linux system to schedule these CPUs in the resource pool to participate in the actual running of the process.

The process scheduler may pause a running process, and transfer the process to a running queue, and then another process starts to be executed, which determines that which process is in a ready queue and the process in a primary memory may be executed by the CPU (the control power of the CPU is handed over to the process) after a clock interrupt, an Input/Output (I/O) interrupt and a system call other types of signals.

Through the embodiment, the scheduling of the processing resources may be conveniently improved by merging the scheduled processing resources to the available resource pool of the corresponding operating systems, thereby improving the effectively of processing resource scheduling.

In an exemplary embodiment, the method may further include the following operation.

At operation S232, after a chip where the processor is located is powered on, the first operating system is booted to run on a first initial processing resource through a boot loader, and the second operating system is booted to run on a second initial processing resource through the boot loader. The first initial processing resource is an initial processing resource, which corresponds to the first operating system, in the processing resources of the processor; and the second initial processing resource is an initial processing resource, which corresponds to the second operating system, in the processing resources of the processor.

The entire system may be divided into two phases according to working time periods, which are an initial starting phase and a real-time running phase. The processes of dynamically scheduling the processing resources are executed at the real-time running phase. For the initial starting phase, the initial starting phase starts when the system is powered on, that is, the chip where the processor is located is powered on. After the system is powered on, one core is woken up to execute a booting action of the operating system, and the rest of the cores are in a hibernation state temporarily. After being powered on, the system first executes a preset core scheduling strategy (a start booting strategy). That is to say, the core scheduling strategy is executed by one core of the processor. The core scheduling strategy is stored in an RAM or a non-volatile flash memory (Norflash) on an SOC. The scheduling strategy may be flexibly configured according to different design requirements. The main functions of the scheduling strategy include: specifying initial processing resources (for example, specifying initial core that need to be run by the first operating system and the second operating system) that need to be run by different operating systems, and determining a booting process of the heterogeneous operating systems.

In the processing resources of the processor, the initial processing resources corresponding to the first operating system is the first initial processing resource, and the initial processing resources corresponding to the second operating system is the second initial processing resource. After the system is powered on, the first operating system may be booted to run on the first initial processing resource through the boot loader, and the second operating system is booted to run on the second initial processing resource through the boot loader. Herein, the boot loader is located on a computer or other computer applications, and refers to a program that boots the operating system to load.

Herein, the chip may be the BMC chip (which is a management control chip in a server platform), and refers to the SOC chip based on a multi-architecture of an ARM, and is integrated with various periphery hardware IPs; and the BMC chip is placed on a mainboard (a server motherboard). The powering-on of the chip refers to powering-on at an SOC level.

After the system is powered on, a specified processor core of the processor may be first woken up; and the specified processor core boots, through the boot loader, each operating system to start on the corresponding initial processing resources. The boot loader is a program that is configured to boot the operating system to load, for example, an inherent program in Bootrom (an ROM on the chip of the CPU). The inherent program refers to codes that boot the operating system to start, and belongs to a BootLoader program.

By virtue of the embodiment, at the initial starting phase, by using the boot loader to boot the operating system to start on the initial processing resource corresponding to each operating system, the success rate of the starting of the operating system may be improved, and preparation is made for the real-time running phase.

In an exemplary embodiment, the first initial processing resource is a specified processor core in the processor cores of the processor; and the second initial processing resource is the processor cores in the processor cores of the processor other than the specified processor core.

In the embodiment, the initial processing resource may include an initial processor core. The first initial processing resource may be at least one processor core in the processor cores of the processor; and the second initial processing resource may be at least part of the processor cores of the processor cores other than the first initial processing resource. In some exemplary implementations, in order to guarantee the start efficiency of the system, the first initial processing resource may be a specified processor core in the processor cores of the processor; and the second initial processing resource is the processor cores in the processor cores of the processor other than the specified processor core.

For example, for an eight-core processor (CPU0-CPU7), the specified processor core may be CPU0 (or some other processor core). That is to say, the initial processing resource of the first operating system is CPU0; and the initial processing resource of the second operating system is CPU1-CPU7.

Through the embodiment, the convenience of start booting may be improved by specifying the initial processing resource of one operating system as the specified processor core and using other processor cores of the processor as the initial processing resource of another operating system.

In an exemplary embodiment, the operation of booting the first operating system to run on the first initial processing resource through the boot loader includes the following operation.

At operation S241, the first operating system is booted to run on the first initial processing resource through an SPL.

In the embodiment, the start booting of the operating system may be performed through the SPL. The SPL belongs to codes executed at a first uboot phase, may move the codes at a second uboot phase into a memory, and is mainly responsible for loading the operating system to program codes in the RAM. Herein, the uboot is a boot loader for the embedded system, is mainly used for the boot loader of the embedded system, and may support various different computer system structures, such as PPC, ARM, AVR32, MIPS, x86, 68 k, Nios, and MicroBlaze.

Through the embodiment, the corresponding operating system is booted to run on the initial processing resource through the SPL, which may be compatible with an existing system start process, such that the start efficiency of the system may be improved.

In an exemplary embodiment, the method may further include the following operation.

At operation S251, safe start checking is performed on codes of the SPL by running a preset program fixed in a start chip on a device mainboard, and the SPL is executed after a check result of the safe start checking is normal.

Before the SPL is used to boot the operating system to run, in order to improve the success rate of the starting of the operating system, safe start checking may be performed on the codes of the SPL by running the preset program fixed in the start chip on the device mainboard, so as to determine whether the SPL is normal; when a safe start checking result of the SPL is normal, the operating system may be booted to run through the SPL; and when the safe start checking result of the SPL is abnormal, an abnormal prompt is provided, and a booting process of the operating system is suspended.

For example, after the system is powered on, partial cores are configured to boot an inherent program in the Bootrom; safe start checking is performed on partial codes of the SPL by means of a Bootrom program (a group of programs fixed in the ROM chip of the device mainboard); and when the check result is normal, the SPL codes are executed.

Through the embodiment, the safety of the starting of the operating system may be improved by performing safe start checking on the SPL.

In an exemplary embodiment, the operation of booting the second operating system to run on the second initial processing resource through the boot loader includes the following operation.

At operation S261, the second initial processing resource is woken up through the SPL, and booting to execute a U-Boot, so as to boot the second operating system to run.

When the second operating system is booted to run, the second initial processing resource is first woken up through the SPL, and the U-Boot is booted to execute, so as to boot the second operating system to run. For example, on the one hand, the SPL boots the first operating system to run on partial cores (for example, Core 1, CPU0); and one the other hand, other part of the cores (for example, Core 2-Core M+N, CPU1-CPU M+N−1) are woken up to boot to execute the uboot codes (a boot loader mainly used for the embedded system), so as to boot the second operating system to run. Through the phase, a server management control unit BMC system may implement normal booting of the first operating system and the second operating system respectively based on one or more processor cores, so as to prepare for the real-time running phase.

Through the embodiment, the initial processing resource is first woken up, and then the U-Boot is booted to execute, so as to boot the corresponding operating system to run, such that the efficiency of booting the systems to run may be improved.

The embedded system running method in the embodiment is explained and described below in combination with exemplary examples. In this exemplary example, the first operating system is the RTOS, the second operating system is the Linux system (which may also be another non-RTOS), and the processing resources are the processor cores.

In order to realize the normal running of various types of services in the embedded system, improve the utilization rate of the processor cores, and control service hardware costs within a rational range, this exemplary example provides a method for dynamic balanced scheduling of processing resources between heterogeneous multi-systems. Based on a multi-core processor hard core, different service types are scheduled to different core groups for execution according to core adaptive scheduling (that is, resource adaptive scheduling); in addition, system architecture design such as service management, load balancing, resource dynamic allocation, and inter-core communication interfaces are fused, such that the effect that the real-time and non-real-time embedded heterogeneous operating systems run on the plurality of cores of the same processor in parallel may be achieved. Therefore, the overall utilization rate of the processor cores may be improved, and the investment in hardware acceleration resources introduced to deal with the real-time services is greatly reduced. In addition, the plurality of cores of the processor use high-speed internal buses, such that communication performance is greatly improved, design costs may be significantly reduced, and the purpose of improving computing performance may be achieved.

By using a BMC management unit in a server platform (embedded products that use multi-core SOCs are applicable, for example, cell phones, tablets, set-top boxes, etc. are also applicable), the embedded system running method in this exemplary example may be divided into two phases, which are the initial starting phase and the real-time running phase. Referring to an implementation architecture for dynamic balanced scheduling of processing resources between heterogeneous multi-systems shown in FIG. 7, a CPU balanced scheduling process in the initial starting phase may be shown in FIG. 8. The above process may include the following operations.

At operation S802, partial cores are configured to boot an inherent program in the Bootrom.

At operation S804, safe start checking is performed on the SPL (which is reserved in the Norflash) by means of the Bootrom program (that is, the inherent program) (safe start checking is mainly to perform Hash check on uboot, Linux, and RTOS images to be booted; obtained results are compared with a stored result; if so, normal booting is performed; if no, start is failed; and the SPL selects which cores to wake up and from which address to load system images by configuring part of the CPU registers).

At operation S806, whether safe checking is passed is determined; when safe checking is passed, S808 is executed; and when safe checking is not passed, S810 is executed.

At operation S808, SPL codes are executed; on the one hand, the SPL boots the RTOS to run on part of the cores; and on the other hand, the other part of the cores is woken up to boot to execute the uboot does, so as to boot the Linux system to run.

At operation S810, the flow ends.

Figure 7:
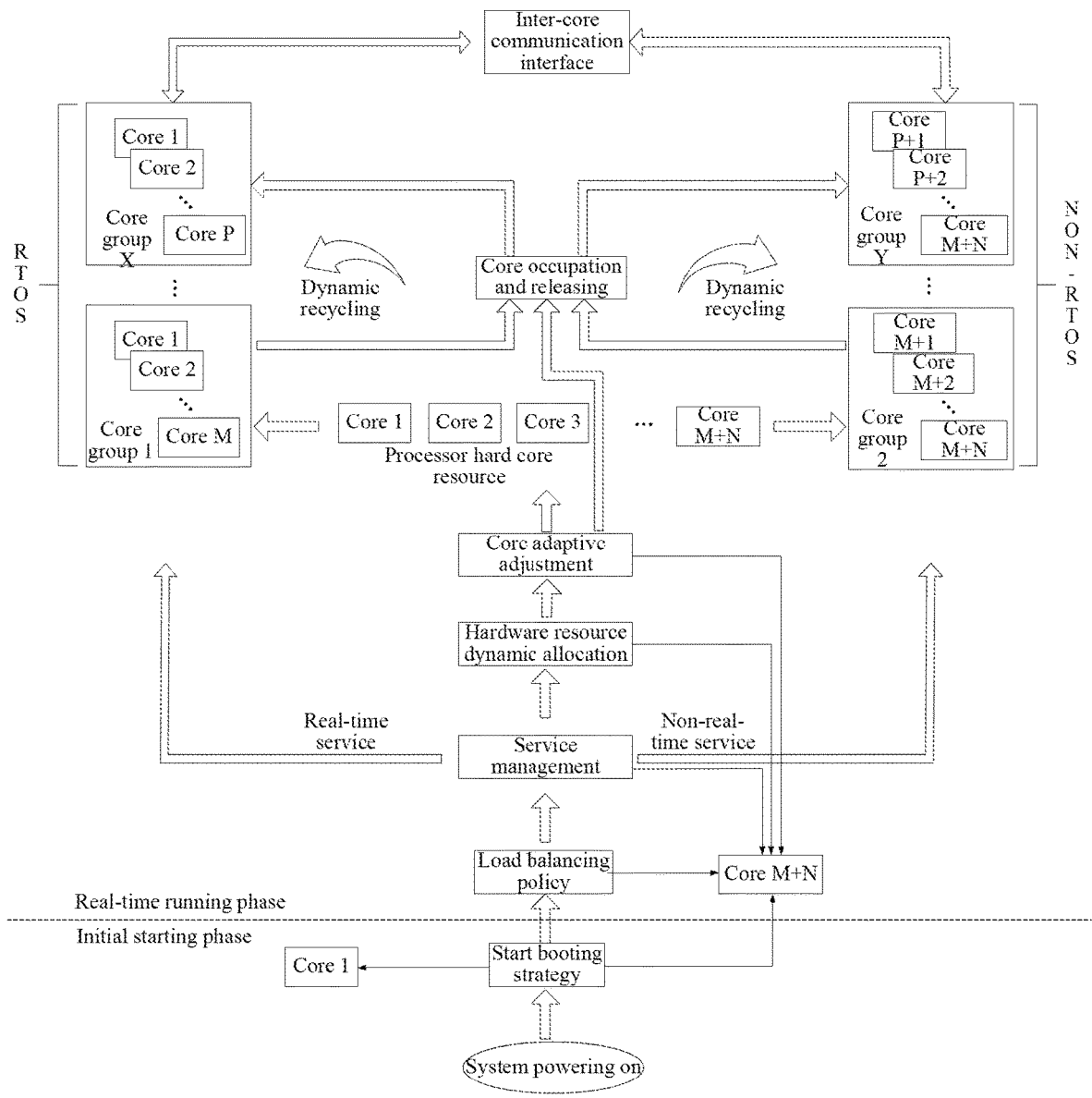
FIG. 7 is a schematic diagram of still another exemplary embedded system running method according to the embodiments of the present disclosure.
Figure 8:
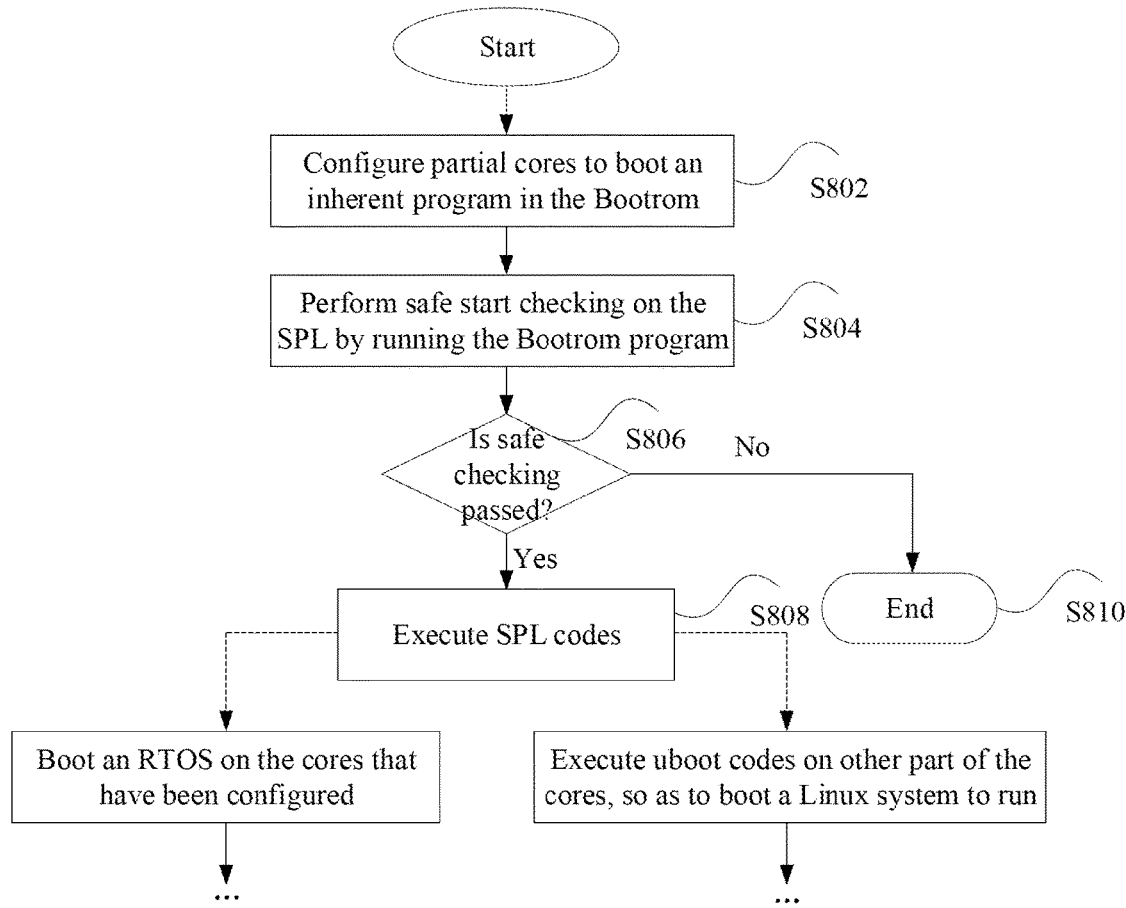
FIG. 8 is a schematic flowchart of another exemplary embedded system running method according to the embodiments of the present disclosure.
Figure 9:
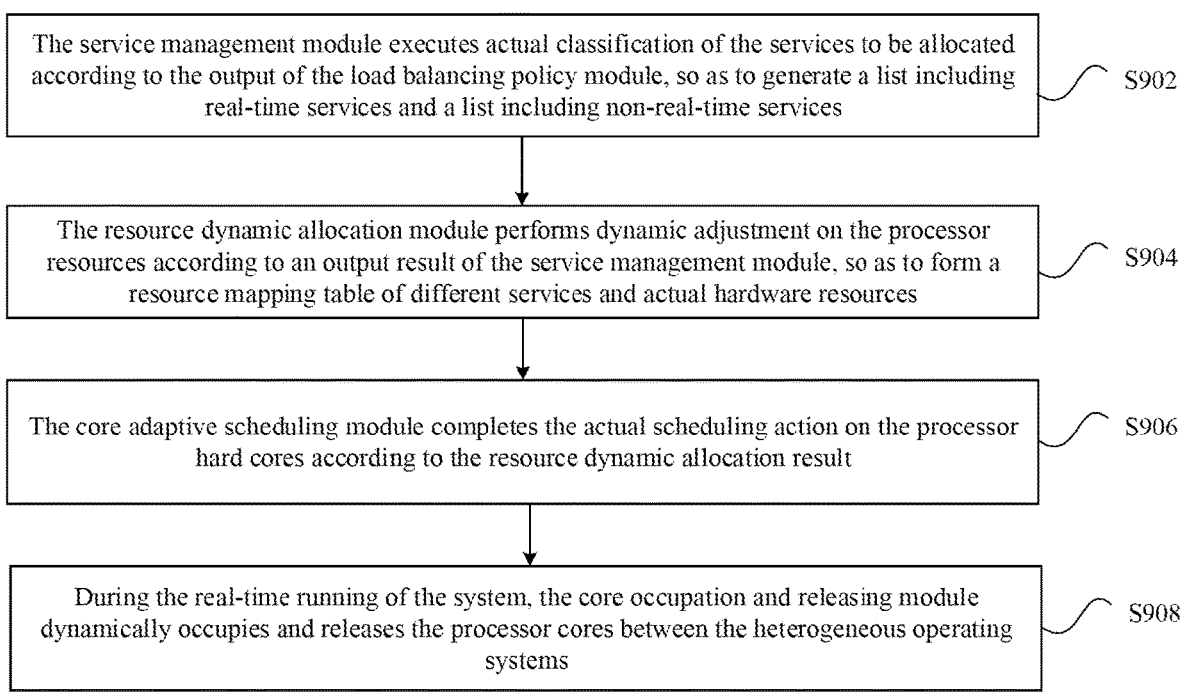
FIG. 9 is a schematic flowchart of still another exemplary embedded system running method according to the embodiments of the present disclosure.

When the heterogeneous operating system is booted to start, the system enters the real-time running phase. Referring to FIG. 7, the real-time running phase is completed collaboratively by functional modules such as a load balancing policy module, a service management module, a core adaptive scheduling module (that is, the resource adaptive scheduling module), a core occupation and releasing module, and an inter-core communication module. In combination with FIG. 7 and FIG. 9, at the real-time running phase, the flow of the embedded system running method in this exemplary example may include the following operation.

At operation S902, the service management module executes actual classification of the services to be allocated according to the output of the load balancing policy module, so as to generate a list including real-time services and a list including non-real-time services.

The load balancing policy module provides strategic guidance for the service management module, including the methods for classifying various services (or processes) running in the system, the principles of evaluating real-time levels, etc. After the RTOS and the Linux system are booted to start, the service management module executes actual classification of the services to be allocated according to the output of the load balancing policy module, so as to generate a list including real-time services and a list including non-real-time services. The two lists outputted by the load balancing policy module are used for representing the correspondence relationship between the services and the operating systems.

For a BMC application, in order to realize powerful and comprehensive management of the server platform, a large number of service processes need to run on the server platform; and in this case, the service management module rationally classifies these services. A feasible classification mode includes: classifying services such as server health state monitoring, Intelligent Platform Management Interface (IPMI) interaction, component monitoring, serial port redirection, asset information management, and Web access into the non-real-time services; and classifying services such as fan control and Platform Environment Control Interface (PECI) communication into the real-time services.

At operation S904, the resource dynamic allocation module performs dynamic adjustment on the processor resources (including processor hard core and controller logic units) according to an output result of the service management module, so as to form a resource mapping table of different services and actual hardware resources.

The mapping table formed by the resource dynamic allocation module is the resource mapping table of the services and the processor resources, which includes the processor resources that have been allocated to each operating system, and also include the processor resources that are not allocated to any operating system. When mapping between the services and actual hardware resources is performed, the processor cores of the RTOS are preferentially allocated for the real-time services; when the processor cores of the RTOS have been allocated to one or more services, unallocated processor cores are then considered to be allocated to the real-time services; the processor cores of the Linux system are allocated to the non-real-time services; and when the processor cores of the Linux system have been allocated to one or more services, the unallocated processor cores are then considered to be allocated to the real-time services. Therefore, there are instances where the unallocated processor cores are allocated to the real-time services or the non-real-time services.

In a practical application, dynamic mapping is performed between hardware resources such as the processor cores and peripheral controllers of the BMC and actual services of the BMC. For example, after a server is turned on, the Core 1 in the BMC runs the RTOS, so as to control Pulse Width Modulation (PWM) and PECI external controller to implement fan speed regulation and fault diagnosis services; and the Core 2-N run the Linux system to control a controller such as an Inter-Integrated Circuit (I2C), so as to implement a component monitoring service. During the running of the system, a dynamic allocation table of the BMC resources is dynamically generated according to the load of the system, so as to prepare for the next core adaptive scheduling process.

Herein, the output resource mapping table may include: real-time service X cores and xxx controllers (certain types of controllers), and non-real-time service Y cores and xxxx controllers (certain types of controllers). Some services depend not only on computation resources (corresponding to the processor cores), but also on a specified hardware interfacing (corresponding to the controller on the SOC). For example, when a service needs to use a network interface, the service and the corresponding network controller need to be divided into the same operating system (the RTOS or the Linux system).

At operation S906, the core adaptive scheduling module completes the actual scheduling action on the processor hard cores according to the resource dynamic allocation result.

The core adaptive scheduling module performs actual scheduling on the processor hard cores according to an output result of the service management module and an output result of the resource dynamic allocation module. For example, a part of processor hard cores are scheduled to execute the real-time services, for example, M cores of a core group 1 shown in FIG. 6; and the rest of the processor hard cores are scheduled to run the non-real-time services, for example, N cores of a core group 2 shown in FIG. 6. The entire scheduling process is led by the Linux system, which may be implemented by configuring the processor hard core resource pool in conjunction with the SMP frame of the Linux. Herein, the total number of cores available to the processor is M+N, where M≥1 and N≥1.

At operation S908, during the real-time running of the system, the core occupation and releasing module dynamically occupies and releases the processor cores between the heterogeneous operating systems.

The occupation and releasing process depends on the real-time load situation of the heterogeneous operating system, so as to achieve the purpose of maximizing the resource utilization rate of the processor. for example, when the number of users accessing the BMC remotely increases from 1 to 20, the Web accessing service volume of the BMC is rapidly increased, causing the Linux system to require more processor hard core support. In this case, the Linux system sends the core occupation request to the RTOS by means of the IPI; when the RTOS is currently in the idle state (that is, there is no service to be scheduled) the RTOS releases the core resources to the Linux system; and at this moment, the Linux system successfully occupies the cores, that is, the Linux obtains more processor resources, so as to deal with the requirements of newly added services. By means of a core occupation and releasing mechanism, user experience in terms of remote server management is significantly improved.

The occupation and releasing process is a dynamic cycling process. Each core occupation and releasing is accompanied by the adjustment of the processor hard core resources. As shown in FIG. 6, the number of the cores of a core group X that are subjected to occupation and releasing once becomes P, and the number of the cores of the core group Y becomes M+N−P. In addition, the occupation and releasing process needs to cooperate with modules such as a load balancing policy module, a service management module, and a core adaptive adjustment module to commonly determine a final core adjustment result.

The above cycling means that, during the normal running of the system, the behavior of resource occupation and releasing due to insufficient resources on one side occurs constantly in both the RTOS and the Linux system. The cycling process involves a coordinated operation of the modules such as "service management (service management is a dynamic division process)-hardware resource dynamic allocation-core adaptive adjustment". The plurality of modules are under the non-RTOS (the Linux system); and considering that most of the main services are under the Linux system, more information and states may be acquired and sensed more conveniently.

That different modules commonly determine the core adjustment result means that when a certain system needs to occupy more core resources, whether the final occupation is successful needs to commonly determined by the modules such as the load balancing policy module, the service management module, and the resource adaptive scheduling module. For example, in one of the possible scenarios, when the Linux system needs more resources, and although the RTOS is in the hibernation and idle state, since the RTOS is woken up soon and runs an important service thread, and the thread also needs more resources during running, in this case, the RTOS cannot release the core resources to the Linux system. The above resource scheduling process, the standard for determining the importance of the services and the operation of not allocating the final resources to the Linux system in this process are all involved in the participation of the modules such as the load balancing policy module, the service management module, and the resource adaptive scheduling module. The respective policies of these module further include the characteristic of openness, which determines that the final core adjustment result commonly determined by the modules is also the result of the combined effect of these policies.

Herein, the RTOS does not occupy the CPU core resources completely after hibernating. When the RTOS is woken up (for example, an external or wake-up timer generates an interrupt, so as to trigger a wake-up action), the control power of specified core resources (for example, Core 0) are acquired again by means of the inter-core interrupt. The RTOS does not need the cores to involve during the period from the hibernation state to re-acquisition of the control power of the cores.

The eight-core processor (Core 1-Core 8) is used as an example below. The mode of dynamic balanced scheduling of processing resources between heterogeneous multi-systems is explained and described. Assuming that the RTOS and the non-RTOS are respectively the RTOS and the Linux system, the flow of dynamic balanced scheduling of processing resources may include the following operations.

At operation S1, the system is powered on, a preset start booting strategy is run, the RTOS is booted based on Core 1 (CPU0), and the Linux system is booted based on Core 8 (CPU7).

At operation S2, the service management module of the Linux system implements the division of the real-time levels of the services of the system based on the load balancing policy module, so as to obtain a real-time service list and a non-real-time service list. Assuming that there are 20 services in total, the real-time services are Service 1 and Service 2, and the non-real-time services are Service 3 to Service 20.

At operation S3, the resource dynamic allocation module and the core adaptive scheduling module are started according to service lists outputted by the service management module; 8 processor cores are divided into a processor core group 1 (assuming Cores 1 and 2 are included) and a core group 2 (assuming Cores 3-8 are included) by the SMP frame of the Linux system; in this case, the system allocates the resources of the core group 1 to the RTOS and executes Service 1 and Service 2, and allocates the resource of the core group 2 to the Linux system and executes Service 3 to Service 20.

At operation S4, during the running of the system, both the RTOS and the Linux operating system monitor the respective load situations. When the service load of one of the parties is too heavy, a core occupation action is sent via the inter-core communication interface; and when the other receives the core occupation request, whether the hard core resources are released to the opposite party is determined according to the self-load situation.

For example, when monitoring, at a certain moment, that the self-load is increased rapidly, the Linux system initiates a core occupation interrupt request (corresponding to the SGI of which interrupt number is 9 in Table 1) to the RTOS via the inter-core communication interface before running out of computing resources. After receiving the core occupation interrupt request, the RTOS checks the busy and idle states of the cores occupied by the RTOS. When it is found that there are idle cores currently (for example, Core 2 is idle), Core 2 is released, and a core releasing interrupt response signal (corresponding to the SGI of which interrupt number is 10 in Table 1) is sent to the Linux system via the inter-core communication interface; after receiving the interrupt response signal, the Linux system merges Core 2 into the available resource pool by means of the SMP frame; and in this case, the processor hard core realize a new adjustment, that is, the RTOS occupies Core 1, and the remaining 7 cores are occupied by the Linux system.

At operation S5, the load situation of the system is updated, and S2 is returned to execute. Different from a multi-core single system and a multi-core fixed multi-system (where each core is fixed to run a particular operating system) in the related art, the method provided in this exemplary example dynamically allocates different hardware processor cores to the RTOS and the non-RTOS according to actual service requirements, and realizes the dynamic scheduling design of the processor resources between the embedded heterogeneous multi-systems based on the processor hard cores at the level of hardware and software system architecture. Due to the dynamic allocability of the processor hard cores, the heterogeneous operating system coexisting in the system may obtain rational processor computing resources according to the self-service load situation, such that, on the one hand, the process capability of the processor on the real-time services may be improved, and on the other hand, the utilization rate of the processor cores is comprehensively improved, the computation performance may be improved, and the purpose of saving hardware costs may be achieved.

In an exemplary application scenario, the embedded system running method in the embodiment is explained and described below in combination with an application scenario where the two operating systems alternately control the running state of the same device (that is, a target device). A processing resource of the first operating system includes a first processor core of the processor; and the processing resources of the second operating system includes a second processor core of the processor. The present implementation provides a start control process of an operating system. The process includes the following operation.

At operation A, a hardware controller of a target device is controlled by the first operating system run on a first processor core of the processor via a second bus, so as to control a running state of the target device.

For devices such as a server, a personal computer, and an industrial personal computer, some specific devices may be equipped to execute operations related to the running of the devices. In the related art, these specific devices generally start to work after a system is powered on. Since, after the system is powered on, it takes a period of time for the operating system run on the processor to normally take over the specific devices, so as to control the running states of the specific devices, the specific devices are uncontrollable during the starting of the operating system.

For example, a fan starts to work after the system is powered on; since it takes a period of time for the operating system run on a CPU to normally take over the fan after the system is powered on, so as to set a rotary speed of the fan, the fan is uncontrollable during the starting of the operating system.

For example, in order to control the fan during the starting of the operating system, the server uses a control mode of combining a BMC and CPLD; the personal computer uses a control mode of an EC chip (the EC chip adjusts the function of the rotary speed of the fan according to temperatures); and the industrial personal computer uses a control mode of a custom chip. During the starting of server, personal computer and industrial personal computer operating systems, the CPLD, the EC chip and the custom chip operation in to control the rotary speed of the fan; and after the operating system is completely started, the control power of the fan is handed over to an application program in the operating system for controlling.

In order to at least partially solve the above technical problems, a start control mode of a multi-core multi-system (for example, a multi-core dual system) may be used to run different operating systems of an embedded system on different processor cores of the processor. Different operating systems have different response speeds. When the second operating system is not started or restarted or the running states of the specific devices cannot be controlled, the running states of the specific devices may be controlled by the first operating system of which response speed is higher than the response speed of the second operating system, such that uncontrollable situations of the running states of the specific devices may be reduced. In addition, since extra costs do not need to be added, good extendibility is also achieved.

In the present implementation, when the second operating system is not started or restarted or the running states of the specific devices cannot be controlled, the hardware controller of the target device may be controlled by the first operating system via the second bus, so as to control the running state of the target device. The target device here may be the fan or other devices that are required to run when the system is started. For the fan, the corresponding hardware controller is a fan controller, such as a Pulse Width Modulation (PWM) controller and a FanTach controller. Herein, by using the first operating system (for example, RTOS) to replace traditional CPLD, EC chip and custom chip, in one aspect, hardware costs may be reduced, and in the other aspect, since device control is implemented by software, higher extendibility may be achieved.

For example, a dual system, the RTOS and the Linux system are implemented based on a BMC dual core; and the fan is implemented based on the multi-core dual system. By using the high real-time nature of the RTOS, during the starting of the Linux system, the fan may be controlled by replacing the CPLD, the EC chip and the custom chip with the RTOS, that is, taking over the control power of the fan, such that a running state of the fan is controlled at a speed fast enough.

At operation B, a second processor core of the processor is booted to start the second operating system.

When the system is powered on or the second operating system is restarted, the second processor core of the processor may be booted to start the second operating system, so as to cause the second operating system to run on the second processor core. Herein, starting the second operating system on the second processor core means that the second processor core is scheduled to the second operating system. A system file or a mirror file of the operating system may be stored on the chip where the processor is located or in memories other than the chip, for example, in an external RAM.

At operation C, after the second operating system is started, the second operating system takes over the hardware controller via the second bus, so as to take over the control power of the target device.

After the starting of the second operating system is completed, the running state of the target device may always be controlled by the first operating system. Considering that running a plurality of operating systems on a multi-core processor needs to perform data interaction among the plurality of operating systems, so as to cause one operating system to conveniently perform overall control of the device, the control power of the target device may also be taken over by the second operating system. For example, the hardware controller may be taken over by the second operating system via the second bus. The method that the second operating system takes over the control power of the target device may include: after the second operating system is started, sending, by the second operating system, a device takeover request to the first operating system. For example, the interrupt request is sent by a first bus, so as to request to take over the hardware controller of the target device. The first operating system may receive the device takeover request sent by the second operating system, hand over the control power of the target device to the second operating system, and may also execute operations related to the transfer to the control power of the target device, for example, stopping running a service (process) for controlling the running state of the target device.

For example, after the Linux system is completely started, the RTOS hands over the control power of the fan to the Linux system, and then the fan is controlled by the Linux system. The above process may be executed after the system is powered on, that is, the start mode of the multi-core dual system is used; the RTOS is first started, facilitating earlier stepping-in of fan control; and then after the Linux system is completely started, the RTOS hands over the control power of the fan to the Linux system for controlling.

In an exemplary embodiment, before the hardware controller of the target device is controlled by the first operating system run on the first processor core of the processor via the second bus, the method may further include: after the chip where the processor is located, waking up the first processor core by the processor; and running a boot loader of the first operating system through the first processor core, so as to boot the first operating system to start on the first processor core.

The entire system may be divided into two phases according to working time periods, which are an initial starting phase and a real-time running phase. A start control method in the embodiment may be executed at the initial starting phase and the real-time running phase. For the initial starting phase, the initial starting phase starts when the system is powered on, that is, the chip where the processor is located is powered on. After the system is powered on, one core is woken up to execute a booting action of the operating system, and the rest of the cores are in a hibernation state temporarily. The woken core may be the first processor core.

In some exemplary implementations, after being powered on, the system first executes a preset core scheduling strategy (a start booting strategy). That is to say, the core scheduling strategy is executed by one processor core of the processor. The core scheduling strategy may be stored in an RAM or a non-volatile flash memory (Norflash) on an SOC. The scheduling strategy may be flexibly configured according to different design requirements. The main functions of the scheduling strategy include: specify initial processing resources (processor cores) that need to be run for different operating systems, and determining a booting process of the heterogeneous operating systems, where the powering-on of the chip may refer to powering-on at an SOC level.

After the first processor core is woken up, the first operating system may be booted to run on the first processor core through the boot loader; and the first processor core may boot the first operating system to start on the first processor core through the boot loader. The boot loader may be located on a computer or other computer applications, and refers to a program that is used to boot the operating system to load, for example, an inherent program in Boot Rom. The inherent program refers to codes that boot the operating system to start, and belongs to a Boot Loader program. The Boot Rom is a small mask Read-Only Memory (ROM) or a write-protect flash memory in an embedded processor chip on the CPU.

At the initial starting phase, by using the boot loader to boot the operating system to start on the corresponding processor core, the success rate of the starting of the operating system may be improved, and preparation is made for the real-time running phase.

In an exemplary embodiment, controlling the hardware controller of the target device by the first operating system run on the first processor core of the processor via the second bus includes: executing, on the first processor core, a first control task of the first operating system, where the first control task is configured to control the hardware controller; reading, by means of the first processor core, sensor data of a specified sensor corresponding to the target device; and sending a device control instruction to the hardware controller through the first control task according to the sensor data of the specified sensor via the second bus, so as to cause the hardware controller to control the running state of the target device according to the device control instruction.

The control of the hardware controller of the target device by the operating system may be executed by controlling the hardware controller by a control task (service) on the processor core run by the operating system. The control task here may refer to the corresponding control task. For the hardware controller of the target device, the first control task (first control process) of the first operating system may be executed on the first processor core, and the hardware controller is controlled by the first control task.

The control of the hardware controller may be performed based on the sensor data of the sensor. For different target devices, parameters affecting the running of the target devices are different; and correspondingly, there may be differences in the sensor data to be acquired. The target device may be a device that runs after the chip is powered on, and the sensor corresponding to the target device is the specific sensor. There may be various types of the specific sensors, which may, but is not limited to, include at least one of: a temperature sensor, a humidity sensor, or a noise sensor. The first control task is run on the first processor core, such that the sensor data of the specific sensor may be read by the first processor core. The sensor data of the specific sensor may be stored in a storage space in the specific sensor, and may be transmitted to a specified storage space by the specific sensor. A reading position of the sensor data of the specific sensor is not limited in the embodiment.

The read sensor data of the specific sensor may be sensor data within a time period, or may be all the sensor data since the target device is started, and may also be the sensor data that meets other time-limited conditions. After the sensor data of the specific sensor is acquired, the first control task may control the running state of the target device according to the sensor data of the specific sensor. The control of the running state of the target device may be implemented by the following method, including: sending, by the first control task, the device control instruction to the hardware controller of the target device, so as to cause the hardware controller to control the running state of the target device according to the device control instruction.

In some exemplary implementations, the first control task may determine an expected running state of the target device based on the sensor data of the specific sensor; insofar as the current running state of the target device is different from the expected running state, the device control instruction may be generated; and the device control instruction may control and adjust the running state of the target device to the expected running state. The device control instruction may be sent to the hardware controller of the target device via the second bus. The second bus is similar to that in the foregoing embodiments, and is not described herein again.

The utilization rate of resources may be improved by reading the sensor data of the specified sensor, and controlling the target device according to the sensor data, so as to control the running state of the target device.

In an exemplary embodiment, sending the device control instruction to the hardware controller through the first control task according to the sensor data of the specified sensor via the second bus includes: determining, by the first control task, a target parameter value of device running parameters of the target device according to sensor data of the specified sensor, where the device running parameters are parameters for controlling the running state of the target device; and sending, by the first control task, the device control instruction carrying the target parameter value to the hardware controller via the second bus.

The first control task may determine the expected running state of the target device according to the sensor data of the specified sensor. The expected running state may be represented by a parameter value of the device running parameters. The device running parameters may be parameters for controlling the running state of the target device. For different types of devices, the corresponding device running parameters may be different. For example, for the fan, the corresponding device running parameter may be the rotary speed; and for other types of devices, the device running parameters may be other running parameters. The expected running state may correspond to the target parameter value of the device running parameters of the target device.

After the target parameter value of the device running parameters of the target device is determined, the target parameter value may be carried in the device control instruction. That is to say, the device control instruction carrying the target parameter value is sent to the hardware controller through the first control task. The mode of sending the device control instruction to the hardware controller may be similar to that in the foregoing embodiments, and is not described herein again.

The accuracy of device control may be improved by determining the parameter value of the device running parameters of the target device according to the sensor data, and carrying the determined parameter value in the device control instruction.

In an exemplary embodiment, determining, by the first control task, the target parameter value of the device running parameters of the target device according to the sensor data of the specified sensor includes: when the target device is the fan, determining, by the first control task, a target parameter value of fan running parameters of the fan according to the sensor data of the specified sensor.

The target device may be the fan, which may be configured to cool a server or other devices, that is, a cooling fan. In this case, the device running parameters may be the fan running parameters. There may be one or more fan running parameters; and the fan running parameters may include, but are not limited to, at least one of: a rotary speed, a rotary period, or period switching time, and may also be other running parameters. The embodiment is not limited thereto.

Correspondingly, determining, by the first control task, the target parameter value of the device running parameters of the target device according to the sensor data of the specific sensor may be to determine, by the first control task, the target parameter value of the fan running parameters of the fan according to the sensor data of the specific sensor. After the target parameter value is obtained, the first control task sends the device control instruction carrying the target parameter value to the hardware controller of the fan via the second bus, so as to control the running state of the fan.

By controlling the running state of the fan, the running state of the fan may be rapidly controlled in scenarios such as the powering-on of the system and the restarting of the system, so as to control the fan in time.

In an exemplary embodiment, when the target device is the fan, determining, by the first control task, the target parameter value of the fan running parameters of the fan according to the sensor data of the specified sensor includes: when the target device is the fan and the specified sensor is a temperature sensor, determining, by the first control task, a target rotary speed value of the rotary speed of the fan according to the sensor data of the temperature sensor, where the rotary speed of the fan is positively correlated with the temperature measured by the temperature sensor.

For the scenario that the target device is the fan, the specific sensor may be the temperature sensor. There may be one or more temperature sensors. The arrangement position of the temperature sensor may be configured according to requirements. Different temperature sensors may be arranged on different positions. In some exemplary implementations, the sensor data of the temperature sensor is used for representing the temperature measured by the temperature sensor. For this, the first control task may determine the target rotary speed value of the rotary speed of the fan according to the sensor data of the temperature sensor. Herein, the rotary speed of the fan is positively correlated with the temperature measured by the temperature sensor.

When there are a plurality of temperature sensors, the highest temperature measured by the plurality of temperature sensors may be determined according to the sensor data of each temperature sensor. The rotary speed of the fan may be determined according to the highest temperature measured by the plurality of temperature sensors. The rotary speed of the fan is determined relative to an average temperature measured by the plurality of temperature sensors, such that the running safety of the devices may be guaranteed. For the scenario that there are a plurality of fans, the rotary speed of each fan may also be determined based on the highest temperature or the average temperature measured by the temperature sensor matching each fan.

For example, the rotary speed of the fan may be controlled by using the first operating system (for example, RTOS) to replace processing units such as the CPLD, the EC chip and the custom chip (BMC fan control may be performed in real time). When the system is just powered on, the first processor core (for example, CPU0, the first processor core may be woken up by hardware) may be woken up. The first processor core runs the boot loader (for example, a specified program in the BootRom), so as to load the first operating system to start. The first processor core performs fan control (for example, fan speed control) by reading various sensor data related to the temperatures, to completely simulate the processing units, so as to complete the regulation functions of the fan. When fan speed control is performed, the first operating system may calculate a PWM value according to the temperature sensor, so as to adjust the rotary speed of the fan. In this way, the rotary speed of the fan may be controlled by the first operating system during the starting of the second operating system.

In an exemplary embodiment, booting the second operating system to start on the second processor core of the processor includes: executing a Second Program Loader (SPL) by the first processor core, so as to cause the SPL to wake up the second processor core; and running a Universal Boot Loader (U-Boot) of the second operating system by the second processor core, so as to boot the second operating system to start on the first processor core.

In the present implementation, when the operating system is started, the SPL may be loaded in an internal memory, such as a Static Random-Access Memory (SRAM) in the SOC; and the SPL may be responsible for loading the U-Boot into an RAM. The SPL may boot and load the second operating system, and may also boot and load the first operating system.

The second operating system may execute the SPL through the first processor core, so as to cause the SPL to wake up the second processor core; and by means of the second processor core, the U-Boot of the second operating system may be run, so as to boot the second operating system to start on the first processor core. Herein, the boot loader of the second operating system is booted and loaded by the SPL; and the boot loader of the second operating system may include the U-Boot.

It is to be noted that, the SPL is codes executed at a first phase of the U-Boot, and may be responsible for carrying codes of a second phase of the U-Boot into a system RAM (which is also called an off-chip memory) for running. The U-Boot is open source software that follows a General Public License (GPL) protocol, and may be regarded as a comprehensive bare metal routine.

For example, after the system is powered on, the processor first wakes up the CPU0 core, so as to let the RTOS to run as fast as possible; then a program in the BootRom is used to boot the RTOS to start; and during the starting of the RTOS, the U-Boot is continuously loaded through the SPL, and the U-Boot boots the second operating system to start on the CPU1, until the Linux system is normally started.

It is to be noted that, the Boot Rom is an ROM solidification program in the chip (for example, the SOC), and is a boot code of the U-Boot. The Boot Rom reads start information (for example, dial switch settings) of hardware, and reads a uboot-spl code (that is, the SPL) from a specified start medium (for example, SD and MMC). The SPL is mainly responsible for initializing the external RAM and environment, and loading a real U-Boot image into the external RAM for execution. The external RAM may be a Double Data Rate (DDR) Synchronous Dynamic Random-Access Memory, or may be other RAMs.

The second processor core is woken up by the SPL, and then the second processor core runs the U-Boot, such that the second operating system on the corresponding processor core is booted, thereby improving the convenience and success rate of the starting of the operating system. As an exemplary example, a start process of the multi-core dual system is explained and described by using the RTOS and the Linux system as an example.

In order to take over fan management as fast as possible, the RTOS may be started as much as possible; and after the starting of the Linux system is completed, the Linux system takes over the control power of the fan. The start process of the multi-core dual system may include the following operations.

At operation S1, the CPU0 is woken up when the system is just powered on.

At operation S2, the CPU0 runs a specific program in BootRom, and the RTOS is loaded for starting.

At operation S3, during the starting of the RTOS, a CPU1 is woken up to boot the U-Boot, and a fan control program (FanCtrl_RTOS_APP) in the first operating system is started.

At operation S4, booting the U-Boot by the CPU1 may include an SPL phase and a U-Boot phase, and the SPL phase is entered by calling the SPL.

At operation S5, at the SPL phase, the SPL boots the U-Boot to start.

At operation S6, at the U-Boot phase, Linux cores (CPU1-CPUN) are loaded, and a BMC service program and a fan control program (FanCtrl_Linux_APP) in the second operating system are started.

By means of this exemplary example, during the starting and running of the dual system, the RTOS is first started to control the fan, and after the Linux system is started, the second operating system takes over the control power of the fan, such that the fan may be rapidly controlled when the system is powered on, thereby improving the efficiency of fan control.

In an exemplary embodiment, after the hardware controller is taken over by the second operating system via the second bus, the method may further include: when the second operating system is to be restarted, waking up the first operating system by the second operating system via the first bus, and taking over the hardware controller by the first operating system via the second bus, so as to take over the control power of the target device; and controlling the second operating system to perform system restarting.

When restarting is required due to reasons such as system breakdown and receiving of a reboot command, the second operating system may first wake up the first operating system, and the hardware controller is taken over by the first operating system, so as to take over the control power of the target device. The waking up of the first operating system may be executed by the first bus, and the takeover of the hardware controller by the first operating system may be executed via the second bus.

When the second operating system is restarted, the first operating system is woken up to take over the control power of the target device, such that the reliability of device control may be improved.

In an exemplary embodiment, when the second operating system is to be restarted, waking up the first operating system by the second operating system via the first bus includes: when the second operating system is to be restarted, sending a system wake-up interrupt to the first operating system by the second operating system via the first bus, where the system wake-up interrupt is configured to wake up the first operating system.

The waking up of the first operating system may be implemented by means of inter-core interruption. When the second operating system is to be restarted (for example, system breakdown and receiving of the reboot command), the second operating system may send the system wake-up interrupt to the first operating system, so as to wake up the first operating system. The system wake-up interrupt may be an active wake-up interrupt. After the first operating system takes over the hardware controller, the second operating system may be controlled to perform system restarting; and after the second operating system is restarted, the hardware controller may be taken over again. The process of taking over the hardware controller is similar to that in the foregoing embodiments, and is not described herein again.

From the above descriptions about the implementation modes, those having ordinary skill in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

Another aspect of the embodiments of the present disclosure further provides an embedded system that is configured to implement the embedded system running method. The embedded system may run on the BMC chip. The embedded system may include a first operating system, a second operating system, a service management module, a resource dynamic allocation module, and a resource adaptive scheduling module.

The first operating system and the second operating system run on a processor, and the response speed of the first operating system is higher than the response speed of the second operating system.

The service management module is configured to allocate, according to a resource dynamic allocation rule, a group of services to be allocated to the corresponding operating systems, where the resource dynamic allocation rule includes performing resource dynamic allocation according to at least one of: a service response speed, and a service resource occupation rate.

The resource dynamic allocation module is configured to determine a resource allocation result corresponding to the group of services to be allocated. The resource allocation result is configured to indicate the processing resource corresponding to each service to be allocated in the group of services to be allocated in the processing resources of the processor. The processing resources of the processor include processor cores.

The resource adaptive scheduling module is configured to allocate the processing resources of the processor to the first operating system and the second operating system according to an operating system allocation result and the resource allocation result corresponding to each of the group of services to be allocated.

In the embodiment, the first operating system and the second operating system may be similar to those in the foregoing embodiments, and are not described herein again. The service management module, the resource dynamic allocation module, and the resource adaptive scheduling module may be software modules running under the first operating system or the second operating system. By performing module division, the development and maintenance of different functional modules may be facilitated, and at the same time, the flexibility of resource allocation may be improved by flexibly setting the resource dynamic allocation rule.

By means of the embedded system, the embedded system includes: the first operating system and the second operating system, running on the processor, where the response speed of the first operating system is higher than the response speed of the second operating system; the service management module, configured to allocate, according to the resource dynamic allocation rule, the group of services to be allocated to the corresponding operating systems, where the resource dynamic allocation rule includes performing resource dynamic allocation according to at least one of: the service response speed, or the service resource occupation rate; the resource dynamic allocation module, configured to determine resource allocation results corresponding to the group of services to be allocated, where the resource allocation results are used for indicating the processing resource corresponding to each of the group of services to be allocated in processing resources of the processor, and the processing resources of the processor include processor cores; and the resource adaptive scheduling module, configured to allocate the processing resources of the processor to the first operating system and the second operating system according to the operating system allocation result and the resource allocation result corresponding to each of the group of services to be allocated. Therefore, the problem of low overall utilization rate of core resources due to the idle state of most of the processing resources of the multi-core processor in the related art may be solved, thereby improving the utilization rate of the processing resources.

In an exemplary embodiment, the embedded system may further include a load balancing policy module.

The load balancing policy module is configured to read a rule configuration file, so as to generate a rule structure body, where the rule structure body is used for recording the resource dynamic allocation rule.

The load balancing policy module in the embodiment is similar to that in the foregoing embodiments, and is not described herein again. Herein, the load balancing policy module may be a software module under the first operating system or the second operating system. A load balancing policy is configured to be stored by an individual software module, such that the load balancing policy may be conveniently flexibly adjusted.

In an exemplary embodiment, the load balancing policy module is further configured to perform the following operation.

A rule updating configuration file is acquired via an external interface of the second operating system, where the rule updating configuration file is used for updating the resource dynamic allocation rule that has been configured; and the rule updating configuration file is used to update the rule structure body, so as to update the resource dynamic allocation rule recorded by the rule structure body.

In the embodiment, the resource dynamic allocation rule stored in the load balancing policy module may be flexibly configured via the external interface of the second operating system. A configuration mode is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service response speed in the resource dynamic allocation rule.

Services having service response speed requirements greater than or equal to a set response speed threshold in the group of services to be allocated are allocated to the first operating system, and services having service response speed requirements less than the set response speed threshold in the group of services to be allocated are allocated to the second operating system.

In the embodiment, the method that the service management module allocates, according to the service response speed, the services to be allocated is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service resource occupation rate in the resource dynamic allocation rule.

Services having service resource occupation rates less than a first occupation rate threshold in the group of services to be allocated are allocated to the first operating system, and services having service resource occupation rates greater than or equal to the first occupation rate threshold in the group of services to be allocated are allocated to the second operating system.

In the embodiment, the method that the service management module allocates, according to the service resource occupation rate, the services to be allocated is similar to that in the foregoing embodiments, and is not described herein again.

In an exemplary embodiment, the service management module is further configured to implement, by executing at least one of the following operations, allocation of the group of services to be allocated to the corresponding operating systems.

Services, whose service coupling degree with services allocated to the first operating system is greater than or equal to a first coupling degree threshold, in the group of services to be allocated are allocated to the first operating system.

Services, whose service coupling degree with services allocated to the second operating system is greater than or equal to a second coupling degree threshold, in the group of services to be allocated are allocated to the second operating system.

In the embodiment, the method that the service management module allocates, according to the service coupling degree, the services to be allocated is similar to that in the foregoing embodiments, and is not described herein again.

In an exemplary embodiment, the service management module is further configured to implement, by executing the following operations, allocation of the group of services to be allocated to the corresponding operating systems.

Services, that include sensitive information, in the group of services to be allocated are allocated to a target operating system. The target operating system is an operating system, that has a lower frequency of interaction with a use object, in the first operating system and the second operating system.

In the embodiment, the method that the service management module allocates, to the first operating system, the services to be allocated that include sensitive information is similar to that in the foregoing embodiments, and is not described herein again.

It is to be noted that, the allocation of the services to be allocated by the service management module based on the service response speed and the service resource occupation rate is executed based on the resource dynamic allocation rule stored in the load balancing policy module; and the allocation of the services to be allocated based on the service coupling degree and the service importance (for example, whether the sensitive information is included) may be executed by the service management module based on the preset configuration information. Since a processing resource allocation rule based on the service coupling degree and the service importance is generally stable, and the service response speed and the service resource occupation rate may be flexibly configured based on requirements, the resource dynamic allocation rule of performing resource dynamic allocation according to at least one of the service response speed or the service resource occupation rate is stored by the individual software module, such that both flexibility and conciseness of rule configuration may be taken into consideration.

In an exemplary embodiment, the resource dynamic allocation module is configured to execute a following operation to determine the resource allocation results corresponding to the group of services to be allocated.

According to allocation results of the service management module, in combination with resource utilization of the processing resources of the first operating system and resource utilization of the processing resources of the second operating system, a resource mapping table between the group of services to be allocated and the processing resources of the processor is generated.

In the embodiment, the method that the resource dynamic allocation module generates the resource mapping table of the group of services to be allocated and the processing resources of the processor is similar to that in the foregoing embodiments, and is not described herein again.

In an exemplary embodiment, the resource dynamic allocation module is configured to allocate the processing resources of the processor to the first operating system and the second operating system in units of the processor cores.

In an exemplary embodiment, the resource adaptive scheduling module is configured to execute a following operation to allocate the processing resources of the processor to the first operating system and the second operating system according to the operating system allocation result and the resource allocation result corresponding to each of the group of services to be allocated.

When it is determined, according to the resource allocation results, that unallocated processing resources in the processing resources of the processor correspond to services to be allocated, the unallocated processing resources are allocated to the operating system to which the services to be allocated corresponding to the unallocated processing resources are allocated.

In the embodiment, the method that the resource adaptive scheduling module allocates the unallocated processing resources to the operating systems is similar to that in the foregoing embodiments, and is not described herein again.

In an exemplary embodiment, the embedded system may further include a resource occupation and releasing module.

The resource occupation and releasing module is configured to perform occupation and releasing of processing resources between the first operating system and the second operating system.

In the embodiment, the method that the resource occupation and releasing module is configured to perform occupation and releasing of the processing resources between different operating systems is similar to that in the foregoing embodiments, and is not described herein again.

In an exemplary embodiment, the resource occupation and releasing module is configured to perform occupation and releasing of the processing resources between the first operating system and the second operating system via the inter-core communication interface.

In an exemplary embodiment, the resource occupation and releasing module is configured to implement, by executing the following operations, occupation and releasing of the processing resources between the first operating system and the second operating system via the inter-core communication interface.

A first interaction request of the first operating system is transmitted to the second operating system via the inter-core communication interface. The first interaction request is used for requesting to perform resource interaction with the second operating system, and the resource interaction includes at least one of: resource occupation and resource releasing.

A first interaction response that is returned by the second operating system in response to the first interaction request is acquired via the inter-core communication interface. The first interaction response is used for indicating the first operating system to perform the resource interaction with the second operating system according to the first interaction response.

In the embodiment, the method that the resource occupation and releasing module performs resource interaction between the first operating system and the second operating system via the inter-core communication interface is similar to that in the foregoing embodiments, and is not described herein again.

In an exemplary embodiment, the embedded system may further include a first system control module.

The first system control module is configured to detect a resource utilization rate of the processing resources of the first operating system, and when it is determined, according to the resource utilization rate of the processing resources of the first operating system, that the first operating system is to perform the resource interaction with the second operating system, trigger the resource occupation and releasing module to transmit the first interaction request to the second operating system via the inter-core communication interface.

In the embodiment, the method that the first system control module triggers the resource interaction based on the resource utilization rate of the processing resources of the first operating system is similar to that in the foregoing embodiments, and is not described herein again.

In an exemplary embodiment, the first system control module is further configured to execute at least one of the following operations: when the resource utilization rate of the processing resources of the first operating system is greater than or equal to a first utilization rate threshold, determining that the first operating system is to occupy the processing resources of the second operating system; and when the processing resources of the first operating system are in an idle state and there is no service to be executed by the first operating system, determining that the first operating system is to release the processing resources to the second operating system.

In the embodiment, the method that the first system control module determines the resource interaction type to be performed by the first operating system is similar to that in the foregoing embodiments, and is not described herein again.

In an exemplary embodiment, the first system control module is further configured to control the first operating system to enter a hibernation state when the first operating system has no service to schedule and there is no service to be allocated to the first operating system.

In the embodiment, the method that the first system control module controls the first operating system to enter the hibernation state is similar to that in the foregoing embodiments, and is not described herein again.

In an exemplary embodiment, the resource occupation and releasing module is configured to implement, by executing at least one of the following operations, transmission of the first interaction request of the first operating system to the second operating system via the inter-core communication interface.

A first occupation request of which interrupt number is a first interrupt number is transmitted to the second operating system via the inter-core communication interface, and the first occupation request is used for requesting to occupy the processing resources of the second operating system.

A resource releasing request of which interrupt number is a second interrupt number is transmitted to the second operating system via the inter-core communication interface, and the resource releasing request is used for requesting to release the processing resources occupied by the first operating system to the second operating system.

In the embodiment, the method that the resource occupation and releasing module performs resource interaction by means of the inter-core interrupt is similar to that in the foregoing embodiments, and is not described herein again.

In an exemplary embodiment, the resource occupation and releasing module is configured to implement, by executing the following operations, occupation and releasing of the processing resources between the first operating system and the second operating system via the inter-core communication interface.

A second interaction request of the second operating system is transmitted to the first operating system via the inter-core communication interface, and the second interaction request is used for requesting to occupy the processing resources of the first operating system.

A second interaction response that is returned by the first operating system in response to the second interaction request is acquired via the inter-core communication interface, and the second interaction response is used for indicating whether the first operating system allows the second operating system to occupy the processing resources of the first operating system.

In the embodiment, the method that the resource occupation and releasing module performs resource interaction between the first operating system and the second operating system via the inter-core communication interface is similar to that in the foregoing embodiments, and is not described herein again.

In an exemplary embodiment, the embedded system may further include a second system control module.

The second system control module is configured to detect a resource utilization rate of the processing resources of the second operating system, and when it is determined, according to the resource utilization rate of the processing resources of the second operating system, that the second operating system is to occupy the processing resources of the first operating system, trigger the resource occupation and releasing module to transmit the second interaction request to the first operating system via the inter-core communication interface.

In the embodiment, the method that the second system control module triggers the resource interaction based on the resource utilization rate of the processing resources of the second operating system is similar to that in the foregoing embodiments, and is not described herein again.

In an exemplary embodiment, the second system control module is further configured to execute at least one of the following operations.

When the current resource utilization rate of the processing resources of the second operating system is greater than or equal to a second utilization rate threshold, it is determined that the second operating system is to occupy the processing resources of the second operating system.

When it is determined, according to ongoing services of the second operating system and services to be executed of the second operating system, that the resource utilization rate of the processing resources of the second operating system is greater than or equal to a third utilization rate threshold, it is determined that the second operating system is to occupy the processing resources of the second operating system.

In the embodiment, the method that the second system control module determines the resource interaction to be performed by the second operating system is similar to that in the foregoing embodiments, and is not described herein again.

In an exemplary embodiment, the first operating system is further configured to, when a service priority of ongoing services of the first operating system is not lower than a service priority of the services to be executed of the second operating system, determine that the first operating system does not allow the second operating system to occupy the processing resources of the first operating system; and when the service priority of ongoing services of the first operating system is lower than the service priority of the services to be executed of the second operating system, determine that the first operating system allows the second operating system to occupy the processing resources of the first operating system.

In the embodiment, the method that the embedded system determines whether the first operating system allows the second operating system to occupy the processing resources is similar to that in the foregoing embodiments, and is not described herein again.

In an exemplary embodiment, the resource occupation and releasing module is configured to execute a following operation to transmit the second interaction request of the second operating system to the first operating system via the inter-core communication interface.

A second occupation request of which interrupt number is a third interrupt number to the first operating system is transmitted via the inter-core communication interface, and the second occupation request is used for requesting to occupy the processing resources of the first operating system.

In the embodiment, the method that the resource occupation and releasing module performs resource interaction by means of the inter-core interrupt is similar to that in the foregoing embodiments, and is not described herein again.

In an exemplary embodiment, the resource occupation and releasing module is configured to implement, by executing at least one of the following operations, acquisition, via the inter-core communication interface, of the second interaction response returned by the first operating system in response to the second interaction request.

A resource-release allowing response of which interrupt number is a fourth interrupt number is transmitted to the second operating system via the inter-core communication interface, and the resource-release allowing response is used for indicating that the first operating system allows the second operating system to occupy the processing resources of the first operating system. A resource-release rejection response of which interrupt number is a fifth interrupt number is transmitted to the second operating system via the inter-core communication interface, and the resource-release rejection response is used for indicating that the first operating system does not allow the second operating system to occupy the processing resources of the first operating system.

In the embodiment, the method that the resource occupation and releasing module performs resource interaction by means of the inter-core interrupt is similar to that in the foregoing embodiments, and is not described herein again.

In an exemplary embodiment, the resource adaptive scheduling module is further configured to execute at least one of the following operations: merging, into an available resource pool of the first operating system, the processing resources of the second operating system that are occupied by the first operating system; and merging, into an available resource pool of the second operating system, the processing resources of the first operating system that are occupied by the second operating system or the processing resources that are proactively released to the second operating system by the first operating system.

In the embodiment, the method that the resource adaptive scheduling module performs processing resource scheduling between different operating systems is similar to that in the foregoing embodiments, and is not described herein again.

In an exemplary embodiment, the embedded system may further include a system start module.

The system start module is configured to, after a chip where the processor is located is powered on, boot the first operating system to run on a first initial processing resource through a boot loader, and boot the second operating system to run on a second initial processing resource through the boot loader. The first initial processing resource is an initial processing resource, which corresponds to the first operating system, in the processing resources of the processor; and the second initial processing resource is an initial processing resource, which corresponds to the second operating system, in the processing resources of the processor.

In the embodiment, the method that the system start module boots each operating system to run on the corresponding initial processing resources through the boot loader is similar to that in the foregoing embodiments, and is not described herein again.

In an exemplary embodiment, the first initial processing resource is a specified processor core in the processor cores of the processor; and the second initial processing resource is the processor cores in the processor cores of the processor other than the specified processor core.

In an exemplary embodiment, the system start module is configured to execute a following operation to boot the first operating system to run on the first initial processing resource through the boot loader.

The first operating system is booted to run on the first initial processing resource through an SPL.

In the embodiment, the method that the system start module boots the operating systems to run on the initial processing resources through the SPL is similar to that in the foregoing embodiments, and is not described herein again.

In an exemplary embodiment, the system start module is further configured to perform safe start checking on codes of the SPL by running a preset program fixed in a start chip on a device mainboard. The SPL is executed after a check result of the safe start checking is normal.

In the embodiment, the method that the system start module performs safe start checking on the codes of the SPL is similar to that in the foregoing embodiments, and is not described herein again.

In an exemplary embodiment, the system start module is configured to execute a following operation to boot the second operating system to run on the second initial processing resource through the boot loader.

The second initial processing resource is woken up through the SPL, and booting to execute a U-Boot, so as to boot the second operating system to run.

In the embodiment, the method that the system start module boots the second operating system to run through the SPL is similar to that in the foregoing embodiments, and is not described herein again.

Another aspect of the embodiments of the present disclosure further provides an embedded system that is configured to implement the embedded system running method. The embedded system may run on the BMC chip. The embedded system may include a first operating system, a second operating system, a service management module, a resource dynamic allocation module, and a resource adaptive scheduling module.

The first operating system and the second operating system run on a processor, and the response speed of the first operating system is higher than the response speed of the second operating system.

The service management module is configured to allocate, according to a resource dynamic allocation rule, a group of services to be allocated to the corresponding operating systems, where the resource dynamic allocation rule includes performing resource dynamic allocation according to at least one of: a service response speed, and a service resource occupation rate.

The resource dynamic allocation module is configured to determine a resource allocation result corresponding to the group of services to be allocated. The resource allocation result is configured to indicate the processing resource corresponding to each service to be allocated in the group of services to be allocated in the processing resources of the processor. The processing resources of the processor include processor cores.

The resource adaptive scheduling module is configured to allocate the processing resources of the processor to the first operating system and the second operating system according to an operating system allocation result and the resource allocation result corresponding to each of the group of services to be allocated.

In the embodiment, the first operating system and the second operating system may be similar to those in the foregoing embodiments, and are not described herein again. The service management module, the resource dynamic allocation module, and the resource adaptive scheduling module may be software modules running under the first operating system or the second operating system. By performing module division, the development and maintenance of different functional modules may be facilitated, and at the same time, the flexibility of resource allocation may be improved by flexibly setting the resource dynamic allocation rule.

By means of the embedded system, the embedded system includes: the first operating system and the second operating system, running on the processor, where the response speed of the first operating system is higher than the response speed of the second operating system; the service management module, configured to allocate, according to the resource dynamic allocation rule, the group of services to be allocated to the corresponding operating systems, where the resource dynamic allocation rule includes performing resource dynamic allocation according to at least one of: the service response speed, or the service resource occupation rate; the resource dynamic allocation module, configured to determine resource allocation results corresponding to the group of services to be allocated, where the resource allocation results are used for indicating the processing resource corresponding to each of the group of services to be allocated in processing resources of the processor, and the processing resources of the processor include processor cores; and the resource adaptive scheduling module, configured to allocate the processing resources of the processor to the first operating system and the second operating system according to the operating system allocation result and the resource allocation result corresponding to each of the group of services to be allocated. Therefore, the problem of low overall utilization rate of core resources due to the idle state of most of the processing resources of the multi-core processor in the related art may be solved, thereby improving the utilization rate of the processing resources.

In an exemplary embodiment, the embedded system may further include a load balancing policy module.

The load balancing policy module is configured to read a rule configuration file, so as to generate a rule structure body, where the rule structure body is used for recording the resource dynamic allocation rule.

The load balancing policy module in the embodiment is similar to that in the foregoing embodiments, and is not described herein again. Herein, the load balancing policy module may be a software module under the first operating system or the second operating system. A load balancing policy is configured to be stored by an individual software module, such that the load balancing policy may be conveniently flexibly adjusted.

In an exemplary embodiment, the load balancing policy module is further configured to perform the following operation.

A rule updating configuration file is acquired via an external interface of the second operating system, where the rule updating configuration file is used for updating the resource dynamic allocation rule that has been configured; and the rule updating configuration file is used to update the rule structure body, so as to update the resource dynamic allocation rule recorded by the rule structure body.

In the embodiment, the resource dynamic allocation rule stored in the load balancing policy module may be flexibly configured via the external interface of the second operating system. A configuration mode is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service response speed in the resource dynamic allocation rule.

Services having service response speed requirements greater than or equal to a set response speed threshold in the group of services to be allocated are allocated to the first operating system, and services having service response speed requirements less than the set response speed threshold in the group of services to be allocated are allocated to the second operating system.

In the embodiment, the method that the service management module allocates, according to the service response speed, the services to be allocated is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service resource occupation rate in the resource dynamic allocation rule.

Services having service resource occupation rates less than a first occupation rate threshold in the group of services to be allocated are allocated to the first operating system, and services having service resource occupation rates greater than or equal to the first occupation rate threshold in the group of services to be allocated are allocated to the second operating system.

In the embodiment, the method that the service management module allocates, according to the service resource occupation rate, the services to be allocated is similar to that in the foregoing embodiments, and is not described herein again.

In an exemplary embodiment, the service management module is further configured to implement, by executing at least one of the following operations, allocation of the group of services to be allocated to the corresponding operating systems.

Services, whose service coupling degree with services allocated to the first operating system is greater than or equal to a first coupling degree threshold, in the group of services to be allocated are allocated to the first operating system.

Services, whose service coupling degree with services allocated to the second operating system is greater than or equal to a second coupling degree threshold, in the group of services to be allocated are allocated to the second operating system.

In the embodiment, the method that the service management module allocates, according to the service coupling degree, the services to be allocated is similar to that in the foregoing embodiments, and is not described herein again.

In an exemplary embodiment, the service management module is further configured to implement, by executing the following operations, allocation of the group of services to be allocated to the corresponding operating systems.

Services, that include sensitive information, in the group of services to be allocated are allocated to a target operating system. The target operating system is an operating system, that has a lower frequency of interaction with a use object, in the first operating system and the second operating system.

In the embodiment, the method that the service management module allocates, to the first operating system, the services to be allocated that include sensitive information is similar to that in the foregoing embodiments, and is not described herein again.

It is to be noted that, the allocation of the services to be allocated by the service management module based on the service response speed and the service resource occupation rate is executed based on the resource dynamic allocation rule stored in the load balancing policy module; and the allocation of the services to be allocated based on the service coupling degree and the service importance (for example, whether the sensitive information is included) may be executed by the service management module based on the preset configuration information. Since a processing resource allocation rule based on the service coupling degree and the service importance is generally stable, and the service response speed and the service resource occupation rate may be flexibly configured based on requirements, the resource dynamic allocation rule of performing resource dynamic allocation according to at least one of the service response speed or the service resource occupation rate is stored by the individual software module, such that both flexibility and conciseness of rule configuration may be taken into consideration.

In an exemplary embodiment, the resource dynamic allocation module is configured to execute a following operation to determine the resource allocation results corresponding to the group of services to be allocated.

According to allocation results of the service management module, in combination with resource utilization of the processing resources of the first operating system and resource utilization of the processing resources of the second operating system, a resource mapping table between the group of services to be allocated and the processing resources of the processor is generated.

In the embodiment, the method that the resource dynamic allocation module generates the resource mapping table of the group of services to be allocated and the processing resources of the processor is similar to that in the foregoing embodiments, and is not described herein again.

In an exemplary embodiment, the resource dynamic allocation module is configured to allocate the processing resources of the processor to the first operating system and the second operating system in units of the processor cores.

In an exemplary embodiment, the resource adaptive scheduling module is configured to execute a following operation to allocate the processing resources of the processor to the first operating system and the second operating system according to the operating system allocation result and the resource allocation result corresponding to each of the group of services to be allocated.

When it is determined, according to the resource allocation results, that unallocated processing resources in the processing resources of the processor correspond to services to be allocated, the unallocated processing resources are allocated to the operating system to which the services to be allocated corresponding to the unallocated processing resources are allocated.

In the embodiment, the method that the resource adaptive scheduling module allocates the unallocated processing resources to the operating systems is similar to that in the foregoing embodiments, and is not described herein again.

In an exemplary embodiment, the embedded system may further include a resource occupation and releasing module.

The resource occupation and releasing module is configured to perform occupation and releasing of processing resources between the first operating system and the second operating system.

In the embodiment, the method that the resource occupation and releasing module is configured to perform occupation and releasing of the processing resources between different operating systems is similar to that in the foregoing embodiments, and is not described herein again.

In an exemplary embodiment, the resource occupation and releasing module is configured to perform occupation and releasing of the processing resources between the first operating system and the second operating system via the inter-core communication interface.

In an exemplary embodiment, the resource occupation and releasing module is configured to implement, by executing the following operations, occupation and releasing of the processing resources between the first operating system and the second operating system via the inter-core communication interface.

A first interaction request of the first operating system is transmitted to the second operating system via the inter-core communication interface. The first interaction request is used for requesting to perform resource interaction with the second operating system, and the resource interaction includes at least one of: resource occupation and resource releasing.

A first interaction response that is returned by the second operating system in response to the first interaction request is acquired via the inter-core communication interface. The first interaction response is used for indicating the first operating system to perform the resource interaction with the second operating system according to the first interaction response.

In the embodiment, the method that the resource occupation and releasing module performs resource interaction between the first operating system and the second operating system via the inter-core communication interface is similar to that in the foregoing embodiments, and is not described herein again.

In an exemplary embodiment, the embedded system may further include a first system control module.

The first system control module is configured to detect a resource utilization rate of the processing resources of the first operating system, and when it is determined, according to the resource utilization rate of the processing resources of the first operating system, that the first operating system is to perform the resource interaction with the second operating system, trigger the resource occupation and releasing module to transmit the first interaction request to the second operating system via the inter-core communication interface.

In the embodiment, the method that the first system control module triggers the resource interaction based on the resource utilization rate of the processing resources of the first operating system is similar to that in the foregoing embodiments, and is not described herein again.

In an exemplary embodiment, the first system control module is further configured to execute at least one of the following operations: when the resource utilization rate of the processing resources of the first operating system is greater than or equal to a first utilization rate threshold, determining that the first operating system is to occupy the processing resources of the second operating system; and when the processing resources of the first operating system are in an idle state and there is no service to be executed by the first operating system, determining that the first operating system is to release the processing resources to the second operating system.

In the embodiment, the method that the first system control module determines the resource interaction type to be performed by the first operating system is similar to that in the foregoing embodiments, and is not described herein again.

In an exemplary embodiment, the first system control module is further configured to control the first operating system to enter a hibernation state when the first operating system has no service to schedule and there is no service to be allocated to the first operating system.

In the embodiment, the method that the first system control module controls the first operating system to enter the hibernation state is similar to that in the foregoing embodiments, and is not described herein again.

In an exemplary embodiment, the resource occupation and releasing module is configured to implement, by executing at least one of the following operations, transmission of the first interaction request of the first operating system to the second operating system via the inter-core communication interface.

A first occupation request of which interrupt number is a first interrupt number is transmitted to the second operating system via the inter-core communication interface, and the first occupation request is used for requesting to occupy the processing resources of the second operating system.

A resource releasing request of which interrupt number is a second interrupt number is transmitted to the second operating system via the inter-core communication interface, and the resource releasing request is used for requesting to release the processing resources occupied by the first operating system to the second operating system.

In the embodiment, the method that the resource occupation and releasing module performs resource interaction by means of the inter-core interrupt is similar to that in the foregoing embodiments, and is not described herein again.

In an exemplary embodiment, the resource occupation and releasing module is configured to implement, by executing the following operations, occupation and releasing of the processing resources between the first operating system and the second operating system via the inter-core communication interface.

A second interaction request of the second operating system is transmitted to the first operating system via the inter-core communication interface, and the second interaction request is used for requesting to occupy the processing resources of the first operating system.

A second interaction response that is returned by the first operating system in response to the second interaction request is acquired via the inter-core communication interface, and the second interaction response is used for indicating whether the first operating system allows the second operating system to occupy the processing resources of the first operating system.

In the embodiment, the method that the resource occupation and releasing module performs resource interaction between the first operating system and the second operating system via the inter-core communication interface is similar to that in the foregoing embodiments, and is not described herein again.

In an exemplary embodiment, the embedded system may further include a second system control module.

The second system control module is configured to detect a resource utilization rate of the processing resources of the second operating system, and when it is determined, according to the resource utilization rate of the processing resources of the second operating system, that the second operating system is to occupy the processing resources of the first operating system, trigger the resource occupation and releasing module to transmit the second interaction request to the first operating system via the inter-core communication interface.

In the embodiment, the method that the second system control module triggers the resource interaction based on the resource utilization rate of the processing resources of the second operating system is similar to that in the foregoing embodiments, and is not described herein again. In an exemplary embodiment, the second system control module is further configured to execute at least one of the following operations.

When the current resource utilization rate of the processing resources of the second operating system is greater than or equal to a second utilization rate threshold, it is determined that the second operating system is to occupy the processing resources of the second operating system.

When it is determined, according to ongoing services of the second operating system and services to be executed of the second operating system, that the resource utilization rate of the processing resources of the second operating system is greater than or equal to a third utilization rate threshold, it is determined that the second operating system is to occupy the processing resources of the second operating system.

In the embodiment, the method that the second system control module determines the resource interaction to be performed by the second operating system is similar to that in the foregoing embodiments, and is not described herein again.

In an exemplary embodiment, the embedded system is further configured to, when a service priority of ongoing services of the first operating system is not lower than a service priority of the services to be executed of the second operating system, determine that the first operating system does not allow the second operating system to occupy the processing resources of the first operating system; and when the service priority of ongoing services of the first operating system is lower than the service priority of the services to be executed of the second operating system, determine that the first operating system allows the second operating system to occupy the processing resources of the first operating system.

In the embodiment, the method that the embedded system determines whether the first operating system allows the second operating system to occupy the processing resources is similar to that in the foregoing embodiments, and is not described herein again.

In an exemplary embodiment, the resource occupation and releasing module is configured to execute a following operation to transmit the second interaction request of the second operating system to the first operating system via the inter-core communication interface.

A second occupation request of which interrupt number is a third interrupt number to the first operating system is transmitted via the inter-core communication interface, and the second occupation request is used for requesting to occupy the processing resources of the first operating system.

In the embodiment, the method that the resource occupation and releasing module performs resource interaction by means of the inter-core interrupt is similar to that in the foregoing embodiments, and is not described herein again.

In an exemplary embodiment, the resource occupation and releasing module is configured to implement, by executing at least one of the following operations, acquisition, via the inter-core communication interface, of the second interaction response returned by the first operating system in response to the second interaction request.

A resource-release allowing response of which interrupt number is a fourth interrupt number is transmitted to the second operating system via the inter-core communication interface, and the resource-release allowing response is used for indicating that the first operating system allows the second operating system to occupy the processing resources of the first operating system.

A resource-release rejection response of which interrupt number is a fifth interrupt number is transmitted to the second operating system via the inter-core communication interface, and the resource-release rejection response is used for indicating that the first operating system does not allow the second operating system to occupy the processing resources of the first operating system.

In the embodiment, the method that the resource occupation and releasing module performs resource interaction by means of the inter-core interrupt is similar to that in the foregoing embodiments, and is not described herein again.

In an exemplary embodiment, the resource adaptive scheduling module is further configured to execute at least one of the following operations: merging, into an available resource pool of the first operating system, the processing resources of the second operating system that are occupied by the first operating system; and merging, into an available resource pool of the second operating system, the processing resources of the first operating system that are occupied by the second operating system or the processing resources that are proactively released to the second operating system by the first operating system.

In the embodiment, the method that the resource adaptive scheduling module performs processing resource scheduling between different operating systems is similar to that in the foregoing embodiments, and is not described herein again.

In an exemplary embodiment, the embedded system may further include a system start module.

The system start module is configured to, after a chip where the processor is located is powered on, boot the first operating system to run on a first initial processing resource through a boot loader, and boot the second operating system to run on a second initial processing resource through the boot loader. The first initial processing resource is an initial processing resource, which corresponds to the first operating system, in the processing resources of the processor; and the second initial processing resource is an initial processing resource, which corresponds to the second operating system, in the processing resources of the processor.

In the embodiment, the method that the system start module boots each operating system to run on the corresponding initial processing resources through the boot loader is similar to that in the foregoing embodiments, and is not described herein again.

In an exemplary embodiment, the first initial processing resource is a specified processor core in the processor cores of the processor; and the second initial processing resource is the processor cores in the processor cores of the processor other than the specified processor core.

In an exemplary embodiment, the system start module is configured to execute a following operation to boot the first operating system to run on the first initial processing resource through the boot loader.

The first operating system is booted to run on the first initial processing resource through an SPL.

In the embodiment, the method that the system start module boots the operating systems to run on the initial processing resources through the SPL is similar to that in the foregoing embodiments, and is not described herein again.

In an exemplary embodiment, the system start module is further configured to perform safe start checking on codes of the SPL by running a preset program fixed in a start chip on a device mainboard. The SPL is executed after a check result of the safe start checking is normal.

In the embodiment, the method that the system start module performs safe start checking on the codes of the SPL is similar to that in the foregoing embodiments, and is not described herein again.

In an exemplary embodiment, the system start module is configured to execute a following operation to boot the second operating system to run on the second initial processing resource through the boot loader.

The second initial processing resource is woken up through the SPL, and booting to execute a U-Boot, so as to boot the second operating system to run.

In the embodiment, the method that the system start module boots the second operating system to run through the SPL is similar to that in the foregoing embodiments, and is not described herein again.

Figure 10:
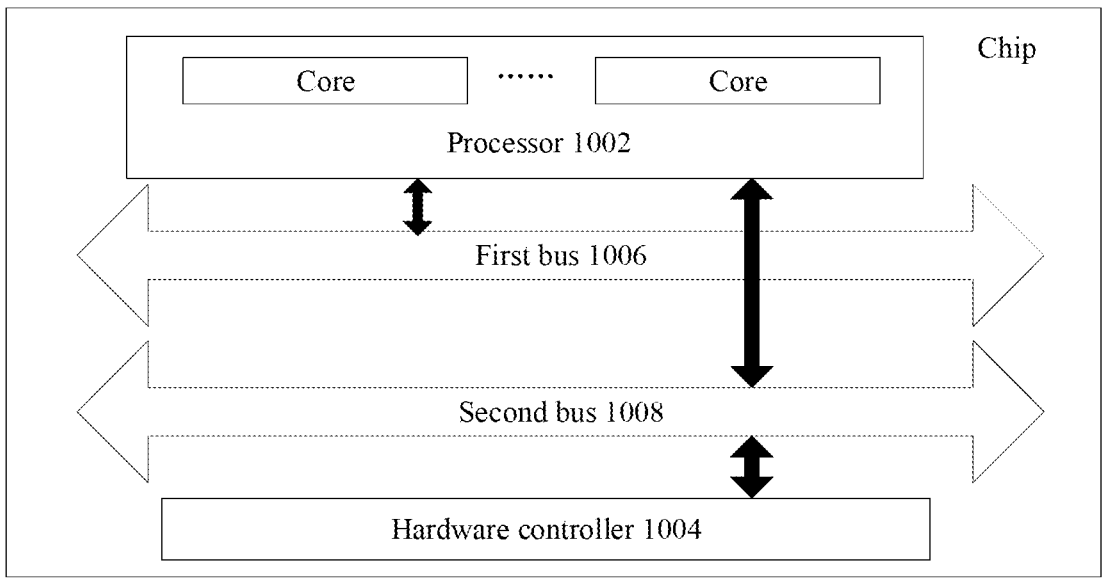
FIG. 10 is a schematic diagram of an exemplary embedded system according to the embodiments of the present disclosure.

Still another aspect of the embodiments of the present disclosure further provides an embedded system that is configured to implement the embedded system running method. FIG. 10 is a schematic diagram of an exemplary embedded system according to the embodiments of the present disclosure. The embedded system may include a chip and at least two operating systems.

The chip includes a processor 1002, a hardware controller 1004, a first bus 1006, and a second bus 1008.

The bandwidth of the first bus 1006 is higher than the bandwidth of the second bus 1008, the first bus 1006 is configured as a multi-master and multi-slave mode, and the second bus 1008 is configured as a one-master and multi-slave mode.

The at least two operating systems run based on the processor 1002. Processing resources of the processor are dynamically allocated to the at least two operating systems, and the processing resources of the processor include processor cores.

The at least two operating systems communicate with each other via the first bus 1006.

The at least two operating systems control the hardware controller via the second bus 1008.

The chip may be the BMC chip. The processor may be a multi-core processor. The hardware controller may be configured to control an external device connected to the corresponding external interface. The first bus is configured to be in a multi-master and multi-slave mode, and may be a bus used for communication between the plurality of processor cores of the processor, for example, Advanced High Performance Bus (AHB). The second bus is configured to be in a one-master and multi-slave mode, and may be a bus used by the processor for control of the hardware controller, for example, an Advanced Peripheral Bus (APB). A bandwidth of the first bus is higher than a bandwidth of the second bus.

Herein, the first bus being configured to be in the multi-master and multi-slave mode means that the first bus may be configured to perform data communication between a plurality of master devices and a plurality of slave devices, that is, the first bus may be connected to the plurality of master devices and the plurality of slave devices, and the first bus may be used between the master devices, and between the slave devices for data communication. Data transmission on the entire first bus is sent by the master devices, and responded to by the slave devices. The second bus being configured to be in the one-master and multi-slave mode means that the second bus may be configured to perform data communication between one master device and the plurality of slave devices, that is, the second bus may be connected to one master device and the plurality of slave devices, and the first bus may be used between the master device and the slave devices for data communication. A data request may only be sent from the master device to the slave devices, and then the slave devices return corresponding response data to the master device after receiving the request. This process may implement one-to-many access.

It is to be noted that, by using the bus in the multi-master and multi-slave mode between the operating systems for data communication, each operating system may conveniently actively initiate the data request according to needs; and the hardware controller mainly controls corresponding hardware based on the control of the operating system, such that the bus in the one-master and multi-slave mode is used between the operating system and the hardware controller for communication, and the data request is sent to the hardware controller by the operating system. Therefore, the control efficiency of the hardware controller may be improved.

The AHB has been defined in Advanced Microcontroller Bus Architecture (AMBA) 2. The AHB is mainly used as a system high-speed bus, is suitable for high-performance and low power consumption system design, and may be configured to achieve, as a System on Chip (SoC) bus of an SoC, a connection between high-performance modules. The high-performance module may be a CPU, Direct Memory Access (DMA), Digital Signal Processing (DSP). In an AMBA protocol, the AHB is mainly designed for system-level high-bandwidth and high-performance system interconnections, and includes the following characteristics: single clock edge operation; a non-tri-state implementation; supporting burst transmission; supporting segmented transmission; supporting a multi-master and multi-slave interconnection mode; being capable of configuring 32-bit" 128-bit bus widths; and supporting transmission of bytes, half bytes, and words. The AHB system includes the following three parts: a master module (that is, the master device), a slave module (that is, the slave device), and an infrastructure; and transmissions throughout the entire AHB bus are sent by the master module, and the slave module is responsible for response. The infrastructure may include an arbiter, a master-to-slave multiplexer, a slave-to-master multiplexer, a decoder, a dummy slave, and a dummy master.

The APB is mainly configured to achieve a connection between peripheral devices with low bandwidths, for example, UART and 1284. The bus architecture of the APB is not like AHB which supports a plurality of master modules, the only master module inside the APB is an APB bridge. The characteristics of the APB include the following.

1) The APB may be operated at a high frequency.
2) The APB is simple in protocol, and has no complex time sequence.
3) Synchronous bus: all transactions (reading and writing operations) on the bus rely on a rising edge of a clock.
4) One-master and multi-slave mode: the APB is hung under an AHB system, a transaction is converted between the AHB systems by means of an AHB-APB Bridge, and in this case, the Bridge is the master of the APB, and other periphery devices are all slaves.
5) Simple interface: an interface is relatively simple compared to an AXI and the AHB.
6) The power consumption is low.
7) Various periphery devices may be connected, such as the periphery device that may be controlled by the hardware controller.

For the APB, the data request may only be sent from the Master to the slave; and the slave returns the corresponding response data to the master after receiving the request. One-to-many access may be implemented in this process; and the access may not involve arbitration and decoder analysis operations in the AHB. Herein, the AHB has the characteristics of being high in bandwidth, and is configured to achieve an interconnection between the high-performance modules (such as the CPU and the DMA); and the APB is relatively low in bandwidth, and is configured to achieve a connection between the periphery devices (such as the UART and the I2C) in a system. The AHB is complex in logic circuit and bus protocol; and the APB is relatively simple in interface circuit and bus protocol.

The embedded system may include the at least two operating systems, and the at least two operating systems run based on the processor. The processing resources of the processor are dynamically allocated to the at least two operating systems. The processing resources of the processor include the processor cores. The at least two operating systems communicate via the first bus, and the at least two operating systems realize control of the hardware controller via the second bus.

In some exemplary implementations, there may be one or a plurality of hardware controllers. The hardware controller may include, but are not limited to, a controller corresponding to at least one of the following chip peripherals: I2C, a Universal Serial Bus (USB), a UART, an Analog to Digital Converter (ADC), a Joint Test Action Group (JTAG), a Real_Time Clock (RTC), a General Purpose Input/Output (GPIO), a Watch Dog Timer (WDT), a virtual UART, a super I/O, a Serial General Purpose Input/Output (SGPIO), Pulse Width Modulation (PWM), FanTach (fan speed regulation), a timer, a PECI, and a mailbox, and may also include the controllers of other types. There may be one or a plurality of external interfaces; and the external interface may include, but are not limited to, the external interface corresponding to any controller.

Figure 11:
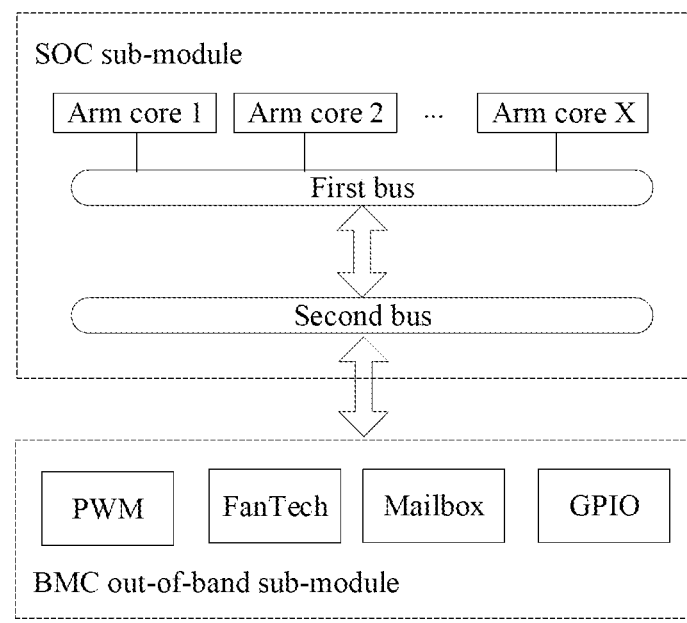
FIG. 11 is a schematic diagram of another exemplary embedded system according to the embodiments of the present disclosure.

For example, an example of the BMC chip may be shown in FIG. 11. The hardware of the BMC chip may include, but is not limited to, an SOC sub-module and a BMC out-of-band sub-module. The SOC sub-module mainly includes ARM cores (ARM Core 1, ARM Core 2, . . . , ARM Core X), and may also include, but is not limited to, a (Double Data Rate) DDR 4 controller (memory controller), a Media Access Control Address (MAC) controller (network controller), a Secure Digital (SD) Card/Embedded Multi Media Card (eMMC) controller (storage controller), a PCIe Root Complex (RC) controller, a Static Random-Access Memory (SRAM), and a SPI controller.

The cores are connected to the controllers by the first bus, so as to implement interaction between the cores and the controllers. In addition, ARM cores are connected to the first bus (for example, the cores may be connected via an Advanced extensible Interface (AXI) bridge), and communication between cores is realized via the first bus. In addition, the interconnection between the first bus and the second bus is also realized in the SOC sub-module (for example, by means of APB bridge conversion). In this way, a physical path is provided for the SOC sub-module to access peripherals on the second bus.

The DDR4 controller may be connected to other components or devices through a DDR4 Physical Layer (PHY) interface. The MAC controller is connected to other components or devices through the Reduced Gigabit Media Independent Interface (RGMII). The SD card/eMMC controller is connected to other components or devices through the SD interface. The PCIe RC controller is connected to other components or devices through the PCIe PHY interface.

The BMC out-of-band sub-module mainly includes the controller corresponding to the chip peripherals such as a PWM, a GPIO, FanTach (fan speed regulation), and mailbox. Through these controllers, out-of-band management functions such as PECI communication of the BMC (for example, the use of the GPIO to simulate the PECI), and fan regulation may be realized. From FIG. 12, it may be learned that, the BMC out-of-band sub-module may implement, but is not limited to, the interaction with the SOC sub-module through the second bus.

The BMC chip implement the interaction among a on-chip ARM core, a storage unit, and a controller hardware resource through the first bus and the second bus. Dynamic balanced scheduling of the processor resources mainly involves the ARM core resource scheduling of the BMC chip; and inter-core communication refers to the communication performed between the ARM cores. For example, the Linux system occupies the cores of the RTOS. The Linux system first sends an inter-core interrupt (interrupt number 9) on a certain core of Core 2 to Core N to Core 1 by an on-chip first bus. When the current RTOS is in the idle state, occupation is allowed; Core 1 replies to an inter-core interrupt (interrupt number 10) via the first bus, and an external controller resource (for example, PWM/PECI) mapped by the current Core 1 is released; and the Linux system receives the inter-core interrupt 10, initiates an occupation flow, adds the Core 1 into Linux SMP scheduling, and obtains the control power of the PWM/PECI peripherals, which may be controlled via the second bus.

In one aspect, the at least two operating systems include the first operating system and the second operating system. The chip loads a communication value to the first bus, and the first bus sends a communication signal carrying the communication value to a communication register corresponding to the second operating system, so as to conduct communication between the first operating system and the second operating system, where the communication value is used for indicating communication content between the first operating system and the second operating system.

In another aspect, the chip loads a control value to the second bus, and the second bus sends a control signal carrying the control value to a register corresponding to the hardware controller, so as to realize control over the hardware controller by the operating systems, where the control value is used for indicating control content of the operating systems over the hardware controller.

The operating system controls the hardware controller by accessing (for example, executing a read operation and a write operation) the registers of each hardware controller. The mode that the operating system accesses the registers of the hardware controller may, but is not limited to, read or write the addresses of the registers of each hardware controller. These addresses of the registers may be, but is not limited to, unique and determined when the chip is designed. For example, a specific function (for example, a communication function between the operating systems or a control function of the operating system over the hardware controller) may be achieved by writing, by the operating system, a specific value (that is, the communication value or the control value) into a specific address (that is, the communication register or the register corresponding to the hardware controller). That is to say, different functions correspond to different control values, such that the correspondence relationship between the functions of the hardware controller and the control values is maintained in the chip. For example, a control value 00 means that an air conditioner accelerates by one gear; and a control value 01 means that the air conditioner decelerates by one gear, and so on.

Interactions such as communication and control between the operating systems and between the operating systems and the hardware controllers may, but are not limited to, be performed via the bus. The read and write operations of the operating system on the registers of the hardware controllers are eventually converted into control signals of the first bus (or the second bus) to the hardware controllers; and this part of the conversion work and the process of the control of the first bus (or the second bus) to the hardware controllers may be, but are not limited to, realized automatically by internal hardware of the chip. An implementation process follows bus specifications. During the operation process of the first bus (or the second bus), in one aspect, a physical signal related to a bus protocol may be transmitted and controlled; and in another aspect, valid data may be transmitted to the hardware controllers by a physical data channel.

By means of the embedded system, the embedded system includes: the chip and the at least two operating systems. The chip includes the processor, the hardware controller, the first bus, and the second bus. A bandwidth of the first bus is higher than a bandwidth of the second bus, the first bus is configured as the multi-master and multi-slave mode, and the second bus is configured as the one-master and multi-slave mode. The at least two operating systems run based on the processor. The processing resources of the processor are dynamically allocated to the at least two operating systems; and the processing resources of the processor include processor cores. The at least two operating systems communicate with each other via the first bus. The at least two operating systems control the hardware controller via the second bus. Therefore, the problem of low overall utilization rate of core resources due to the idle state of most of the processing resources of the multi-core processor in the related art may be solved, thereby improving the utilization rate of the processing resources.

In an exemplary embodiment, the at least two operating systems include a first operating system running on at least one processor core of the processor and a second operating system running on at least one processor core of the processor; and a response speed of the first operating system is higher than a response speed of the second operating system. The second operating system includes a service management module, a resource dynamic allocation module, and a resource adaptive scheduling module.

The service management module is configured to allocate, according to a resource dynamic allocation rule, a group of services to be allocated to the corresponding operating systems, where the resource dynamic allocation rule includes performing resource dynamic allocation according to at least one of: a service response speed, and a service resource occupation rate.

The resource dynamic allocation module is configured to determine resource allocation results corresponding to the group of services to be allocated. The resource allocation results are used for indicating, among processing resources of the processor, a processing resource corresponding to each of the group of services to be allocated.

The resource adaptive scheduling module is configured to allocate the processing resources of the processor to the first operating system and the second operating system according to an operating system allocation result and the resource allocation result corresponding to each of the group of services to be allocated.

In the embodiment, the at least two operating systems include the first operating system and the second operating system; and each operating system at least runs on one processor core. The first operating system and the second operating system may be similar to those in the foregoing embodiments, and are not described herein again.

In an exemplary embodiment, the second operating system may further include a load balancing policy module.

The load balancing policy module is configured to read a rule configuration file, so as to generate a rule structure body, where the rule structure body is used for recording the resource dynamic allocation rule.

In the embodiment, the method that the load balancing policy module generates the rule structure body is similar to that in the foregoing embodiments, and is not described herein again.

In an exemplary embodiment, the load balancing policy module is further configured to: acquire a rule updating configuration file via an external interface of the second operating system, where the rule updating configuration file is used for updating the resource dynamic allocation rule that has been configured; and use the rule updating configuration file to update the rule structure body, so as to update the resource dynamic allocation rule recorded by the rule structure body.

In the embodiment, the resource dynamic allocation rule stored in the load balancing policy module may be flexibly configured via the external interface of the second operating system. A configuration mode is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service response speed in the resource dynamic allocation rule.

Services having service response speed requirements greater than or equal to a set response speed threshold in the group of services to be allocated are allocated to the first operating system, and services having service response speed requirements less than the set response speed threshold in the group of services to be allocated are allocated to the second operating system.

In the embodiment, the method that the service management module allocates, according to the service response speed, the services to be allocated is similar to that in the foregoing embodiments, and is not described herein again.

In an exemplary embodiment, the service management module is configured to implement, by executing the following operations, allocation of the group of services to be allocated to the corresponding operating systems according to an allocation rule corresponding to a service resource occupation rate in the resource dynamic allocation rule.

Services having service resource occupation rates less than a first occupation rate threshold in the group of services to be allocated are allocated to the first operating system, and services having service resource occupation rates greater than or equal to the first occupation rate threshold in the group of services to be allocated are allocated to the second operating system.

In the embodiment, the method that the service management module allocates, according to the service resource occupation rate, the services to be allocated is similar to that in the foregoing embodiments, and is not described herein again.

In an exemplary embodiment, the service management module is further configured to implement, by executing at least one of the following operations, allocation of the group of services to be allocated to the corresponding operating systems.

Services, whose service coupling degree with services allocated to the first operating system is greater than or equal to a first coupling degree threshold, in the group of services to be allocated are allocated to the first operating system.

Services, whose service coupling degree with services allocated to the second operating system is greater than or equal to a second coupling degree threshold, in the group of services to be allocated are allocated to the second operating system.

In the embodiment, the method that the service management module allocates, according to the service coupling degree, the services to be allocated is similar to that in the foregoing embodiments, and is not described herein again.

In an exemplary embodiment, the service management module is further configured to implement, by executing the following operations, allocation of the group of services to be allocated to the corresponding operating systems.

Services, that include sensitive information, in the group of services to be allocated are allocated to a target operating system. The target operating system is an operating system, that has a lower frequency of interaction with a use object, in the first operating system and the second operating system.

In the embodiment, the method that the service management module allocates, to the first operating system, the services to be allocated that include sensitive information is similar to that in the foregoing embodiments, and is not described herein again.

In an exemplary embodiment, the resource dynamic allocation module is configured to execute a following operation to determine the resource allocation results corresponding to the group of services to be allocated.

According to allocation results of the service management module, in combination with resource utilization of the processing resources of the first operating system and resource utilization of the processing resources of the second operating system, a resource mapping table between the group of services to be allocated and the processing resources of the processor is generated.

In the embodiment, the method that the resource dynamic allocation module generates the resource mapping table of the group of services to be allocated and the processing resources of the processor is similar to that in the foregoing embodiments, and is not described herein again.

In an exemplary embodiment, the resource dynamic allocation module is configured to allocate the processing resources of the processor to the first operating system and the second operating system in units of the processor cores.

In an exemplary embodiment, the resource adaptive scheduling module is configured to execute a following operation to allocate the processing resources of the processor to the first operating system and the second operating system according to the operating system allocation result and the resource allocation result corresponding to each of the group of services to be allocated.

When it is determined, according to the resource allocation results, that unallocated processing resources in the processing resources of the processor correspond to services to be allocated, the unallocated processing resources are allocated to the operating system to which the services to be allocated corresponding to the unallocated processing resources are allocated.

In the embodiment, the method that the resource adaptive scheduling module allocates the unallocated processing resources to the operating systems is similar to that in the foregoing embodiments, and is not described herein again.

In an exemplary embodiment, the embedded system may further include a resource occupation and releasing module.

The resource occupation and releasing module is configured to perform occupation and releasing of processing resources between the first operating system and the second operating system.

In the embodiment, the method that the resource occupation and releasing module is configured to perform occupation and releasing of the processing resources between different operating systems is similar to that in the foregoing embodiments, and is not described herein again. In an exemplary embodiment, the resource occupation and releasing module is configured to perform occupation and releasing of the processing resources between the first operating system and the second operating system via the first bus; and the first bus is a bus for communication among different processor cores of the processor.

In an exemplary embodiment, the resource occupation and releasing module is configured to implement, by executing the following operations, occupation and releasing of the processing resources between the first operating system and the second operating system via the first bus.

A first interaction request of the first operating system is transmitted to the second operating system via the first bus. The first interaction request is used for requesting to perform resource interaction with the second operating system, and the resource interaction includes at least one of: resource occupation and resource releasing.

A first interaction response that is returned by the second operating system in response to the first interaction request is acquired via the first bus. The first interaction response is used for indicating the first operating system to perform the resource interaction with the second operating system according to the first interaction response.

In the embodiment, the method that the resource occupation and releasing module performs resource interaction between the first operating system and the second operating system via the inter-core communication interface is similar to that in the foregoing embodiments, and is not described herein again.

In an exemplary embodiment, the first operating system includes a first system control module.

The first system control module is configured to detect a resource utilization rate of the processing resources of the first operating system, and when it is determined, according to the resource utilization rate of the processing resources of the first operating system, that the first operating system is to perform the resource interaction with the second operating system, trigger the resource occupation and releasing module to transmit the first interaction request to the second operating system via the first bus.

In the embodiment, the method that the first system control module triggers the resource interaction based on the resource utilization rate of the processing resources of the first operating system is similar to that in the foregoing embodiments, and is not described herein again.

In an exemplary embodiment, the first system control module is further configured to execute at least one of the following operations: when the resource utilization rate of the processing resources of the first operating system is greater than or equal to a first utilization rate threshold, determining that the first operating system is to occupy the processing resources of the second operating system; and when the processing resources of the first operating system are in an idle state and there is no service to be executed by the first operating system, determining that the first operating system is to release the processing resources to the second operating system.

In the embodiment, the method that the first system control module determines the resource interaction type to be performed by the first operating system is similar to that in the foregoing embodiments, and is not described herein again.

In an exemplary embodiment, the first system control module is further configured to control the first operating system to enter a hibernation state when the first operating system has no service to schedule and there is no service to be allocated to the first operating system.

In the embodiment, the method that the first system control module controls the first operating system to enter the hibernation state is similar to that in the foregoing embodiments, and is not described herein again.

In an exemplary embodiment, the resource occupation and releasing module is configured to implement, by executing at least one of the following operations, transmission of the first interaction request of the first operating system to the second operating system via the first bus.

A first occupation request of which interrupt number is a first interrupt number is transmitted to the second operating system via the first bus, and the first occupation request is used for requesting to occupy the processing resources of the second operating system.

A resource releasing request of which interrupt number is a second interrupt number is transmitted to the second operating system via the first bus, and the resource releasing request is used for requesting to release the processing resources occupied by the first operating system to the second operating system.

In the embodiment, the method that the resource occupation and releasing module performs resource interaction by means of the inter-core interrupt is similar to that in the foregoing embodiments, and is not described herein again.

In an exemplary embodiment, the resource occupation and releasing module is configured to implement, by executing the following operations, occupation and releasing of the processing resources between the first operating system and the second operating system via the first bus.

A second interaction request of the second operating system is transmitted to the first operating system via the first bus, and the second interaction request is used for requesting to occupy the processing resources of the first operating system.

A second interaction response that is returned by the first operating system in response to the second interaction request is acquired via the first bus, and the second interaction response is used for indicating whether the first operating system allows the second operating system to occupy the processing resources of the first operating system.

In the embodiment, the method that the resource occupation and releasing module performs resource interaction between the first operating system and the second operating system via the inter-core communication interface is similar to that in the foregoing embodiments, and is not described herein again.

In an exemplary embodiment, the second operating system includes a second system control module.

The second system control module is configured to detect a resource utilization rate of the processing resources of the second operating system, and when it is determined, according to the resource utilization rate of the processing resources of the second operating system, that the second operating system is to occupy the processing resources of the first operating system, trigger the resource occupation and releasing module to transmit the second interaction request to the first operating system via the first bus.

In the embodiment, the method that the second system control module triggers the resource interaction based on the resource utilization rate of the processing resources of the second operating system is similar to that in the foregoing embodiments, and is not described herein again. In an exemplary embodiment, the second system control module is further configured to execute at least one of the following operations.

When the current resource utilization rate of the processing resources of the second operating system is greater than or equal to a second utilization rate threshold, it is determined that the second operating system is to occupy the processing resources of the second operating system.

When it is determined, according to ongoing services of the second operating system and services to be executed of the second operating system, that the resource utilization rate of the processing resources of the second operating system is greater than or equal to a third utilization rate threshold, it is determined that the second operating system is to occupy the processing resources of the second operating system.

In the embodiment, the method that the second system control module determines the resource interaction to be performed by the second operating system is similar to that in the foregoing embodiments, and is not described herein again.

In an exemplary embodiment, the first operating system is further configured to, when a service priority of ongoing services of the first operating system is not lower than a service priority of the services to be executed of the second operating system, determine that the first operating system does not allow the second operating system to occupy the processing resources of the first operating system; and when the service priority of ongoing services of the first operating system is lower than the service priority of the services to be executed of the second operating system, determine that the first operating system allows the second operating system to occupy the processing resources of the first operating system.

In the embodiment, the method that the first operating system determines whether the second operating system is allowed to occupy the processing resources is similar to that in the foregoing embodiments, and is not described herein again.

In an exemplary embodiment, the resource occupation and releasing module is configured to execute a following operation to transmit the second interaction request of the second operating system to the first operating system via the first bus.

A second occupation request of which interrupt number is a third interrupt number is transmitted to the first operating system via the first bus, and the second occupation request is used for requesting to occupy the processing resources of the first operating system.

In the embodiment, the method that the resource occupation and releasing module performs resource interaction via the first bus is similar to that in the foregoing embodiments, and is not described herein again.

In an exemplary embodiment, the resource occupation and releasing module is configured to implement, by executing at least one of the following operations, acquisition, via the first bus, of the second interaction response returned by the first operating system in response to the second interaction request.

A resource-release allowing response of which interrupt number is a fourth interrupt number is transmitted to the second operating system via the first bus, and the resource-release allowing response is used for indicating that the first operating system allows the second operating system to occupy the processing resources of the first operating system.

A resource-release rejection response of which interrupt number is a fifth interrupt number is transmitted to the second operating system via the first bus, and the resource-release rejection response is used for indicating that the first operating system does not allow the second operating system to occupy the processing resources of the first operating system.

In the embodiment, the method that the resource occupation and releasing module performs resource interaction via the first bus is similar to that in the foregoing embodiments, and is not described herein again.

In an exemplary embodiment, the resource adaptive scheduling module is further configured to execute at least one of the following operations: merging, into an available resource pool of the first operating system, the processing resources of the second operating system that are occupied by the first operating system; and merging, into an available resource pool of the second operating system, the processing resources of the first operating system that are occupied by the second operating system or the processing resources that are proactively released to the second operating system by the first operating system.

In the embodiment, the method that the resource adaptive scheduling module performs processing resource scheduling between different operating systems is similar to that in the foregoing embodiments, and is not described herein again.

In an exemplary embodiment, the processor is configured to, after the chip where the processor is located is powered on, boot the first operating system to run on a first initial processing resource through a boot loader, and boot the second operating system to run on a second initial processing resource through the boot loader. The first initial processing resource is an initial processing resource, which corresponds to the first operating system, in the processing resources of the processor, and the second initial processing resource is an initial processing resource, which corresponds to the second operating system, in the processing resources of the processor.

In the embodiment, the method that the processor boots each operating system to run on the corresponding initial processing resources through the boot loader is similar to that in the foregoing embodiments, and is not described herein again.

In an exemplary embodiment, the first initial processing resource is a specified processor core in the processor cores of the processor; and the second initial processing resource is the processor cores in the processor cores of the processor other than the specified processor core.

In an exemplary embodiment, the processor is configured to execute a following operation to boot the first operating system to run on the first initial processing resource through the boot loader.

The first operating system is booted to run on the first initial processing resource through an SPL.

In the embodiment, the method that the processor boots the operating systems to run on the initial processing resources through the SPL is similar to that in the foregoing embodiments, and is not described herein again.

In an exemplary embodiment, the processor is further configured to perform safe start checking on codes of the SPL by running a preset program fixed in a start chip on a device mainboard. The SPL is executed after a check result of the safe start checking is normal.

In the embodiment, the method that the processor performs safe start checking on the codes of the SPL is similar to that in the foregoing embodiments, and is not described herein again.

In an exemplary embodiment, the processor is configured to execute a following operation to boot the second operating system to run on the second initial processing resource through the boot loader.

The second initial processing resource is woken up through the SPL, and booting to execute a U-Boot, so as to boot the second operating system to run.

In the embodiment, the method that the processor boots the second operating system to run through the SPL is similar to that in the foregoing embodiments, and is not described herein again.

Figure 12:
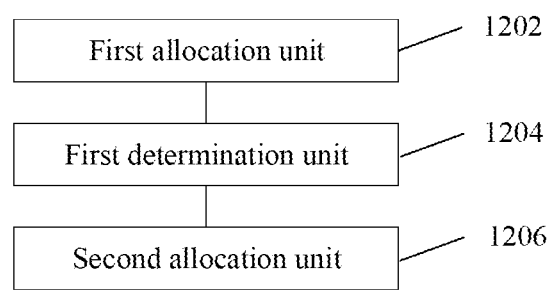
FIG. 12 is a structural block diagram of an exemplary embedded system running apparatus according to the embodiments of the present disclosure.

Still another aspect of the embodiments of the present disclosure further provides an embedded system running apparatus that is configured to implement the embedded system running method. FIG. 12 is a structural block diagram of an exemplary embedded system running apparatus according to the embodiments of the present disclosure. As shown in FIG. 12, the apparatus includes a first allocation unit, a first determination unit, and a second allocation unit.

The first allocation unit 1202 is configured to allocate, according to a resource dynamic allocation rule, a group of services to be allocated to corresponding operating systems in an embedded system, where the resource dynamic allocation rule includes performing resource dynamic allocation according to at least one of: a service response speed, a service resource occupation rate, a service coupling degree, and service importance. The embedded system includes a first operating system and a second operating system; and the first operating system and the second operating system run on a processor, and a response speed of the first operating system is higher than a response speed of the second operating system.

The first determination unit 1204 is connected to the first allocation unit 1202, and is configured to determine resource allocation results corresponding to the group of services to be allocated, where the resource allocation results are used for indicating, among processing resources of the processor, a processing resource corresponding to each of the group of services to be allocated, and the processing resources of the processor include processor cores.

The second allocation unit 1206 is connected to the first determination unit 1204, and is configured to allocate the processing resources of the processor to the first operating system and the second operating system according to the operating system allocation result and the resource allocation result corresponding to each of the group of services to be allocated.

It is to be noted that, the first allocation unit 1202 in the embodiment may be configured to execute S202. The first determination unit 1204 in the embodiment may be configured to execute S204. The second allocation unit 1206 in the embodiment may be configured to execute S206.

Through the above modules, a group of services to be allocated are allocated to the corresponding operating systems in the embedded system according to a resource dynamic allocation rule. The resource dynamic allocation rule includes performing resource dynamic allocation according to at least one of: a service response speed, a service resource occupation rate, a service coupling degree, and service importance. The embedded system includes the first operating system and the second operating system. The first operating system and the second operating system run on a processor, and the response speed of the first operating system is higher than the response speed of the second operating system. The resource allocation results corresponding to the group of services to be allocated are determined, wherein the resource allocation results are used for indicating, among processing resources of the processor, a processing resource corresponding to each of the group of services to be allocated, and the processing resources of the processor include processor cores. The processing resources of the processor are allocated to the first operating system and the second operating system according to the operating system allocation result and the resource allocation result corresponding to each of the group of services to be allocated. Therefore, the problem of low overall utilization rate of core resources due to the idle state of most of the processing resources of the multi-core processor in the related art may be solved, thereby improving the utilization rate of the processing resources.

In an exemplary embodiment, the apparatus may further include a generation unit.

The generation unit is configured to read a rule configuration file, so as to generate a rule structure body, where the rule structure body is used for recording the resource dynamic allocation rule.

In an exemplary embodiment, the apparatus may further include an acquisition unit and an update unit.

The acquisition unit is configured to acquire a rule updating configuration file via an external interface of the second operating system. The rule updating configuration file is used for updating the resource dynamic allocation rule that has been configured.

The update unit is configured to use the rule updating configuration file to update the rule structure body, so as to update the resource dynamic allocation rule recorded by the rule structure body.

In an exemplary embodiment, the first allocation unit includes at least one of: a first allocation module, a second allocation module, or a third allocation module.

The first allocation module is configured to allocate, to the first operating system, services having service response speed requirements greater than or equal to a set response speed threshold in the group of services to be allocated, and allocate, to the second operating system, services having service response speed requirements less than the set response speed threshold in the group of services to be allocated.

The second allocation module is configured to allocate, to the first operating system, services having service resource occupation rates less than a first occupation rate threshold in the group of services to be allocated, and allocate, to the second operating system, services having service resource occupation rates greater than or equal to the first occupation rate threshold in the group of services to be allocated.

The third allocation module is configured to allocate, to a target operating system, services, that include sensitive information, in the group of services to be allocated. The target operating system is an operating system, that has a lower frequency of interaction with a use object, in the first operating system and the second operating system.

In an exemplary embodiment, the first allocation unit includes at least one of the following. The fourth allocation module is configured to allocate, to the first operating system, services, whose service coupling degree with services allocated to the first operating system is greater than or equal to a first coupling degree threshold, in the group of services to be allocated.

The fifth allocation module is configured to allocate, to the second operating system, services, whose service coupling degree with services allocated to the second operating system is greater than or equal to a second coupling degree threshold, in the group of services to be allocated.

In an exemplary embodiment, the first determination unit includes a generation module.

The generation module is configured to, according to allocation results of the group of services to be allocated, in combination with resource utilization of the processing resources of the first operating system and resource utilization of the processing resources of the second operating system, generate a resource mapping table between the group of services to be allocated and the processing resources of the processor.

In an exemplary embodiment, the processing resources of the processor are allocated to the first operating system and the second operating system in units of the processor cores.

In an exemplary embodiment, the second allocation unit includes a sixth allocation module.

The sixth allocation module is configured to, when it is determined, according to the resource allocation results, that unallocated processing resources in the processing resources of the processor correspond to services to be allocated, allocate the unallocated processing resources to the operating system to which the services to be allocated corresponding to the unallocated processing resources are allocated.

In an exemplary embodiment, the apparatus may further include a first execution unit.

The first execution unit is configured to perform occupation and releasing of processing resources between the first operating system and the second operating system.

In an exemplary embodiment, the first execution unit includes an execution module.

The execution module is configured to perform occupation and releasing of processing resources between the first operating system and the second operating system via an inter-core communication interface.

In an exemplary embodiment, the execution module includes a first transmission sub-module and a first acquisition sub-module.

The first transmission sub-module is configured to transmit a first interaction request of the first operating system to the second operating system via the inter-core communication interface. The first interaction request is used for requesting to perform resource interaction with the second operating system, and the resource interaction includes at least one of: resource occupation and resource releasing.

The first acquisition sub-module is configured to acquire, via the inter-core communication interface, a first interaction response that is returned by the second operating system in response to the first interaction request. The first interaction response is used for indicating the first operating system to perform the resource interaction with the second operating system according to the first interaction response.

In an exemplary embodiment, the apparatus may further include a first detection unit and a second determination unit.

The first detection unit is configured to detect a resource utilization rate of the processing resources of the first operating system.

The second determination unit is configured to, when it is determined, according to the resource utilization rate of the processing resources of the first operating system, that the first operating system is to perform the resource interaction with the second operating system, trigger the resource occupation and releasing module to transmit the first interaction request to the second operating system via the inter-core communication interface.

In an exemplary embodiment, the apparatus may further include at least one of: a third determination unit or a fourth determination unit.

The third determination unit is configured to, when the resource utilization rate of the processing resources of the first operating system is greater than or equal to a first utilization rate threshold, determine that the first operating system is to occupy the processing resources of the second operating system.

The fourth determination unit is configured to, when the processing resources of the first operating system are in an idle state and there is no service to be executed by the first operating system, determine that the first operating system is to release the processing resources to the second operating system.

In an exemplary embodiment, the apparatus may further include a control unit.

The control unit is configured to control the first operating system to enter a hibernation state when the first operating system has no service to schedule and there is no service to be allocated to the first operating system.

In an exemplary embodiment, the first transmission sub-module includes a first transmission sub-unit and a second transmission sub-unit.

The first transmission sub-unit is configured to transmit a first occupation request of which interrupt number is a first interrupt number to the second operating system via the inter-core communication interface. The first occupation request is used for requesting to occupy the processing resources of the second operating system.

The second transmission sub-unit is configured to transmit a resource releasing request of which interrupt number is a second interrupt number to the second operating system via the inter-core communication interface. The resource releasing request is used for requesting to release the processing resources occupied by the first operating system to the second operating system.

In an exemplary embodiment, the execution module includes a second transmission sub-module and a second acquisition sub-module.

The second transmission sub-module is configured to transmit a second interaction request of the second operating system to the first operating system via the inter-core communication interface. The second interaction request is used for requesting to occupy the processing resources of the first operating system.

The second acquisition sub-module is configured to acquire, via the inter-core communication interface, a second interaction response that is returned by the first operating system in response to the second interaction request. The second interaction response is used for indicating whether the first operating system allows the second operating system to occupy the processing resources of the first operating system.

In an exemplary embodiment, the apparatus may further include a second detection unit and a fifth determination unit.

The second detection unit is configured to detect a resource utilization rate of the processing resources of the second operating system.

The fifth determination unit is configured to, when it is determined, according to the resource utilization rate of the processing resources of the second operating system, that the second operating system is to occupy the processing resources of the first operating system, trigger the transmission of the second interaction request to the first operating system via the inter-core communication interface.

In an exemplary embodiment, the apparatus may further include at least one of: a sixth determination unit or a seventh determination unit.

The sixth determination unit is configured to, when the current resource utilization rate of the processing resources of the second operating system is greater than or equal to a second utilization rate threshold, determine that the second operating system is to occupy the processing resources of the second operating system.

The seventh determination unit is configured to, when it is determined, according to ongoing services of the second operating system and services to be executed of the second operating system, that the resource utilization rate of the processing resources of the second operating system is greater than or equal to a third utilization rate threshold, determine that the second operating system is to occupy the processing resources of the second operating system.

In an exemplary embodiment, the apparatus may further include an eighth detection unit and a ninth determination unit.

The eighth detection unit is configured to, when a service priority of ongoing services of the first operating system is not lower than a service priority of the services to be executed of the second operating system, determine that the first operating system does not allow the second operating system to occupy the processing resources of the first operating system.

The ninth determination unit is configured to, when the service priority of ongoing services of the first operating system is lower than the service priority of the services to be executed of the second operating system, determine that the first operating system allows the second operating system to occupy the processing resources of the first operating system.

In an exemplary embodiment, the second transmission sub-module includes a third transmission sub-unit.

The third transmission sub-unit is configured to transmit a second occupation request of which interrupt number is a third interrupt number to the first operating system via the inter-core communication interface. The second occupation request is used for requesting to occupy the processing resources of the first operating system.

In an exemplary embodiment, the second acquisition sub-module includes a fourth transmission sub-unit and a fifth transmission sub-unit.

The fourth transmission sub-unit is configured to transmit a resource-release allowing response of which interrupt number is a fourth interrupt number to the second operating system via the inter-core communication interface. The resource-release allowing response is used for indicating that the first operating system allows the second operating system to occupy the processing resources of the first operating system.

The fifth transmission sub-unit is configured to transmit a resource-release rejection response of which interrupt number is a fifth interrupt number to the second operating system via the inter-core communication interface. The resource-release rejection response is used for indicating that the first operating system does not allow the second operating system to occupy the processing resources of the first operating system.

In an exemplary embodiment, the apparatus may further include at least one of: a second execution unit or a third execution unit.

The second execution unit is configured to merge, into an available resource pool of the first operating system, the processing resources of the second operating system that are occupied by the first operating system.

The third execution unit is configured to merge, into an available resource pool of the second operating system, the processing resources of the first operating system that are occupied by the second operating system or the processing resources that are proactively released to the second operating system by the first operating system.

In an exemplary embodiment, the apparatus may further include a guide unit.

The guide unit is configured to, after a chip where the processor is located is powered on, boot the first operating system to run on a first initial processing resource through a boot loader, and boot the second operating system to run on a second initial processing resource through the boot loader. The first initial processing resource is an initial processing resource, which corresponds to the first operating system, in the processing resources of the processor; and the second initial processing resource is an initial processing resource, which corresponds to the second operating system, in the processing resources of the processor.

In an exemplary embodiment, the first initial processing resource is a specified processor core in the processor cores of the processor; and the second initial processing resource is the processor cores in the processor cores of the processor other than the specified processor core.

In an exemplary embodiment, the guide unit includes a guide module.

The guide module is configured to boot the first operating system to run on the first initial processing resource through an SPL.

In an exemplary embodiment, the apparatus may further include a checking unit.

The checking unit is configured to perform safe start checking on codes of the SPL by running a preset program fixed in a start chip on a device mainboard. The SPL is executed after a check result of the safe start checking is normal.

In an exemplary embodiment, the guide unit may further include an execution module.

The execution module is configured to wake up the second initial processing resource through the SPL, and boot to execute a U-Boot, so as to boot the second operating system to run.

It is to be noted that, each of the above modules may be implemented by software or hardware. For the latter, it may be implemented in the following manners, but is not limited to the follow: the above modules are all located in a same processor; or the above modules are located in different processors in any combination.

An embodiment of the present disclosure further provides a chip. The chip includes at least one of a programmable logic circuit and executable instructions. The chip runs in an electronic device and is configured to implement operations in any one of the above method embodiments.

An embodiment of the present disclosure further provides a BMC chip. The BMC chip may include a storage unit and a processing unit connected to the storage unit. The storage unit is configured to store a program; and the processing unit is configured to run the program to execute operations in any one of the above method embodiments.

An embodiment of the present disclosure further provides a mainboard. The mainboard includes: at least one processor; and at least one memory, configured to store at least one program. When the at least one program is executed by the at least one processor, the at least one processor is enabled to implement operations in any one of the above method embodiments.

An embodiment of the present disclosure further provides a server, which includes a processor, a communication interface, a memory, and a communication bus. The processor, the communication interface, and the memory communicate with each other by means of the communication bus. The memory is configured to store a computer program. The processor is configured to implement operations in any one of the above method embodiments when executing the program stored in the memory, so as to achieve the same technical effect.

The communication bus of the server may be a Peripheral Component Interconnect (PCI) bus or an Extended Industry Standard Architecture (EISA) bus, etc. The communication bus may be divided into an address bus, a data bus, a control bus, and the like. The communication interface is configured to achieve communication between the server and other devices.

The memory may include an RAM, or may include a Non-Volatile Memory (NVM), such as at least one disk memory. In some exemplary implementations, the memory may also be at least one storage apparatus located remotely from the foregoing processor. The above processor may be a general processor, including a CPU and a Network Processor (NP), or may be a DSP, an ASIC, a FPGA or other programmable logic devices, discrete gate or transistor logic devices, and discrete hardware components.

An embodiment of the present disclosure further provides a computer-readable storage medium. The computer-readable storage medium stores a computer program. Operations in any one of the above method embodiments are executed when the computer program is configured to run.

In an exemplary embodiment, the computer-readable storage medium may include, but is not limited to, a USB flash disk, a Read-Only Memory (ROM), a Random Access Memory (RAM), and various media that may store computer programs, such as a mobile hard disk, a magnetic disk, or an optical disk.

An embodiment of the present disclosure further provides an electronic device. The electronic device includes a memory and a processor. The memory is configured to store a computer program. The processor is configured to run the computer program to execute operations in any one of method embodiments described above.

In an exemplary embodiment, the electronic device may further include a transmission device and an input/output device. The transmission device is connected to the processor. The input/output device is connected to the processor.

For specific examples in the embodiment, refer to the examples described in the foregoing embodiments and the exemplary implementations, and the embodiment will not be repeated thereto.

It is apparent that those having ordinary skill in the art should understand that the above modules or operations of the present disclosure may be implemented by a general computing device, and may also be gathered together on a single computing device or distributed in network composed of multiple computing devices. The above mentioned modules or operations of the present disclosure may be implemented with program codes executable by the computing device, so that may be stored in a storage device for execution by the computing device, and in some cases, the operations shown or described may be performed in a different sequence than herein, or may be fabricated into individual integrated circuit modules respectively, or multiple modules or operations thereof are fabricated into a single integrated circuit module for implementation. In this way, the present disclosure is not limited to any specific combination of hardware and software.

The above are only the preferred embodiments of this application and are not intended to limit this application. For those having ordinary skill in the art, this application may have various modifications and variations. Any modifications, equivalent replacements, improvements and the like made within the principle of the present disclosure shall fall within the scope of protection of the present disclosure.

What is claimed is:

1. An embedded system, comprising: at least one processor, and at least one memory connected with the at least one processor, the at least one memory is configured to store at least one program module, the at least one processor is configured to execute the at least one program module, wherein the at least one program module comprises:
   a first operating system and a second operating system running on a processor, wherein a response speed of the first operating system is higher than a response speed of the second operating system;
   a service management module, configured to allocate, according to a resource dynamic allocation rule, a group of services to be allocated to corresponding operating systems, wherein the resource dynamic allocation rule comprises performing resource dynamic allocation according to at least one of: a service response speed, and a service resource occupation rate;
   a resource dynamic allocation module, configured to determine resource allocation results corresponding to the group of services to be allocated, wherein the resource allocation results are used for indicating, among processing resources of the processor, a processing resource corresponding to each service to be allocated of the group of services to be allocated, and the processing resources of the processor comprise processor cores; and
   a resource adaptive scheduling module, configured to allocate the processing resources of the processor to the first operating system and the second operating system according to an operating system allocation result and the resource allocation result corresponding to each service to be allocated of the group of services to be allocated;

wherein, the at least one program module further comprises:
   a system start module, configured to, after a chip where the at least one processor is located is powered on, boot the first operating system to run on a first initial processing resource through a boot loader, and boot the second operating system to run on a second initial processing resource through the boot loader, wherein the first initial processing resource is an initial processing resource, which corresponds to the first operating system, in the processing resources of the at least one processor, and the second initial processing resource is an initial processing resource, which corresponds to the second operating system, in the processing resources of the at least one processor.

2. The embedded system according to claim 1, wherein the at least one program module further comprises: a load balancing policy module, configured to read a rule configuration file, so as to generate a rule structure body, wherein the rule structure body is used for recording the resource dynamic allocation rule;
   or,
   the service management module is configured to execute at least one of following operations to allocate the group of services to be allocated to the corresponding operating systems according to an allocation rule corresponding to the service response speed in the resource dynamic allocation rule: allocating, to the first operating system, services having service response speed requirements greater than or equal to a set response speed threshold in the group of services to be allocated, and allocating, to the second operating system, services having service response speed requirements less than the set response speed threshold in the group of services to be allocated; allocating, to the first operating system, services having service resource occupation rates less than a first occupation rate threshold in the group of services to be allocated, and allocating, to the second operating system, services having service resource occupation rates greater than or equal to the first occupation rate threshold in the group of services to be allocated; and allocating, to a target operating system, services having sensitive information in the group of services to be allocated, wherein the target operating system is an operating system, that has a lower frequency of interaction with a use object, in the first operating system and the second operating system;
   or,
   the service management module is further configured to execute at least one of following operations to allocate the group of services to be allocated to the corresponding operating systems: allocating, to the first operating system, services, whose service coupling degree with services allocated to the first operating system is greater than or equal to a first coupling degree threshold, in the group of services to be allocated; and allocating, to the second operating system, services, whose service coupling degree with services allocated to the second operating system is greater than or equal to a second coupling degree threshold, in the group of services to be allocated
   or, the resource dynamic allocation module is configured to execute a following operation to determine the resource allocation results corresponding to the group of services to be allocated: according to allocation results of the service management module, in combination with resource utilization of the processing resources of the first operating system and resource utilization of the processing resources of the second operating system, generating a resource mapping table between the group of services to be allocated and the processing resources of the processor;

or, the resource dynamic allocation module is configured to allocate the processing resources of the processor to the first operating system and the second operating system in units of the processor cores;

or, the resource adaptive scheduling module is configured to execute a following operation to allocate the processing resources of the processor to the first operating system and the second operating system according to the operating system allocation result and the resource allocation result corresponding to each service to be allocated of the group of services to be allocated: when it is determined, according to the resource allocation results, that unallocated processing resources in the processing resources of the processor correspond to services to be allocated, allocating the unallocated processing resources to the operating system to which the services to be allocated corresponding to the unallocated processing resources are allocated.

3. The embedded system according to claim 2, wherein the load balancing policy module is further configured to: acquire a rule updating configuration file via an external interface of the second operating system, wherein the rule updating configuration file is used for updating the resource dynamic allocation rule that has been configured; and use the rule updating configuration file to update the rule structure body, so as to update the resource dynamic allocation rule recorded by the rule structure body.

4. The embedded system according to claim 1, the at least one program module further comprising:

a resource occupation and releasing module, configured to perform occupation and releasing of processing resources between the first operating system and the second operating system, wherein the resource occupation and releasing module is configured to perform occupation and releasing of the processing resources between the first operating system and the second operating system via an inter-core communication interface;

or, the resource adaptive scheduling module is further configured to execute at least one of following operations: merging, into an available resource pool of the first operating system, the processing resources of the second operating system that are occupied by the first operating system; and merging, into an available resource pool of the second operating system, the processing resources of the first operating system that are occupied by the second operating system or the processing resources that are proactively released to the second operating system by the first operating system.

5. The embedded system according to claim 4, wherein the resource occupation and releasing module is configured to execute following operations to perform occupation and releasing of the processing resources between the first operating system and the second operating system via the inter-core communication interface: transmitting a first interaction request of the first operating system to the second operating system via the inter-core communication interface, wherein the first interaction request is used for requesting to perform resource interaction with the second operating system, and the resource interaction comprises at least one of: resource occupation and resource releasing; and acquiring, via the inter-core communication interface, a first interaction response that is returned by the second operating system in response to the first interaction request, wherein the first interaction response is used for indicating the first operating system to perform the resource interaction with the second operating system according to the first interaction response;

or, the resource occupation and releasing module is configured to execute following operations to perform occupation and releasing of the processing resources between the first operating system and the second operating system via the inter-core communication interface: transmitting a second interaction request of the second operating system to the first operating system via the inter-core communication interface, wherein the second interaction request is used for requesting to occupy the processing resources of the first operating system; and acquiring, via the inter-core communication interface, a second interaction response that is returned by the first operating system in response to the second interaction request, wherein the second interaction response is used for indicating whether the first operating system allows the second operating system to occupy the processing resources of the first operating system.

6. The embedded system according to claim 5, wherein the at least one program module further comprises: a first system control module, configured to detect a resource utilization rate of the processing resources of the first operating system, and when it is determined, according to the resource utilization rate of the processing resources of the first operating system, that the first operating system is to perform the resource interaction with the second operating system, trigger the resource occupation and releasing module to transmit the first interaction request to the second operating system via the inter-core communication interface;

or, the resource occupation and releasing module is configured to execute at least one of following operations to transmit the first interaction request of the first operating system to the second operating system via the inter-core communication interface: transmitting a first occupation request of which interrupt number is a first interrupt number to the second operating system via the inter-core communication interface, wherein the first occupation request is used for requesting to occupy the processing resources of the second operating system; and transmitting a resource releasing request of which interrupt number is a second interrupt number to the second operating system via the inter-core communication interface, wherein the resource releasing request is used for requesting to release the processing resources occupied by the first operating system to the second operating system;

or, the at least one program module further comprises: a
second system control module, configured to detect a
resource utilization rate of the processing resources of
the second operating system, and when it is determined,
according to the resource utilization rate of the processing resources of the second operating system, that
the second operating system is to occupy the processing
resources of the first operating system, trigger the
resource occupation and releasing module to transmit
the second interaction request to the first operating
system via the inter-core communication interface;

or, the resource occupation and releasing module is configured to execute a following operation to transmit the
second interaction request of the second operating
system to the first operating system via the inter-core
communication interface: transmitting a second occupation request of which interrupt number is a third
interrupt number to the first operating system via the
inter-core communication interface, wherein the second occupation request is used for requesting to occupy
the processing resources of the first operating system;

or, the resource occupation and releasing module is configured to execute at least one of following operations to
acquire, via the inter-core communication interface, the
second interaction response returned by the first operating system in response to the second interaction
request: transmitting a resource-release allowing
response of which interrupt number is a fourth interrupt
number to the second operating system via the inter-core communication interface, wherein the resource-release allowing response is used for indicating that the
first operating system allows the second operating
system to occupy the processing resources of the first
operating system; and transmitting a resource-release
rejection response of which interrupt number is a fifth
interrupt number to the second operating system via the
inter-core communication interface, wherein the
resource-release rejection response is used for indicating that the first operating system does not allow the
second operating system to occupy the processing
resources of the first operating system.

7. The embedded system according to claim 6, wherein
the first system control module is further configured to
execute at least one of following operations: when the
resource utilization rate of the processing resources of
the first operating system is greater than or equal to a
first utilization rate threshold, determining that the first
operating system is to occupy the processing resources
of the second operating system; and when the processing resources of the first operating system are in an idle
state and there is no service to be executed by the first
operating system, determining that the first operating
system is to release the processing resources to the
second operating system;

or, the first system control module is further configured to
control the first operating system to enter a hibernation
state when the first operating system has no service to
schedule and there is no service to be allocated to the
first operating system.

8. The embedded system according to claim 6, wherein
the second system control module is further configured to
execute at least one of following operations:
when the current resource utilization rate of the processing resources of the second operating system is greater
than or equal to a second utilization rate threshold,
determining that the second operating system is to
occupy the processing resources of the second operating system; and when it is determined, according to ongoing services of
the second operating system and services to be
executed of the second operating system, that the
resource utilization rate of the processing resources of
the second operating system is greater than or equal to
a third utilization rate threshold, determining that the
second operating system is to occupy the processing
resources of the second operating system.

9. The embedded system according to claim 8, wherein
the embedded system is further configured to, when a
service priority of ongoing services of the first operating
system is not lower than a service priority of the services to
be executed of the second operating system, determine that
the first operating system does not allow the second operating system to occupy the processing resources of the first
operating system; and when the service priority of ongoing
services of the first operating system is lower than the
service priority of the services to be executed of the second
operating system, determine that the first operating system
allows the second operating system to occupy the processing
resources of the first operating system.

10. The embedded system according to claim 1, wherein
the first initial processing resource is a designated processor core in the processor cores of the at least one
processor; and the second initial processing resource is
processor cores in the processor cores of the at least one
processor other than the designated processor core;

or, the system start module is configured to execute a following operation to boot the first operating system to
run on the first initial processing resource through the
boot loader: booting the first operating system to run on
the first initial processing resource through a Second
Program Loader (SPL).

11. The embedded system according to claim 10, wherein
the system start module is further configured to perform
safe start checking on codes of the SPL by running a
preset program fixed in a start chip on a device mainboard, wherein the SPL is executed after a check result
of the safe start checking is normal;

or, the system start module is configured to execute a following operation to boot the second operating system
to run on the second initial processing resource through
the boot loader: waking up the second initial processing
resource through the SPL, and booting the second
operating system to run by booting to execute a Universal Boot Loader (U-Boot).

12. An embedded system running method, comprising:
allocating, according to a resource dynamic allocation
rule, a group of services to be allocated to corresponding operating systems in an embedded system, wherein
the resource dynamic allocation rule comprises performing resource dynamic allocation according to at
least one of: a service response speed, a service
resource occupation rate, a service coupling degree,
and service importance; the embedded system comprises a first operating system and a second operating
system; and the first operating system and the second
operating system run on a processor, and a response
speed of the first operating system is higher than a
response speed of the second operating system;

determining resource allocation results corresponding to the group of services to be allocated, wherein the resource allocation results are used for indicating, among processing resources of the processor, a processing resource corresponding to each service to be allocated of the group of services to be allocated, and the processing resources of the processor comprise processor cores; and allocating the processing resources of the processor to the first operating system and the second operating system according to an operating system allocation result and the resource allocation result corresponding to each service to be allocated of the group of services to be allocated;

wherein the method further comprises:

after a chip where the processor is located is powered on, booting the first operating system to run on a first initial processing resource through a boot loader, and booting the second operating system to run on a second initial processing resource through the boot loader, wherein the first initial processing resource is an initial processing resource, which corresponds to the first operating system, in the processing resources of the processor, and the second initial processing resource is an initial processing resource, which corresponds to the second operating system, in the processing resources of the processor.

13. The method according to claim 12, wherein the method further comprises: reading a rule configuration file, so as to generate a rule structure body, wherein the rule structure body is used for recording the resource dynamic allocation rule;

or, the resource dynamic allocation rule is used for allocating the group of services to be allocated to the corresponding operating systems in the embedded system, and comprises at least one of: allocating, to the first operating system, services having service response speed requirements greater than or equal to a set response speed threshold in the group of services to be allocated, and allocating, to the second operating system, services having service response speed requirements less than the set response speed threshold in the group of services to be allocated; allocating, to the first operating system, services having service resource occupation rates less than a first occupation rate threshold in the group of services to be allocated, and allocating, to the second operating system, services having service resource occupation rates greater than or equal to the first occupation rate threshold in the group of services to be allocated; and allocating, to a target operating system, services having sensitive information in the group of services to be allocated, wherein the target operating system is an operating system, that has a lower frequency of interaction with a use object, in the first operating system and the second operating system;

or, the resource dynamic allocation rule is used for allocating the group of services to be allocated to the corresponding operating systems in the embedded system, and comprises at least one of: allocating, to the first operating system, services, whose service coupling degree with services allocated to the first operating system is greater than or equal to a first coupling degree threshold, in the group of services to be allocated; and allocating, to the second operating system, services, whose service coupling degree with services allocated to the second operating system is greater than or equal to a second coupling degree threshold, in the group of services to be allocated;

or, determining the resource allocation results corresponding to the group of services to be allocated comprises: according to allocation results of the group of services to be allocated, in combination with resource utilization of the processing resources of the first operating system and resource utilization of the processing resources of the second operating system, generating a resource mapping table between the group of services to be allocated and the processing resources of the processor;

or, allocating the processing resources of the processor to the first operating system and the second operating system according to the operating system allocation result and the resource allocation result corresponding to each service to be allocated of the group of services to be allocated comprises: when it is determined, according to the resource allocation results, that unallocated processing resources in the processing resources of the processor correspond to services to be allocated, allocating the unallocated processing resources to the operating system to which the services to be allocated corresponding to the unallocated processing resources are allocated;

or, the method further comprises: performing occupation and releasing of processing resources between the first operating system and the second operating system via an inter-core communication interface;

or, the method further comprises: after a chip where the processor is located is powered on, booting the first operating system to run on a first initial processing resource through a boot loader, and booting the second operating system to run on a second initial processing resource through the boot loader, wherein the first initial processing resource is an initial processing resource, which corresponds to the first operating system, in the processing resources of the processor, and the second initial processing resource is an initial processing resource, which corresponds to the second operating system, in the processing resources of the processor.

14. The method according to claim 13, wherein performing occupation and releasing of the processing resources between the first operating system and the second operating system via the inter-core communication interface comprises: transmitting a first interaction request of the first operating system to the second operating system via the inter-core communication interface, wherein the first interaction request is used for requesting to perform resource interaction with the second operating system, and the resource interaction comprises at least one of: resource occupation and resource releasing; and acquiring, via the inter-core communication interface, a first interaction response that is returned by the second operating system in response to the first interaction request, wherein the first interaction response is used for indicating the first operating system to perform the resource interaction with the second operating system according to the first interaction response;

or, performing occupation and releasing of the processing resources between the first operating system and the second operating system via the inter-core communication interface comprises: transmitting a second interaction request of the second operating system to the first operating system via the inter-core communication interface, wherein the second interaction request is used for requesting to occupy the processing resources of the first operating system; and acquiring, via the inter-core communication interface, a second interaction response that is returned by the first operating system in response to the second interaction request, wherein the second interaction response is used for indicating whether the first operating system allows the second operating system to occupy the processing resources of the first operating system.

15. The method according to claim 14, further comprising:
detecting a resource utilization rate of the processing resources of the second operating system; and
when it is determined, according to the resource utilization rate of the processing resources of the second operating system, that the second operating system is to occupy the processing resources of the first operating system, triggering the transmission of the second interaction request to the first operating system via the inter-core communication interface.

16. The method according to claim 15, further comprising at least one of:
when the current resource utilization rate of the processing resources of the second operating system is greater than or equal to a second utilization rate threshold, determining that the second operating system is to occupy the processing resources of the second operating system; and
when it is determined, according to ongoing services of the second operating system and services to be executed of the second operating system, that the resource utilization rate of the processing resources of the second operating system is greater than or equal to a third utilization rate threshold, determining that the second operating system is to occupy the processing resources of the second operating system.

17. The method according to claim 16, further comprising:
when a service priority of services to be executed of the first operating system is not lower than a service priority of the services to be executed of the second operating system, determine that the first operating system does not allow the second operating system to occupy the processing resources of the first operating system; and
when the service priority of the services to be executed of the first operating system is lower than the service priority of the services to be executed of the second operating system, determine that the first operating system allows the second operating system to occupy the processing resources of the first operating system.

18. A non-transitory computer-readable storage medium which stores a computer program, wherein the method according to claim 12 is implemented when the computer program is executed by a processor.

19. An electronic device, comprising a memory, a processor, and a computer program that is stored in the memory and executable on the processor, wherein the processor, when executing the computer program, implements following operations:
allocating, according to a resource dynamic allocation rule, a group of services to be allocated to corresponding operating systems in an embedded system, wherein the resource dynamic allocation rule comprises performing resource dynamic allocation according to at least one of: a service response speed, a service resource occupation rate, a service coupling degree, and service importance; the embedded system comprises a first operating system and a second operating system; and the first operating system and the second operating system run on a processor, and a response speed of the first operating system is higher than a response speed of the second operating system;
determining resource allocation results corresponding to the group of services to be allocated, wherein the resource allocation results are used for indicating, among processing resources of the processor, a processing resource corresponding to each service to be allocated of the group of services to be allocated, and the processing resources of the processor comprise processor cores; and
allocating the processing resources of the processor to the first operating system and the second operating system according to an operating system allocation result and the resource allocation result corresponding to each service to be allocated of the group of services to be allocated;
wherein the processor, when executing the computer program, further implements following operations: after a chip where the processor is located is powered on, booting the first operating system to run on a first initial processing resource through a boot loader, and booting the second operating system to run on a second initial processing resource through the boot loader, wherein the first initial processing resource is an initial processing resource, which corresponds to the first operating system, in the processing resources of the processor, and the second initial processing resource is an initial processing resource, which corresponds to the second operating system, in the processing resources of the processor.

* * * * *